(12) United States Patent
Calderone et al.

(10) Patent No.: US 12,321,515 B2
(45) Date of Patent: Jun. 3, 2025

(54) SYSTEM AND METHOD OF REPRESENTATIONS OF USER INTERFACES OF AN ELECTRONIC DEVICE

(71) Applicant: Apple Inc., Cupertino, CA (US)

(72) Inventors: Tyler R. Calderone, Boulder, CO (US); Sean L. Seguin, Lafayette, CO (US); Lorena S. Pazmino, San Francisco, CA (US); Aryan Sharifian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/429,301

(22) Filed: Jan. 31, 2024

(65) Prior Publication Data

US 2024/0361833 A1    Oct. 31, 2024

Related U.S. Application Data

(60) Provisional application No. 63/498,239, filed on Apr. 25, 2023.

(51) Int. Cl.
*G06F 3/01* (2006.01)
(52) U.S. Cl.
CPC .................... *G06F 3/013* (2013.01)
(58) Field of Classification Search
CPC ...................................................... G06F 3/013
See application file for complete search history.

(56) References Cited

U.S. PATENT DOCUMENTS 8,730,156 B2 * 5/2014 Weising ............... G06F 3/0304
348/47
9,619,105 B1    4/2017 Dal Mutto
(Continued)

FOREIGN PATENT DOCUMENTS

EP    2458486 A1    5/2012
EP    2893297 A1    7/2015
(Continued)

OTHER PUBLICATIONS

International Search Report received for PCT Patent Application No. PCT/US2023/074957, mailed on Jan. 30, 2024, 7 pages.
(Continued)

*Primary Examiner* — William Lu
(74) *Attorney, Agent, or Firm* — Kubota & Basol LLP

(57) ABSTRACT

Some examples of the disclosure are directed to systems and methods for displaying and interacting with a representation of a user interface of an electronic device in a three-dimensional environment. While presenting a first user interface, a first electronic device presents a representation of a second user interface of a second electronic device based on display data representing the second user interface. In response to detecting a respective event corresponding to user input, if a gaze of a user of the first electronic device is directed to the representation of the second user interface, the first electronic device causes the second electronic device to perform a first operation directed to the second user interface based on the respective event. Alternatively, if the gaze is directed to the first user interface, the first electronic device performs a second operation directed to the first user interface based on the respective event.

30 Claims, 47 Drawing Sheets

(56) References Cited

U.S. PATENT DOCUMENTS

| | | | |
|---|---|---|---|
| 9,870,130 B2 | 1/2018 | Schubert et al. | |
| 10,564,714 B2* | 2/2020 | Marggraff | G02B 27/0093 |
| 10,708,965 B1* | 7/2020 | Subramanian | G01S 5/0027 |
| 11,176,755 B1* | 11/2021 | Tichenor | G06F 3/011 |
| 11,243,734 B2 | 2/2022 | Boissière et al. | |
| 11,379,033 B2 | 7/2022 | O'hern et al. | |
| 2010/0293504 A1 | 11/2010 | Hachiya | |
| 2013/0345975 A1 | 12/2013 | Vulcano et al. | |
| 2014/0002444 A1* | 1/2014 | Bennett | G06T 19/006 |
| | | | 345/419 |
| 2014/0267400 A1 | 9/2014 | Mabbutt et al. | |
| 2014/0298273 A1 | 10/2014 | Blackstone et al. | |
| 2014/0375683 A1 | 12/2014 | Salter et al. | |
| 2015/0193982 A1* | 7/2015 | Mihelich | H04W 4/026 |
| | | | 345/633 |
| 2015/0205106 A1* | 7/2015 | Norden | G02B 27/0093 |
| | | | 345/7 |
| 2016/0025971 A1* | 1/2016 | Crow | A61B 3/113 |
| | | | 345/156 |
| 2016/0370858 A1* | 12/2016 | Leppänen | H04N 21/4316 |
| 2017/0090566 A1* | 3/2017 | George-Svahn | G06F 3/04883 |
| 2017/0115728 A1* | 4/2017 | Park | G06T 19/006 |
| 2017/0154326 A1* | 6/2017 | Jo | H04W 4/06 |
| 2017/0162177 A1 | 6/2017 | Lebeck et al. | |
| 2017/0169616 A1* | 6/2017 | Wiley | G06F 3/04815 |
| 2018/0077383 A1 | 3/2018 | Akao et al. | |
| 2018/0275753 A1 | 9/2018 | Publicover et al. | |
| 2018/0300952 A1* | 10/2018 | Evans | G06F 9/453 |
| 2018/0350119 A1* | 12/2018 | Kocharlakota | G06F 3/012 |
| 2019/0279407 A1* | 9/2019 | McHugh | G06F 3/011 |
| 2019/0302977 A1 | 10/2019 | Pendergast et al. | |
| 2019/0369569 A1 | 12/2019 | Olsen et al. | |
| 2019/0384406 A1* | 12/2019 | Smith | G06V 40/113 |
| 2020/0051527 A1* | 2/2020 | Ngo | H04N 5/57 |
| 2020/0257484 A1* | 8/2020 | Qian | H04N 21/8126 |
| 2020/0319704 A1* | 10/2020 | Kathuria | H04N 13/344 |
| 2020/0328913 A1* | 10/2020 | Wyas | G06F 9/544 |
| 2021/0011556 A1* | 1/2021 | Atlas | G06F 3/011 |
| 2021/0055789 A1 | 2/2021 | Tsai et al. | |
| 2021/0067418 A1* | 3/2021 | Ely | H04L 41/22 |
| 2021/0096726 A1 | 4/2021 | Faulkner et al. | |
| 2021/0102820 A1 | 4/2021 | Le et al. | |
| 2021/0142552 A1 | 5/2021 | Kimura et al. | |
| 2021/0158624 A1 | 5/2021 | Moon et al. | |
| 2021/0173536 A1 | 6/2021 | Kondo | |
| 2021/0191600 A1 | 6/2021 | Lemay et al. | |
| 2021/0227601 A1* | 7/2021 | Eom | H04W 12/50 |
| 2021/0312713 A1* | 10/2021 | Peri | H04L 67/75 |
| 2021/0312717 A1 | 10/2021 | Mao | |
| 2021/0326094 A1* | 10/2021 | Buerli | G06F 9/451 |
| 2021/0358294 A1* | 11/2021 | Parashar | G08C 17/02 |
| 2021/0366440 A1* | 11/2021 | Burns | G06F 3/04812 |
| 2021/0400744 A1* | 12/2021 | Chen | H04W 8/28 |
| 2021/0405760 A1* | 12/2021 | Schoen | G06F 3/0304 |
| 2022/0124286 A1* | 4/2022 | Punwani | G06F 3/04815 |
| 2022/0179503 A1* | 6/2022 | Timonen | G06F 3/012 |
| 2022/0239718 A1* | 7/2022 | Song | H04L 67/104 |
| 2022/0244536 A1* | 8/2022 | Sha | G06F 3/0484 |
| 2022/0253125 A1* | 8/2022 | Wallen | G06T 19/20 |
| 2022/0287676 A1* | 9/2022 | Steines | A61B 6/469 |
| 2022/0291808 A1* | 9/2022 | Stevens | G06F 3/017 |
| 2022/0303680 A1* | 9/2022 | Ahmed | H04W 76/14 |
| 2023/0094522 A1 | 3/2023 | Stauber et al. | |
| 2023/0100689 A1 | 3/2023 | Chiu et al. | |
| 2023/0176806 A1* | 6/2023 | Chen | G06F 3/0481 |
| | | | 715/764 |
| 2023/0206572 A1 | 6/2023 | Pazmino et al. | |
| 2023/0341932 A1 | 10/2023 | Silva et al. | |
| 2023/0343049 A1 | 10/2023 | Boesel et al. | |
| 2023/0351702 A1* | 11/2023 | Tan | G10L 15/22 |
| 2023/0353398 A1 | 11/2023 | White | |
| 2024/0103685 A1 | 3/2024 | Pazmino et al. | |
| 2024/0103686 A1* | 3/2024 | Pazmino | G06F 3/1454 |
| 2024/0104870 A1* | 3/2024 | Fuste Lleixa | G06T 15/00 |
| 2024/0203066 A1 | 6/2024 | Kawashima et al. | |
| 2024/0233288 A1* | 7/2024 | Stauber | G06V 40/19 |
| 2024/0273838 A1* | 8/2024 | Palangie | G06F 3/017 |
| 2024/0281109 A1 | 8/2024 | Manjunath et al. | |
| 2024/0361832 A1* | 10/2024 | Calderone | G06F 3/16 |

FOREIGN PATENT DOCUMENTS

| | | |
|---|---|---|
| EP | 4155867 A1 | 3/2023 |
| WO | 2021/061349 A1 | 4/2021 |
| WO | 2022/055821 A1 | 3/2022 |
| WO | 2022/067343 A2 | 3/2022 |
| WO | 2022208797 A1 | 10/2022 |

OTHER PUBLICATIONS

Sun, Yongbin et al."MagicHand: Interact with IoT Devices in Augmented Reality Environment," 2019 IEEE Conference on Virtual Reality and 3D User Interfaces, Osaka, Japan, Mar. 23-27, 2019, [retrieved on Dec. 4, 2020], 6 pages.

"Your PC in VR", Virtual Desktop [online]. Virtual Desktop, Inc., 2023 [retrieved on Apr. 17, 2024]. Retrieved from the Internet: <URL: https://www.vrdesktop.net/>.

Extended European Search Report received for European Patent Application No. 24158036.4, mailed on Jul. 18, 2024, 12 pages.

Extended European Search Report received for European Patent Application No. 24171800.6, mailed on Sep. 5, 2024, 15 pages.

Extended European Search Report received for European Patent Application No. 24171804.8, mailed on Sep. 5, 2024, 13 pages.

Huang et al., "Proxy-Based Security Audit System for Remote Desktop Access", Computer Communications and Networks, ICCCN 2009. Proceedings of 18th International Conference On, IEEE, Piscataway, NJ, USA, Aug. 3, 2009, 5 pages.

Writtenhouse, Sandy, "How to Use Live View on Google Maps", Available online at <https://www.lifewire.com/ use-live-view-google-maps-5323691>, [Retrieved from Internet on Jun. 27, 2024], Jul. 5, 2022, 6 pages.

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.

International Search Report received for PCT Patent Application No. PCT/US2022/082379, mailed on May 30, 2023, 7 pages.

International Search Report received for PCT Patent Application No. PCT/US2023/019309, mailed on Sep. 1, 2023, 6 pages.

International Search Report received for PCT Patent Application No. PCT/US2023/074968, mailed on Feb. 26, 2024, 7 pages.

Notice of Allowance received for U.S. Appl. No. 18/429,294, mailed on Jun. 21, 2024, 10 pages.

Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.

Didehkhorshid et al., "Text Input in Virtual Reality Using a Tracked Drawing Tablet", HCII 2020, LNCS 12428, 2020, pp. 314-329.

Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.

Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.

Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.

\* cited by examiner

SYSTEM AND METHOD OF REPRESENTATIONS OF USER INTERFACES OF AN ELECTRONIC DEVICE

CROSS-REFERENCE TO RELATED APPLICATIONS

This application claims the benefit of U.S. Provisional Application No. 63/498,239, filed Apr. 25, 2023, the content of which is incorporated herein by reference in its entirety for all purposes.

FIELD OF THE DISCLOSURE

This relates generally to systems and methods of displaying and facilitating interaction with representations of user interfaces of an electronic device.

BACKGROUND OF THE DISCLOSURE

Many types of computing systems are available, such as a mobile phone, a tablet, a touchpad, a portable or desktop computer, a portable media player, and a wearable device. Computing systems may include a display or a touch screen to enable user interactions. However, these computing systems are limited by the physical constraints of the display or touch screen.

SUMMARY OF THE DISCLOSURE

Some examples of the disclosure are directed to systems and methods for facilitating display and interaction with a representation of a user interface of an electronic device in a three-dimensional environment. In some examples, the representation of the user interface is displayed in a virtual extended display for the electronic device in the three-dimensional environment. In some examples, a first electronic device may be in communication with a display and one or more input devices of the first electronic device. In some examples, the first electronic device captures, via the one or more input devices, at least a portion of a real-world environment that is surrounding the first electronic device, wherein the real-world environment includes a second electronic device with a display configured to display a first representation of a first user interface of the second electronic device. In some examples, the second electronic device is in communication with the first electronic device. In some examples, the first electronic device presents, via the display, a computer-generated environment including a representation of the captured portion of the real-world environment and a first affordance associated with a representation of the second electronic device. In some examples, the first affordance is displayed in a predetermined region of the display of the first electronic device. In some examples, while presenting the computer-generated environment including the representation of the captured portion of the real-world environment and the first affordance, the first electronic device receives, via the one or more input devices, an input corresponding to a selection of the first affordance. In some examples, in response to receiving the input, the first electronic device presents, in the computer-generated environment, a second representation of a second user interface of the second electronic device different than the first representation of the first user interface. In some examples, the second representation of the second user interface is displayed in a virtual extended display in the computer-generated environment.

In some examples, while presenting the computer-generated environment that includes the second representation of the second user interface, the first electronic device detects a first indication of first respective input received via one or more input devices of the second electronic device. In some examples, in response to detecting the first indication, in accordance with a determination that a gaze of a user of the first electronic device is directed to the first representation of the first user interface, causing the second electronic device to perform a first operation directed to the first user interface in accordance with the first respective input. In some examples, in accordance with a determination that the gaze is directed to the second representation of the second user interface, performing a second operation directed to the second representation of the second user interface in accordance with the first respective input.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
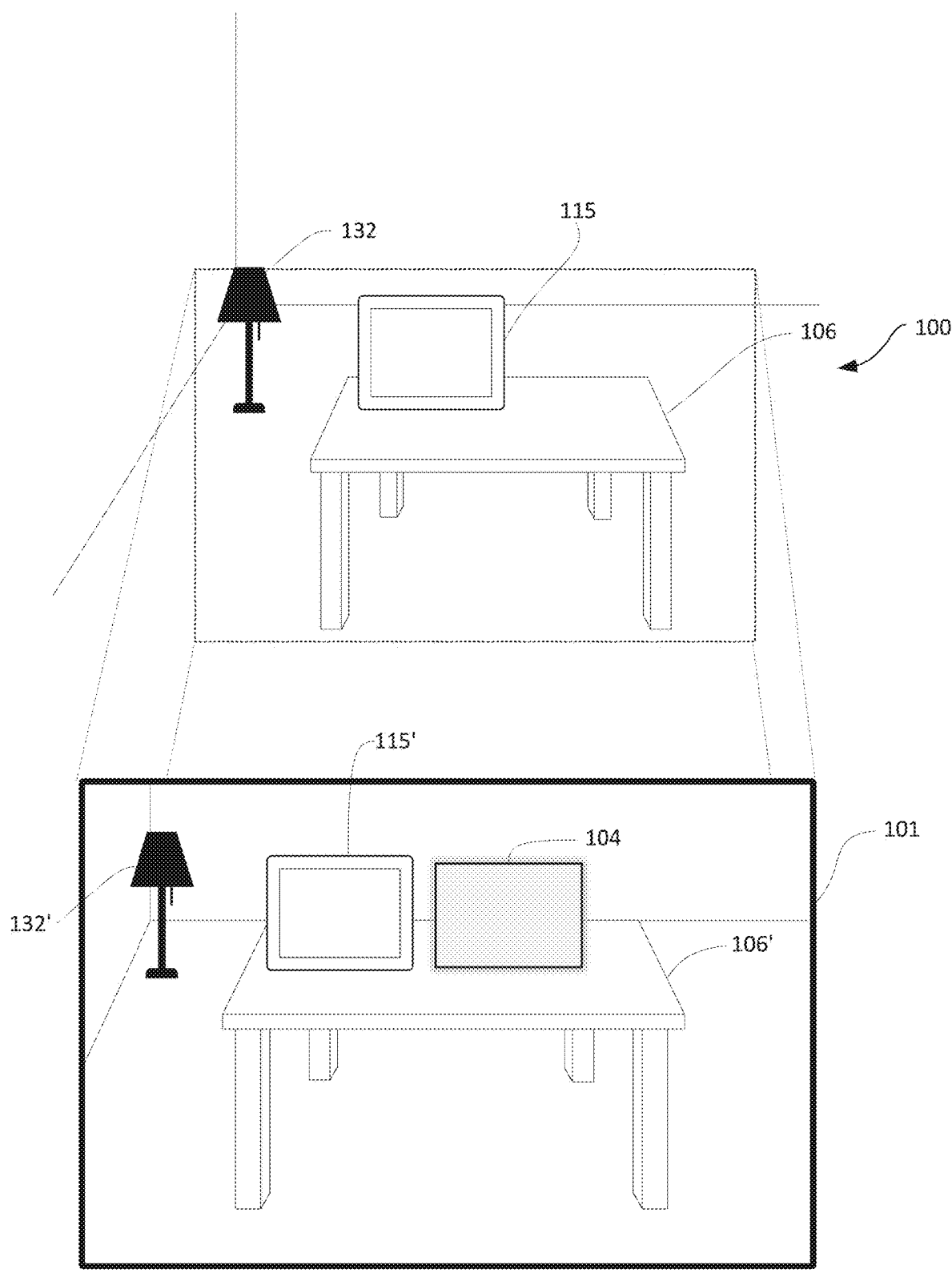
FIG. 1 illustrates an electronic device presenting an extended reality environment according to some examples of the disclosure.

Some examples of the disclosure are directed to systems and methods for facilitating display and interaction with a representation of a user interface of an electronic device in a three-dimensional environment. In some examples, the representation of the user interface is displayed in a virtual extended display for the electronic device in the three-dimensional environment. In some examples, a first electronic device may be in communication with a display and one or more input devices of the first electronic device. In some examples, the first electronic device captures, via the one or more input devices, at least a portion of a real-world environment that is surrounding the first electronic device, wherein the real-world environment includes a second electronic device with a display configured to display a first representation of a first user interface of the second electronic device. In some examples, the second electronic device is in communication with the first electronic device. In some examples, the first electronic device presents, via the display, a computer-generated environment including a representation of the captured portion of the real-world environment and a first affordance associated with a representation of the second electronic device. In some examples, the first affordance is displayed in a predetermined region of the display of the first electronic device. In some examples, while presenting the computer-generated environment including the representation of the captured portion of the real-world environment and the first affordance, the first electronic device receives, via the one or more input devices, an input corresponding to a selection of the first affordance. In some examples, in response to receiving the input, the first electronic device presents, in the computer-generated environment, a second representation of a second user interface of the second electronic device different than the first representation of the first user interface. In some examples, the second representation of the second user interface is displayed in a virtual extended display in the computer-generated environment.

In some examples, while presenting the computer-generated environment that includes the second representation of the second user interface, the first electronic device detects a first indication of first respective input received via one or more input devices of the second electronic device. In some examples, in response to detecting the first indication, in accordance with a determination that a gaze of a user of the first electronic device is directed to the first representation of the first user interface, causing the second electronic device to perform a first operation directed to the first user interface in accordance with the first respective input. In some examples, in accordance with a determination that the gaze is directed to the second representation of the second user interface, performing a second operation directed to the second representation of the second user interface in accordance with the first respective input.

In some examples, displaying a virtual extended display in a three-dimensional (e.g., computer-generated) environment that is configured to display a user interface of a real-world electronic device may include interaction with one or more user interface objects in the three-dimensional environment. For example, initiation of display of the virtual extended display in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of a virtual extended display in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of electronic device 101 are described below with reference to the architecture block diagram of FIG. 2. As shown in FIG. 1, electronic device 101, table 106, computer 115, and floor lamp 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106, computer 115, and floor lamp 132 (illustrated in the field of view of electronic device 101). In some examples, in response to a trigger, the electronic device 101 may be configured to display a virtual object 104 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 115' of real-world computer 115 displayed via electronic device 101 in response to detecting the planar surface of table 106 in the physical environment 100 (or some other trigger).

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the user interface is a user interface that is also configured to be displayed via (e.g., a display of) the computer 115 in the physical environment 100. In some examples, the virtual object 104 is optionally configured to be interactive and responsive to user input, such that a user may virtually touch, tap, move, rotate, or otherwise interact with, the virtual object 104. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
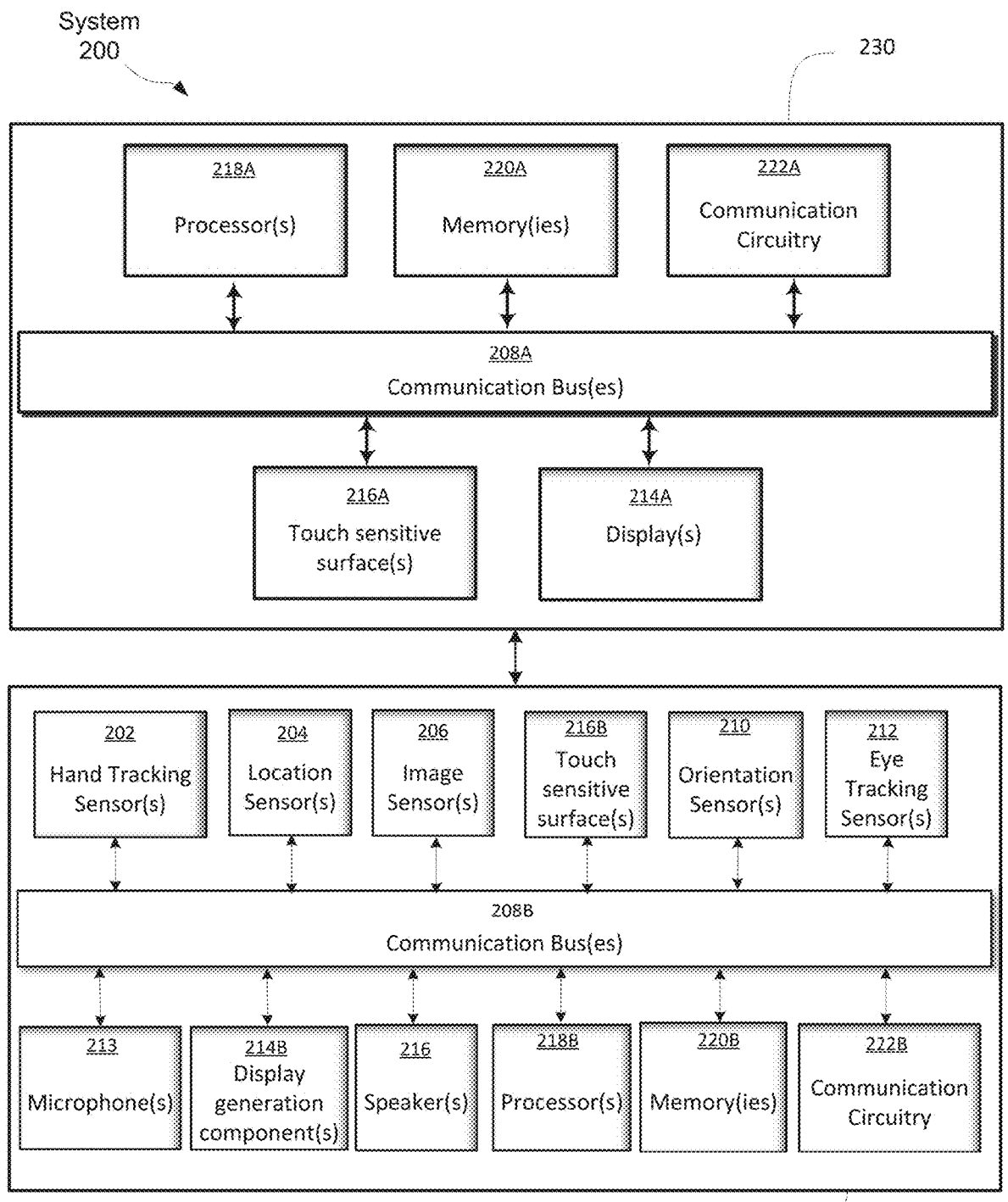
FIG. 2 illustrates a block diagram of an exemplary architecture for a system or device according to embodiments of the disclosure.

FIG. 2 illustrates a block diagram of an exemplary architecture for a system or device 200 according to examples of the disclosure. In some examples, system 200 is a mobile device, such as a mobile phone (e.g., smart phone), a tablet computer, a laptop computer, a desktop computer, a head-mounted display, an auxiliary device in communication with another device, etc. System 200 optionally includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of system 200.

In some examples, as illustrated in FIG. 2, system/device 200 can be divided between multiple devices. For example, a first device 230 optionally includes processor(s) 218A, memory or memories 220A, communication circuitry 222A, touch-sensitive surface(s) 216A, and display generation component(s) or display(s) 214A optionally communicating over communication bus(es) 208A. A second device 240 (e.g., corresponding to electronic device 101) optionally includes various sensors (e.g., one or more hand tracking sensor(s) 202, one or more location sensor(s) 204, one or more image sensor(s) 206, one or more touch-sensitive surface(s) 216B, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, memory or memories 220B, and/or communication circuitry 222B. One or more communication buses 208B are optionally used for communication between the above-mentioned components of device 240. First device 230 and second device 240 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, etc. In some examples, device 240 includes touch-sensitive surface(s) 216B for receiving user inputs, such as tap inputs and swipe inputs or other gestures. In some examples, display generation component(s) 214A, 214B and touch-sensitive surface(s) 216A, 216B form touch-sensitive display(s) (e.g., a touch screen integrated with device 230, 240 or external to device 230, 240 that is in communication with device 230, 240).

Device 240 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 240. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 240 uses CCD sensors, event cameras, and depth sensors in combination to detect the physical environment around device 240. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 240 uses image sensor(s) 206 to detect the position and orientation of device 240 and/or display generation component(s) 214 in the real-world environment. For example, device 240 uses image sensor(s) 206 to track the position and orientation of display generation component(s) 214B relative to one or more fixed objects in the real-world environment.

In some examples, device 240 includes microphone(s) 213 or other audio sensors. Device 240 uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Device 240 includes location sensor(s) 204 for detecting a location of device 240 and/or display generation component(s) 214B. For example, location sensor(s) 204 can include a GPS receiver that receives data from one or more satellites and allows device 240 to determine the device's absolute position in the physical world.

Device 240 includes orientation sensor(s) 210 for detecting orientation and/or movement of device 240 and/or display generation component(s) 214B. For example, device 240 uses orientation sensor(s) 210 to track changes in the position and/or orientation of device 240 and/or display generation component(s) 214B, such as with respect to physical objects in the real-world environment. Orientation sensor(s) 210 optionally include one or more gyroscopes and/or one or more accelerometers.

Device 240 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. Eye tracking senor(s) 212 are configured to track the position and movement of a user's gaze (eyes, face, or head, more generally) with respect to the real-world or extended reality environment and/or relative to the display generation component(s) 214B. In some examples, hand tracking sensor(s) 202 and/or eye tracking sensor(s) 212 are implemented together with the display generation component(s) 214B. In some examples, the hand tracking sensor(s) 202 and/or eye tracking sensor(s) 212 are implemented separate from the display generation component(s) 214B.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

System 200 is not limited to the components and configuration of FIG. 2, but can include fewer, alternative, or additional components in multiple configurations. In some examples, system 200 can be implemented in a single device. A person using system 200, is optionally referred to herein as a user of the system (e.g., and/or a user of the device). Attention is now directed towards exemplary interactions involving initiating display of a virtual extended display that is associated with a physical electronic device that is visible in a three-dimensional environment. As discussed below, the three-dimensional environment may be displayed using a first electronic device and a second electronic device, different from the first electronic device, may be located in a physical environment that is included in the three-dimensional environment, wherein the first electronic device is configured to present a virtual extended display of the second electronic device. In some examples, the processes of initiating display of a virtual extended display and facilitating interactions with the virtual extended display in the three-dimensional environment described below can be performed by processors 218A, 218B of the devices 230 and 240.

FIGS. 3A-3I illustrate examples interactions for initiating display of a representation of a user interface of an electronic device in a three-dimensional environment according to some examples of the disclosure. In some examples, a first electronic device 301 may present a three-dimensional environment 350. The first electronic device 301 may be similar to electronic device 101 or 240 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3I, a user is optionally wearing the first electronic device 301, such that the three-dimensional environment 350 can be defined by X, Y and Z axes as viewed from a perspective of the first electronic device (e.g., a viewpoint associated with the user of the electronic device 301). Accordingly, as used herein, the first electronic device 301 is configured to be movable with six degrees of freedom based on the movement of the user (e.g., the head of the user), such that the first electronic device 301 may be moved in the roll direction, the pitch direction, and/or the yaw direction.

Figure 3A:
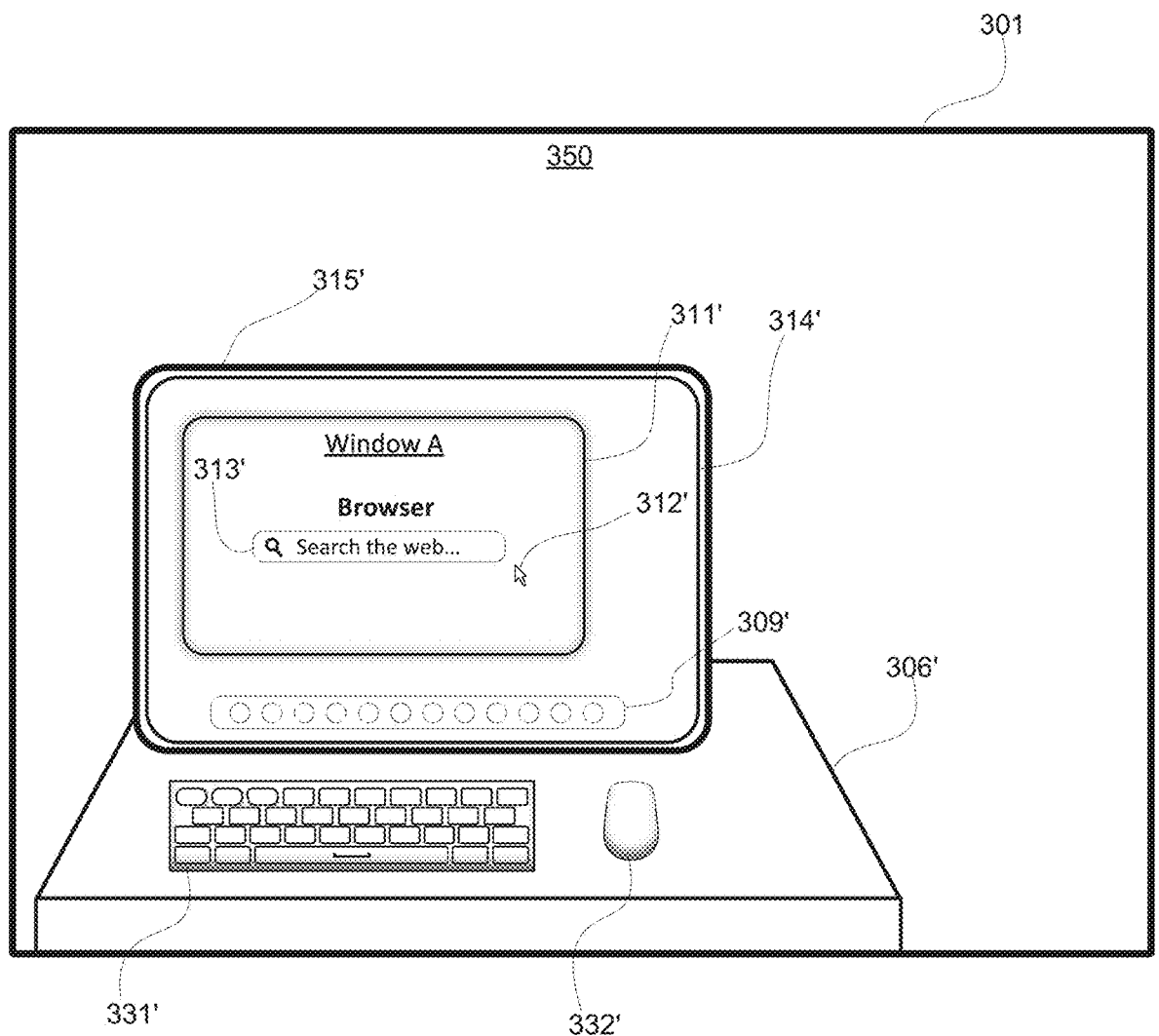
FIGS. 3A-3I illustrate example interactions for initiating display of a representation of a user interface of an electronic device in a three-dimensional environment according to some examples of the disclosure.

As shown in FIG. 3A, the first electronic device 301 may be positioned in a physical environment that includes a table 306 (e.g., corresponding to real-world table 106 in FIG. 1), a second electronic device 315, and one or more physical input devices 331/332. Thus, the three-dimensional environment 350 presented using the first electronic device 301 optionally includes captured portions of the physical environment surrounding the electronic device 301, such as a representation of the table 306', a representation of the second electronic device 315', and one or more representations of the one or more physical input devices 331'/332'. In some examples, the second electronic device 315' may be similar to device 230 discussed above, and/or may be a desktop computer, a laptop computer, a tablet computer, or other mobile computing device. In some examples, the one or more physical input devices may include a keyboard 331' and a mouse 332' (or trackpad) that are in communication with the second electronic device 315' (e.g., integrated with the second electronic device 315' or communicating with the second electronic device 315' via a wired or wireless communication means). It should be understood that the input devices (e.g., keyboard 331' and mouse 332') of FIG. 3A are merely representative, and that additional, fewer, or different input devices may be in communication with the second electronic device 315'. In some examples, the representations can include portions of the physical environment viewed through a transparent or translucent display of the first electronic device 301.

In some examples, as shown in FIG. 3A, the second electronic device 315' in the three-dimensional environment 350 is configured to display one or more user interfaces. For example, as shown in FIG. 3A, the second electronic device 315' includes a display, which is visible in the three-dimensional environment 350 as a representation of the display 314'. In some examples, the display 314' is displaying a first user interface (e.g., "Window A"), which is visible in the three-dimensional environment 350 as a representation of the first user interface 311'. In some examples, the first user interface 311' is a user interface of a web-browsing application (e.g., "Browser") that includes a search bar, which is visible in the three-dimensional environment 350 as a representation of the search bar 313', as shown in FIG. 3A. Additionally, as shown in FIG. 3A, the first user interface 311' may be displayed with a dock, which is visible in the three-dimensional environment 350 as a representation of the dock 309', that includes a plurality of icons corresponding to applications, images, or other files local to the second electronic device 315'. Finally, as shown in FIG. 3A, in some examples, the second electronic device 315' may display a cursor (e.g., or other pointer object), which is visible in the three-dimensional environment 350 as a representation of the cursor 312', that is controllable via the mouse 332' for providing input directed to user interface elements of the display 314' (e.g., movable via the mouse 332' and/or controllable via the mouse 332' for providing selection inputs and related inputs directed to the user interface elements).

In some examples, it may be advantageous to provide a fully functional working environment in three-dimensions representative of customary interactions with the second electronic device in the real-world environment. Accordingly, providing a virtual extended display that is configured to include a representation of one or more user interfaces of the second electronic device in the three-dimensional environment may be particularly useful for interactions with the one or more user interfaces of the second electronic device without the constraints of the physical display (e.g., display 314') of the second electronic device. For example, as described herein, the virtual extended display can provide for displaying the one or more user interfaces of the second electronic device at sizes that exceed the dimensions of the physical display of the second electronic device (e.g., enlarging a user interface or providing multiple regions for display of the user interface beyond the region corresponding to the display of the second electronic device). In some examples, it may be advantageous to present one or more objects (e.g., objects corresponding to three-dimensional graphical data) of the second electronic device in three-dimensions. For example, two-dimensional content can be viewed or edited in three-dimensions, whereas the display of the second electronic device is limited to two-dimensions. In such instances, a user creating content for display in a three-dimensional environment may view the content in three-dimensions via the virtual extended display. In some examples, it may be advantageous to facilitate interactions with the content of the virtual extended display based on input detected via the physical input devices in communication with the second electronic device, as described herein in more detail.

Figure 3B:
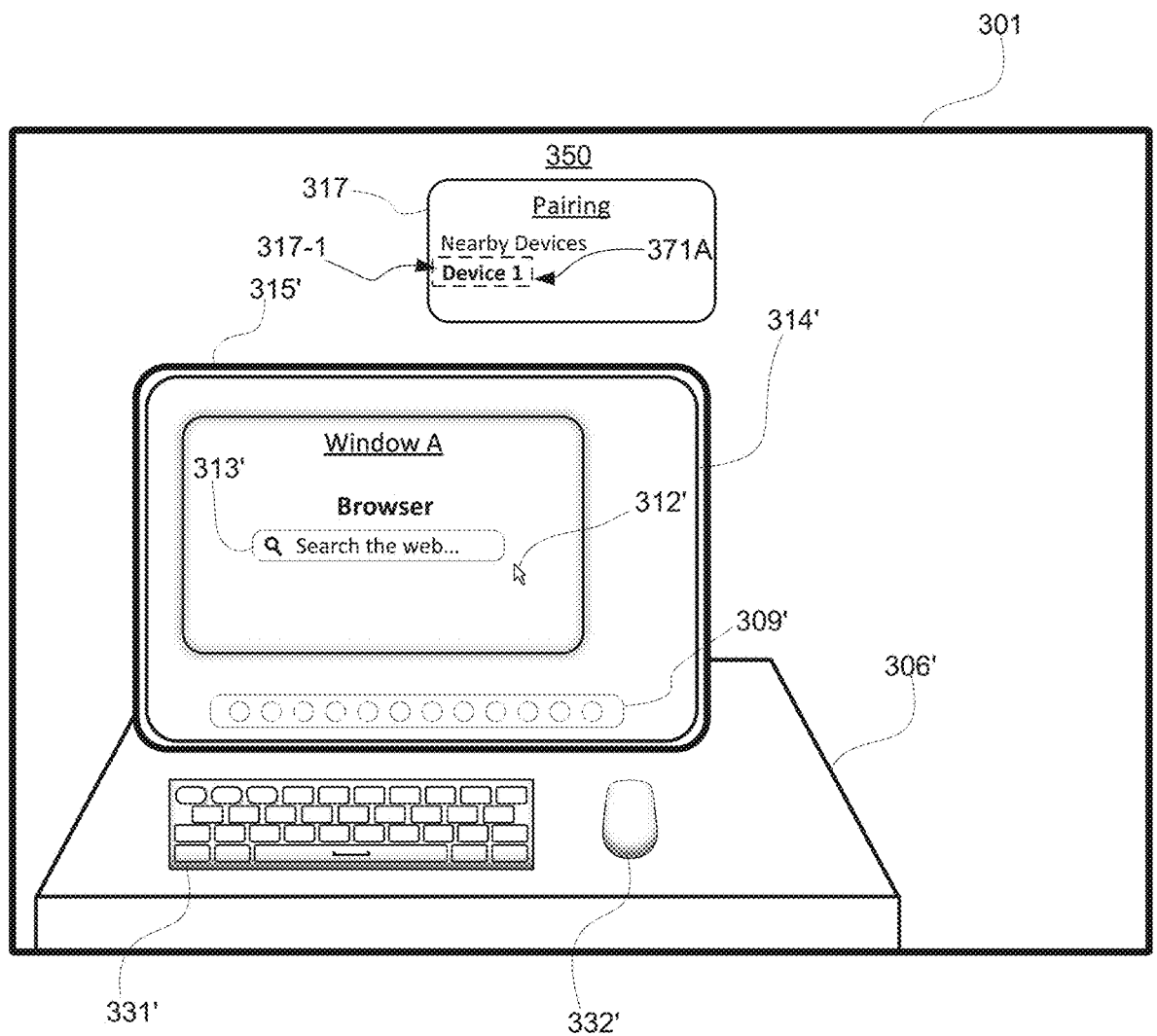

In some examples, the first electronic device 301 may provide for pairing with the second electronic device 315' for initiating display of a virtual extended display that is associated with the second electronic device 315' in the three-dimensional environment 350. For example, as shown in FIG. 3B, the first electronic device 301 may display user interface object 317 that is associated with a respective application that provides for pairing the first electronic device 301 with one or more other electronic devices (e.g., a pairing application or a settings application running on the first electronic device 301). In some examples, as shown in FIG. 3B, the user interface object 317 includes a first indication 317-1 corresponding to "Device 1". In some examples, Device 1 corresponds to the second electronic device 315' that is not currently paired with the first electronic device 301 in FIG. 3B. In some examples, the first indication 317-1 is included in the user interface object 317 because the second electronic device 315' is within a threshold distance (e.g., 0.1, 0.25, 0.5, 1, 2, 3, 5, 10, 15, 20, etc. m) of the first electronic device 301. In some examples, the first indication 317-1 is included in the user interface object 317 because the second electronic device 315' is visible in a field of view of the first electronic device 301 or the user of the first electronic device 301 (e.g., the second electronic device 315' is located in a portion of the physical environment that is visible in the three-dimensional environment 350 from a current viewpoint of the user). In some examples, the first indication 317-1 is selectable to initiate a process for pairing the second electronic device 315' with the first electronic device 301 to enable the first electronic device 301 to present a virtual extended display that is associated with the second electronic device 315'.

In some examples, as shown in FIG. 3B, the first electronic device 301 detects a selection input 371A directed to the first indication 317-1. For example, in FIG. 3B, the first electronic device 301 detects an air pinch gesture (e.g., in which an index finger and thumb of a hand of the user come together to make contact), a tap or touch input (e.g., provided by an index finger of the hand), a verbal command, or other input, optionally while a gaze of the user is directed to the first indication 317-1. In some examples, as described below, in response to detecting the selection of the first indication 317-1, the first electronic device 301 initiates a process for pairing the second electronic device 315' with the first electronic device 301.

Figure 3C:
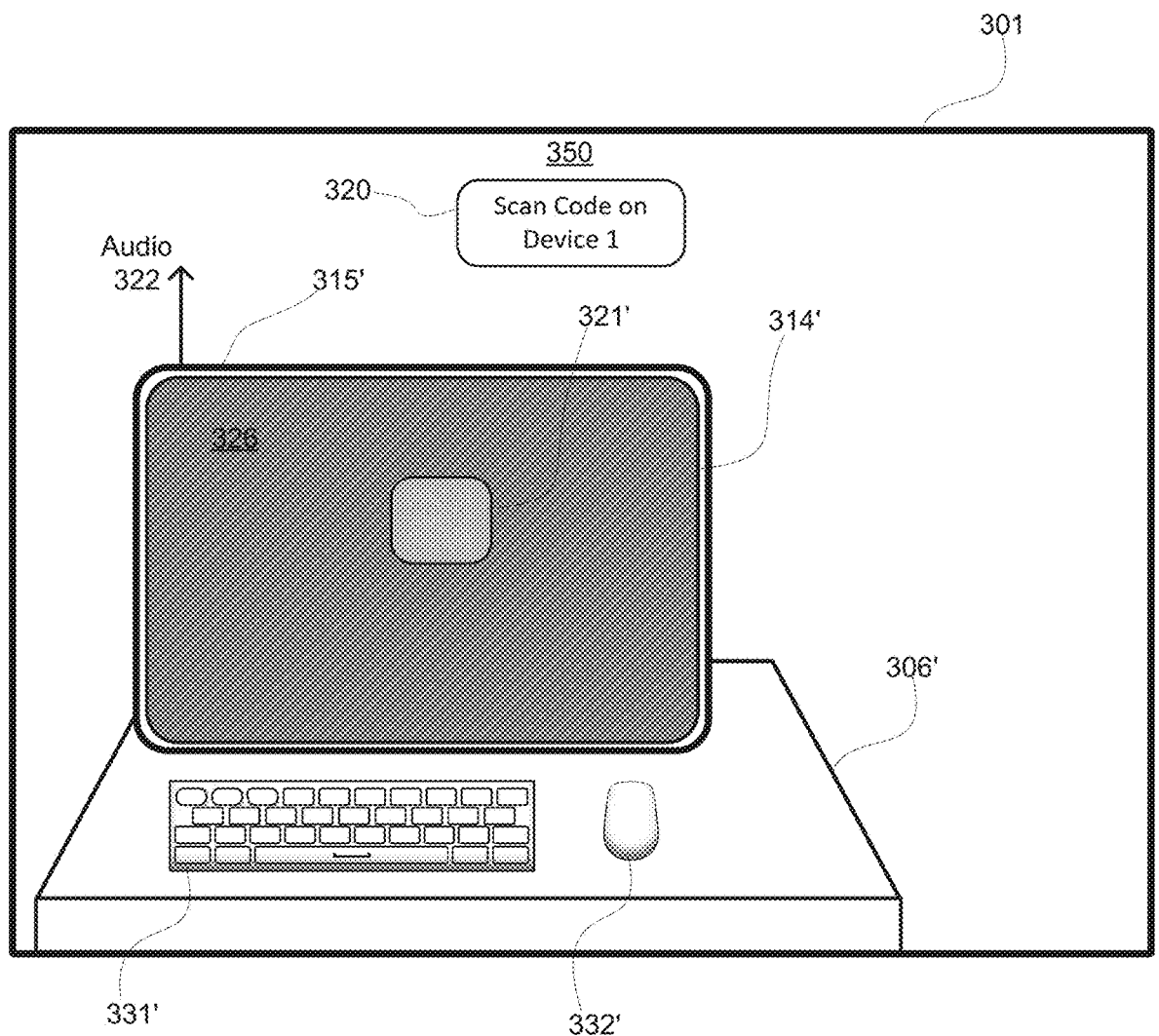

In some examples, initiating the process for pairing the second electronic device 315' with the first electronic device 301 includes transmitting a request for the pairing to the second electronic device 315' (e.g., directly to the second electronic device 315' or indirectly via a server (e.g., a wireless communications terminal in communication with the second electronic device 315')). In some examples, in response to receiving the request for the pairing, the second electronic device 315' transmits/outputs data (e.g., directly or indirectly) to the first electronic device 301 for pairing the first electronic device 301 with the second electronic device 315'. For example, as shown in FIG. 3B, the second electronic device 315' may transmit a representation of the contents displayed on display 314' such that the first electronic device 301 may visually identify the second electronic device 315' by matching the received representation with a portion of an image captured by the first electronic device 301. In another example, as shown in FIG. 3C, the second electronic device 315' displays, via the display 314', a unique identifier, which is visible in the three-dimensional environment 350 as a representation of the unique identifier 321', that is associated with the second electronic device 315' and that is detectable by the first electronic device 301. As shown in FIG. 3C, the unique identifier 321' is optionally a machine-readable image, such as a QR code, bar code, or other machine-readable code, that stores identification data for the second electronic device 315' that is detectable via one or more image sensors or cameras of the first electronic device 301. In some examples, the unique identifier 321' is optionally displayed at frequency that enables the unique identifier 321' to be detectable by the first electronic device 301, but not visible to the user of the first electronic device 301. In some examples, as shown in FIG. 3C, when the second electronic device 315' displays the unique identifier 321', the second electronic device 315' transmits an indication to the first electronic device 301 for prompting the user of the first electronic device 301 to locate the unique identifier 321'. For example, as shown in FIG. 3C, the indication causes the first electronic device 301 to display message element 320 that prompts the user of the first electronic device 301 to direct attention (e.g., including gaze) toward the unique identifier 321' that is displayed on the second electronic device 315' (e.g., "Scan Code on Device 1"), such that the first electronic device 301 may scan/access the identification data included in the unique identifier 321'. In some examples, when the attention of the user is drawn to the unique identifier 321' (and/or the unique identifier 321' remains in the user's field of view for more than a threshold amount of time, such as 1, 2, 3, 5, 10, 30, 45, 60, etc. seconds), such that the first electronic device 301 scans the unique identifier 321', the first electronic device 301 transmits confirmation data to the second electronic device 315' that causes the first electronic device 301 to be paired with the second electronic device 315'.

Additionally or alternatively, in some examples, the second electronic device 315' outputs audio that is detectable by the first electronic device 301 for pairing the first electronic device 301 with the second electronic device 315'. For example, as shown in FIG. 3C, the second electronic device 315' outputs audio 322, which may be output with a frequency that is detectable by the first electronic device 301 (e.g., and which may or may not be audible to the user of the first electronic device 301). In some examples, when the audio 322 is detected by the first electronic device 301, the first electronic device 301 transmits confirmation data to the second electronic device 315' that causes the first electronic device 301 to be paired with the second electronic device 315'. Additionally or alternatively, in some examples, the second electronic device 315' emits infrared light 326, such as via the display 314', that is detectable by the first electronic device 301 for pairing the first electronic device 301 with the second electronic device 315'. In some examples, the infrared light 326 may not be visible to the user of the first electronic device 301. In some examples, when the infrared light 326 is detected by the first electronic device 301 (e.g., via one or more infrared sensors or other image sensors), the first electronic device 301 transmits confirmation data to the second electronic device 315' that causes the first electronic device 301 to be paired with the second electronic device 315'.

Figure 3D:
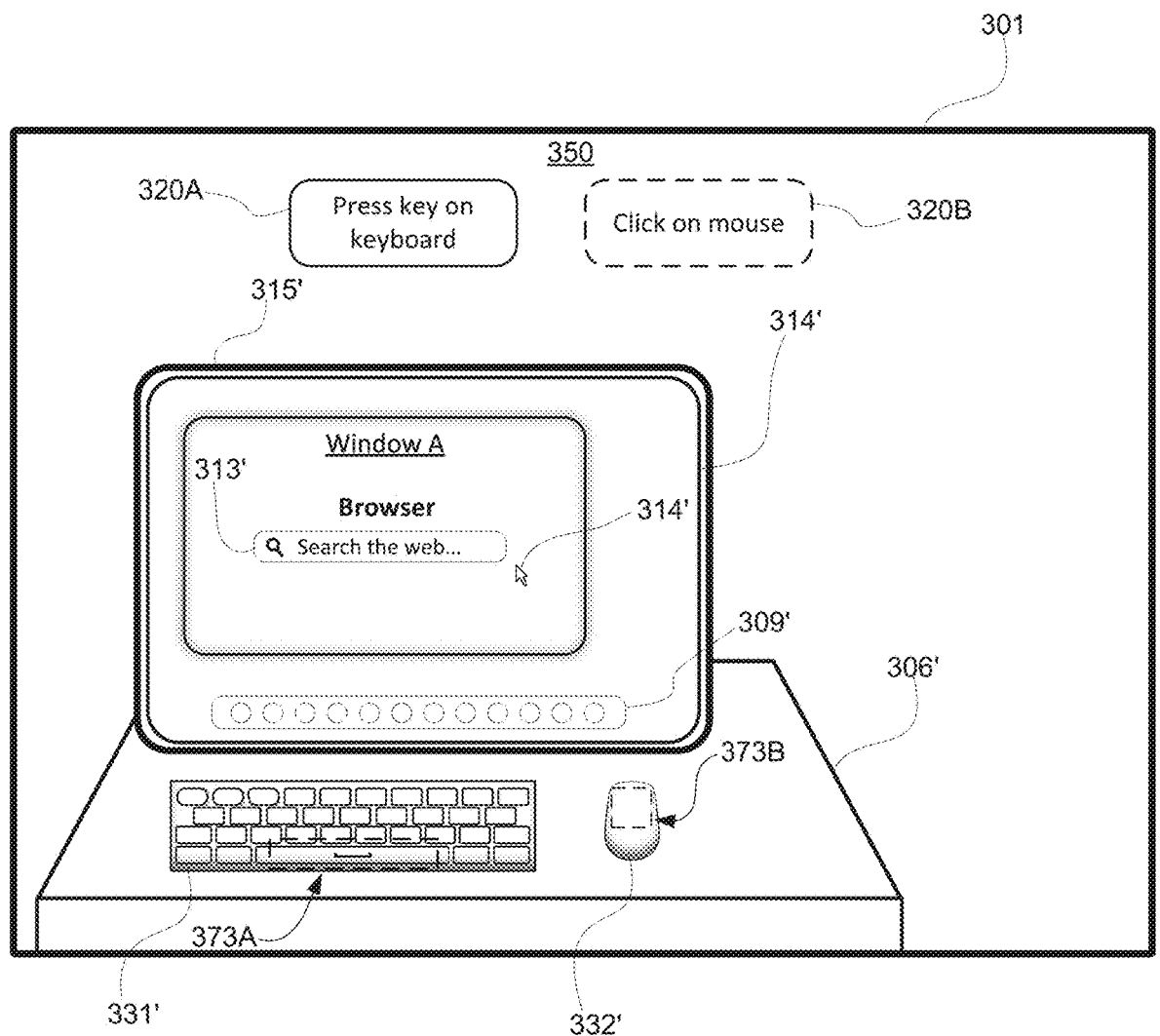

In some examples, as shown in FIG. 3D, the second electronic device 315' transmits a request to the first electronic device 301 for prompting the user of the first electronic device 301 to provide input that is detectable by the second electronic device 315' for pairing the first electronic device 301 with the second electronic device 315'. For example, as shown in FIG. 3D, the request causes the first electronic device 301 to display instructional element 320A and/or instructional element 320B prompting the user of the first electronic device 301 to provide input via the one or more input devices 331'/332'. As an example, in FIG. 3D, the instructional element 320A includes instructions (e.g., "Press key on keyboard") that prompt the user of the first electronic device 301 to provide a selection input directed to the keyboard 331' that is in communication with the second electronic device 315'. In some examples, the user is prompted to select a particular key on the keyboard 331'. In some examples, as shown in FIG. 3D, the instructional element 320B includes instructions (e.g., "Click on mouse") that prompt the user of the first electronic device 301 to provide a selection input directed to the mouse 332' that is in communication with the second electronic device 315'.

Figure 3E:
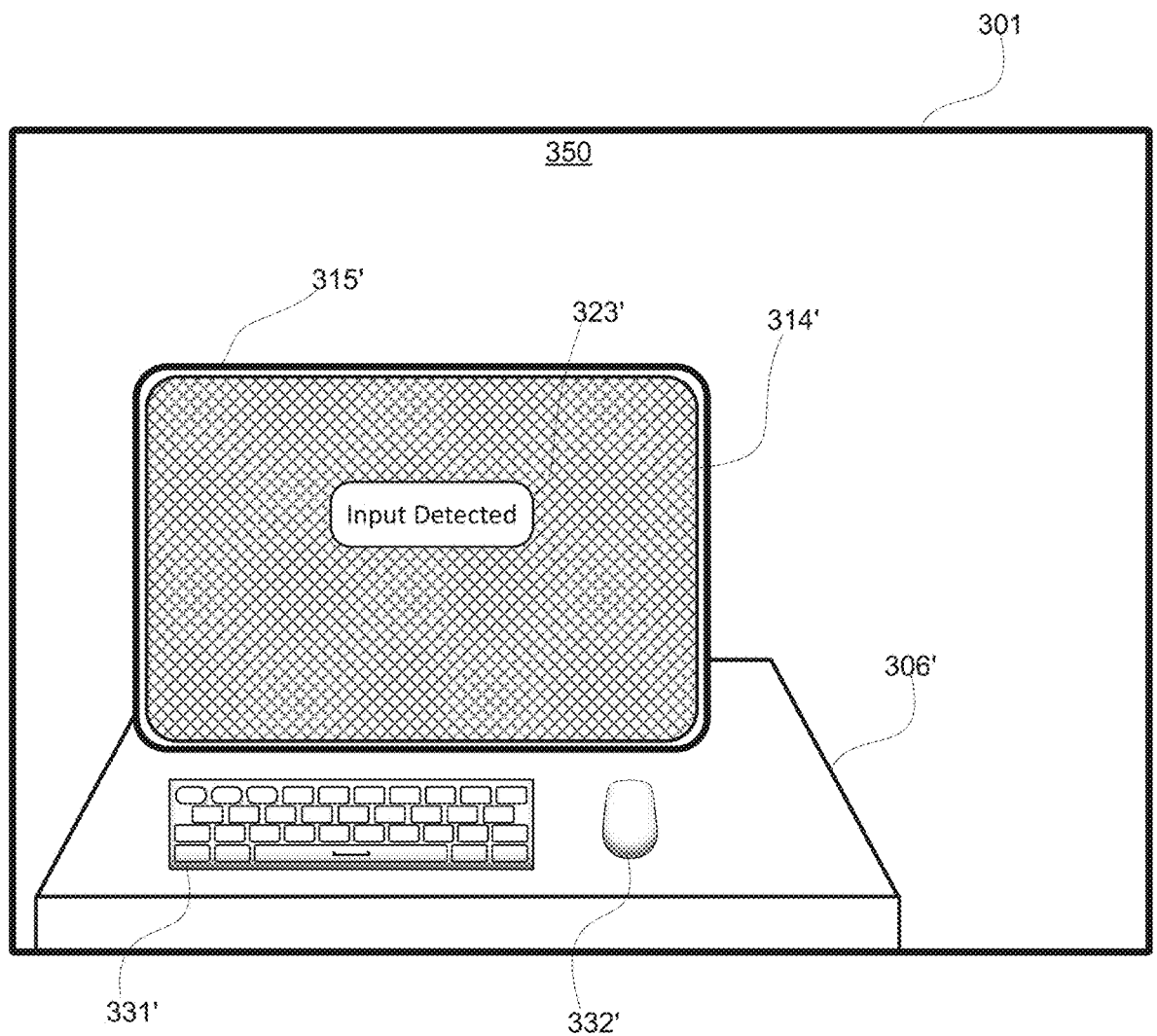

In FIG. 3D, the second electronic device 315' detects a selection input 373A directed to the keyboard 331' and/or a selection input 373B directed to the mouse 332'. For example, the second electronic device 315' detects a press of a key on the keyboard 331' and/or a press of a button on the mouse 332' (or a tap on a touch-sensitive surface of the mouse 332') that is provided by the user of the first electronic device 301. In some examples, as shown in FIG. 3E, in response to detecting the selection input 373A and/or the selection input 373B, the second electronic device 315' provides confirmation that the selection input 373A and/or the selection input 373B was detected. For example, as shown in FIG. 3E, the second electronic device 315' displays, via the display 314', a confirmation message, which is visible in the three-dimensional environment 350 as the confirmation message 323', indicating that the inputs discussed above were successfully detected (e.g., "Input Detected"), which enables the first electronic device 301 to be paired with the second electronic device 315'.

In some examples, the first electronic device 301 initiates the process for pairing the second electronic device 315' with the first electronic device 301 according to the examples discussed above in accordance with a determination that one or more criteria are satisfied. In some examples, the one or more criteria include a criterion that is satisfied in accordance with a determination that the second electronic device 315' is in condition for displaying a user interface via a virtual extended display. In some examples, the one or more criteria include a criterion that is satisfied in accordance with a determination that the second electronic device 315' is detected by one or more sensors of the first electronic device 301 (e.g., when the second electronic device is captured by one or more image sensors or cameras of the first electronic device). In some examples, the one or more criteria include a criterion that is satisfied in accordance with a determination that the second electronic device 315' is configured to be able to communicate with the first electronic device 301 (e.g., once a wired or wireless communication channel is established). In some examples, the one or more criteria include a criterion that is satisfied in accordance with a determination that the second electronic device 315' is a qualifying electronic device (e.g., some electronic devices may have capability for operating in the context of an extended virtual display, but other electronic devices may not). In some examples, the one or more criteria include a criterion that is satisfied in accordance with a determination that the first and second electronic devices are authorized to share information (e.g., privacy settings, user information, user data, etc.), such as if the first electronic device 301 and the second electronic device 315' belong to a same user and/or are associated with a same user account that is logged into the electronic devices. In some examples, some or all of the above criteria must be satisfied for the first electronic device 301 to be paired with the second electronic device 315'.

In some examples, the first electronic device 301 may be paired with the second electronic device 315' without following the exemplary processes discussed above. For example, in FIG. 3B, in response to detecting the selection of the first indication 317-1, the first electronic device 301 transmits the request to pair with the second electronic device 315', and if the one or more criteria above are satisfied, the first electronic device 301 automatically pairs with the second electronic device 315'. In some examples, the first electronic device 301 and the second electronic device 315' may be paired via any suitable communication means, such as via Bluetooth, Wi-Fi, etc.

Figure 3F:
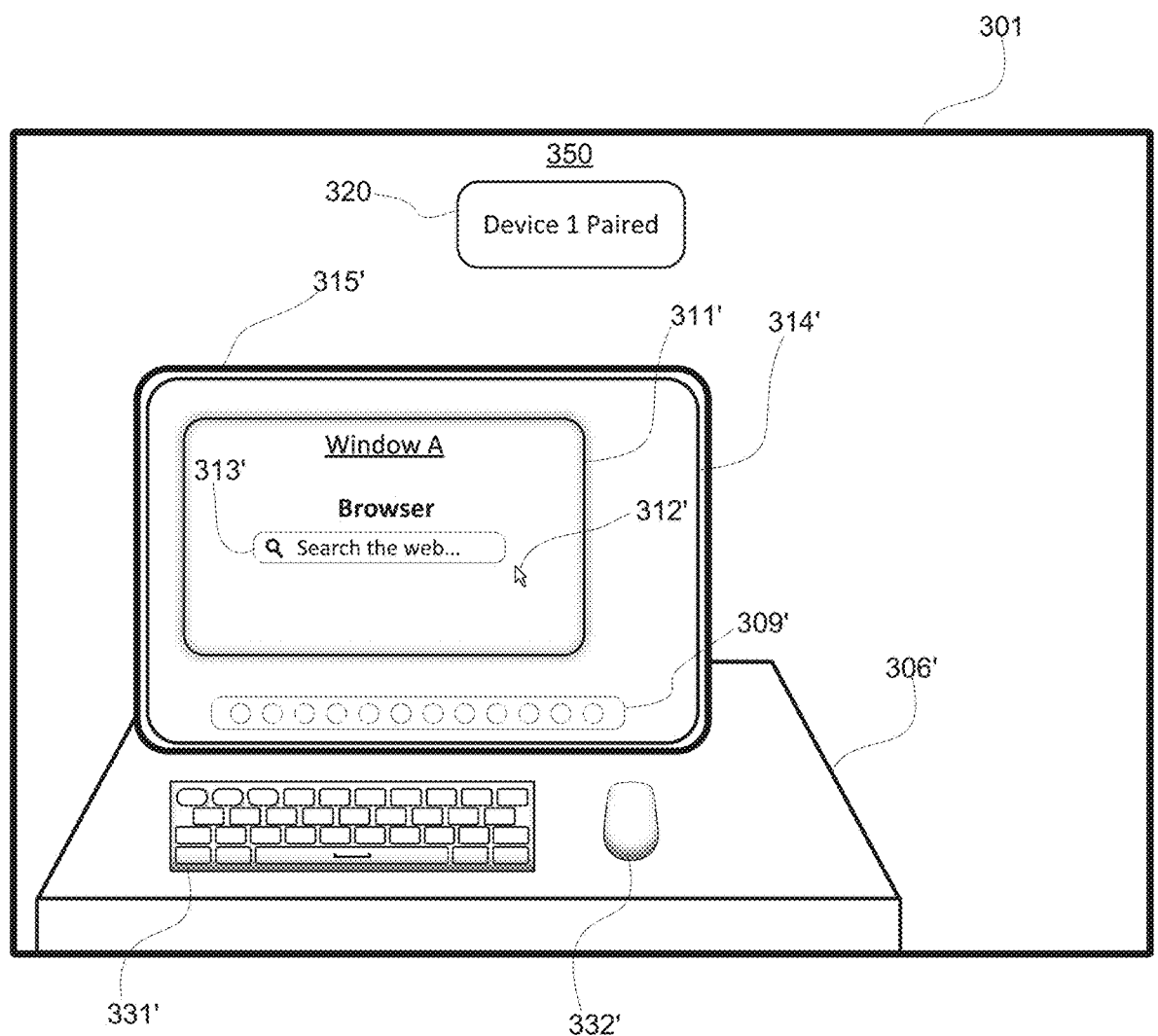
Figure 3G:
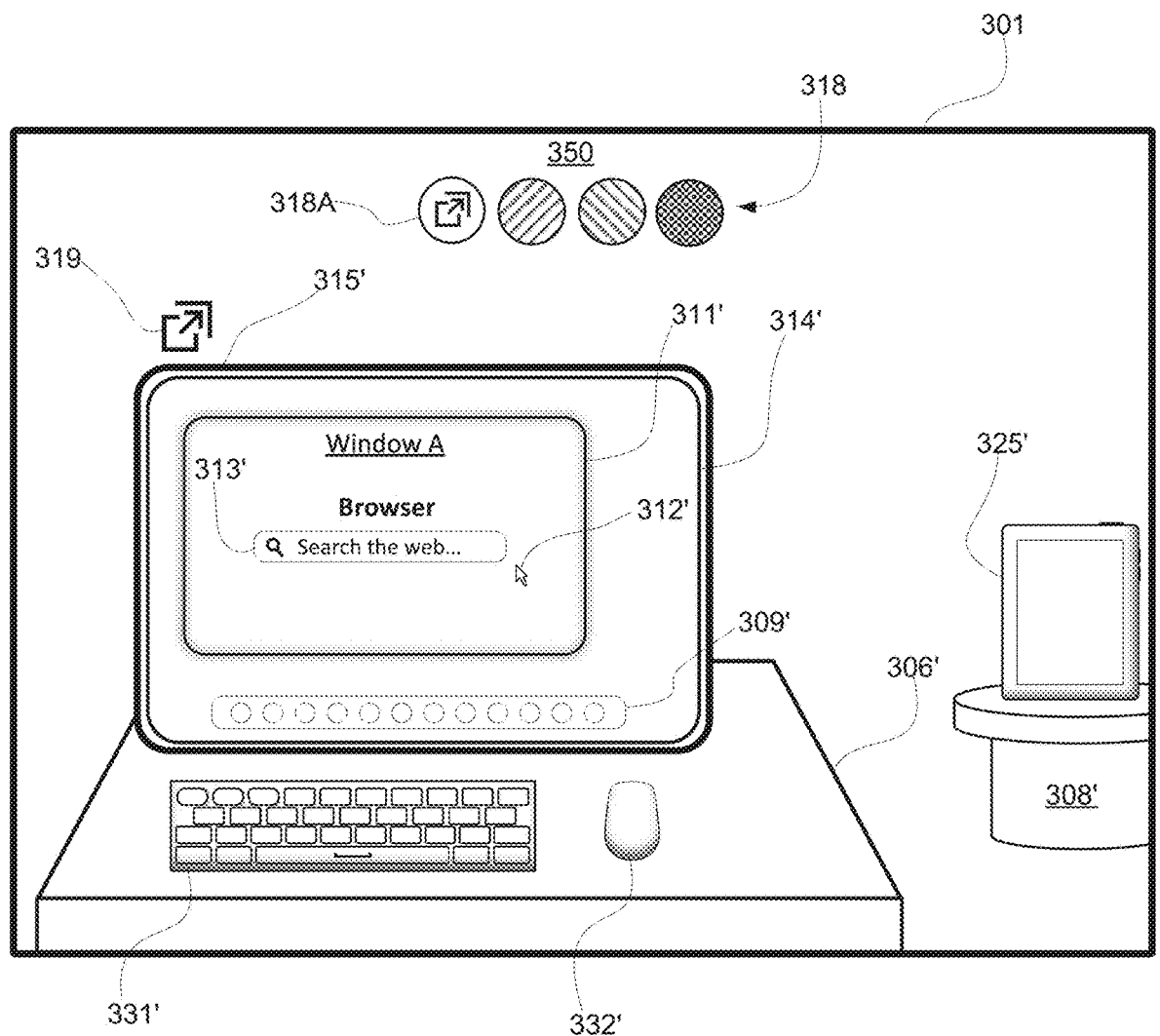

In some examples, as shown in FIG. 3F, when the first electronic device 301 is paired with the second electronic device 315' as described above, the first electronic device 301 displays a message element 320 (e.g., notification) alerting the user of the first electronic device 301 that the first electronic device 301 is paired with the second electronic device 315' (e.g., "Device 1 Paired"). In some examples, after the first electronic device 301 is paired with the second electronic device 315', the first electronic device 301 initiates a process for displaying a virtual extended display that is associated with the second electronic device 315'. For example, in FIG. 3G, while the first electronic device 301 is in communication with the second electronic device 315' and the second electronic device 315' is in the field of view of the user of the first electronic device 301, the first electronic device 301 displays a first affordance 319 in the three-dimensional environment 350, wherein the first affordance 319 is selectable for displaying a virtual extended display for the second electronic device 315'. In some examples, as shown in FIG. 3G, the first affordance 319 may be presented in proximity to an edge of the display of the second electronic device 315' (e.g., within a threshold distance (e.g., 1, 2, 3, 5, 8, 10, 15, 20, 30, etc. cm) of the edge of the display). For example, as shown in FIG. 3G, the first affordance 319 is presented above the second electronic device 315' in the three-dimensional environment 350 (e.g., within the threshold distance of a corner of the display 314' of the second electronic device 315'). In some examples, the first affordance 319 may be presented at a depth within the three-dimensional environment 350 such that it appears in the same plane as the display 314' of the second electronic device 315'.

In some examples, the first affordance 319 may be positioned differently within the three-dimensional environment 350. For example, the first affordance 319 may be presented on, near, below or in front of the second electronic device 315' and/or at other locations (e.g., a predefined distance away from the second electronic device) within the three-dimensional environment 350. Additionally or alternatively, in some examples, the first affordance may be displayed at a predefined region of the display of the first electronic device 301 (e.g., and irrespective of the location of the second electronic device 315' in the three-dimensional environment 350). For example, as shown in FIG. 3G, the first affordance may be displayed within a plurality of system options 318 as a first system option 318A. In some examples, as shown in FIG. 3G, the plurality of system options 318 are displayed centrally along a top edge of the display of the first electronic device 301. In some examples, the plurality of system options 318, other than the first system option 318A, are selectable to access one or more settings of the first electronic device 301, such as display settings (e.g., brightness levels and/or immersive content levels) and/or audio settings (e.g., volume levels), and/or to access one or more applications of the first electronic device 301, such as via a home user interface.

In some examples, the second electronic device 315' may present an affordance via display 314' that is selectable (e.g., using keyboard 331', mouse 332', an input of first electronic device 301, or the like) to initiate display of a virtual extended display by the second electronic device 315. For example, the second electronic device 315' may provide an affordance that is different, similar, or identical to first affordance 319 within a settings or other application that is selectable to cause the second electronic device 315' to transmit a request to the first electronic device 301 to display a virtual extended display.

In some examples, as shown in FIG. 3G, the physical environment surrounding the first electronic device 301 may include a third electronic device 325 which is positioned atop coffee table 308. For example, the representation of the third electronic device 325' and the representation of the coffee table 308' are visible in the three-dimensional environment 350, as shown in FIG. 3G. In some examples, the third electronic device 325 may be a mobile electronic device, such as a cellular electronic device or a tablet computer. As shown in FIG. 3G, the third electronic device 325 is optionally not paired with the first electronic device 301. Alternatively, in FIG. 3G, the third electronic device 325 is optionally paired with the first electronic device 301 but may not have capability for operating in the context of an extended virtual display. Accordingly, as shown in FIG. 3G, the representation of the third electronic device 325' is not displayed with an affordance (e.g., either in proximity to the representation of the third electronic device 325' or among the plurality of system options 318) that is selectable to display an extended virtual display for the third electronic device 325.

Figure 3H:
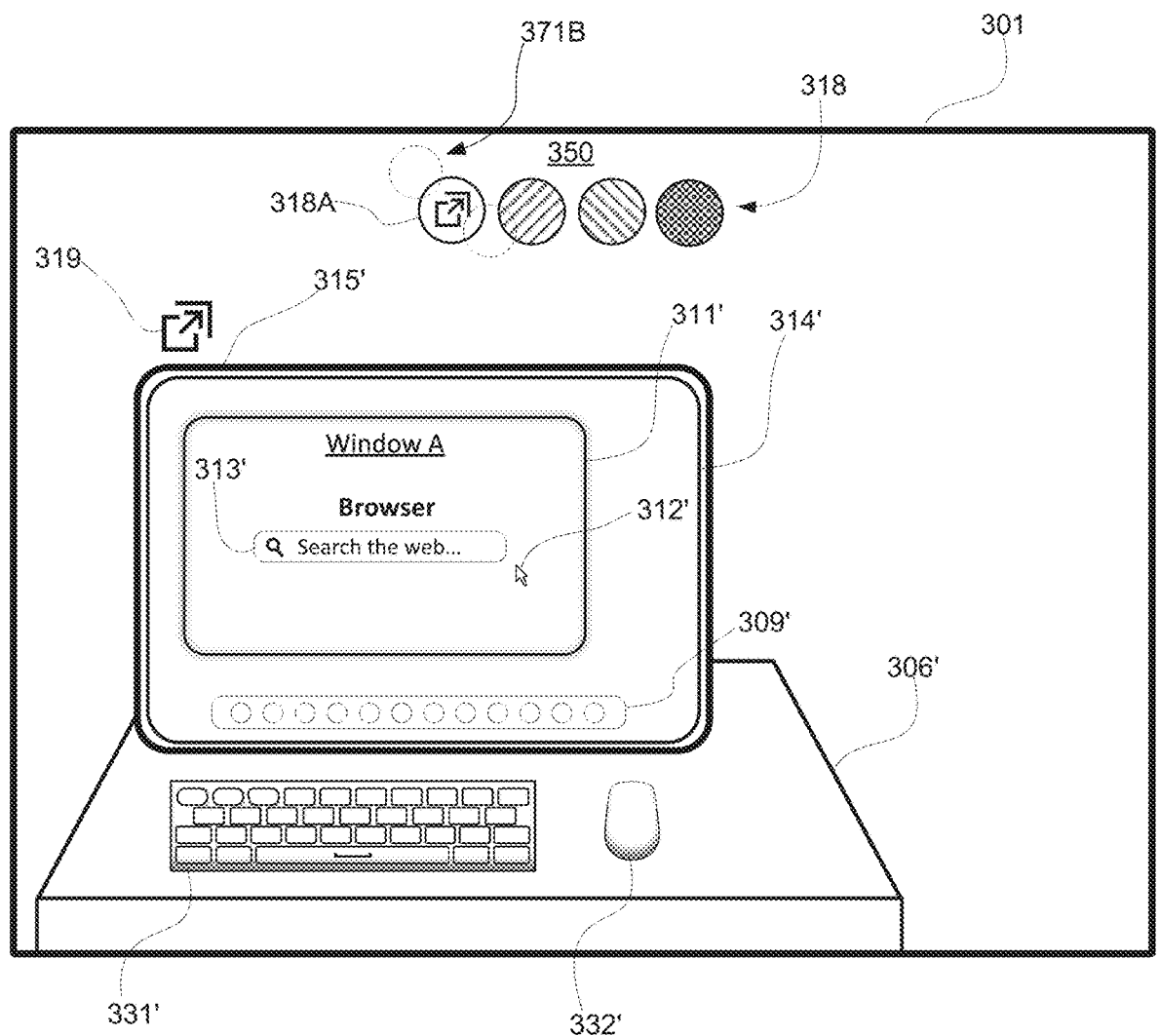

In FIG. 3H, the first electronic device 301 detects a selection input 371B directed to the first system option 318A discussed above. For example, the first electronic device 301 detects an air pinch gesture, a tap or touch gesture, a verbal command, a gaze dwell, etc. corresponding to a selection of the first system option 318A. In some examples, as shown in FIG. 3I, in response to detecting the selection of the first system option 318A, first affordance 319, or other affordance to initiate a virtual extended display, the first electronic device 301 presents a virtual extended display 304 that is associated with the second electronic device 315' in the three-dimensional environment 350 (e.g., and that is not associated with the third electronic device 325' discussed above).

Figure 3I:
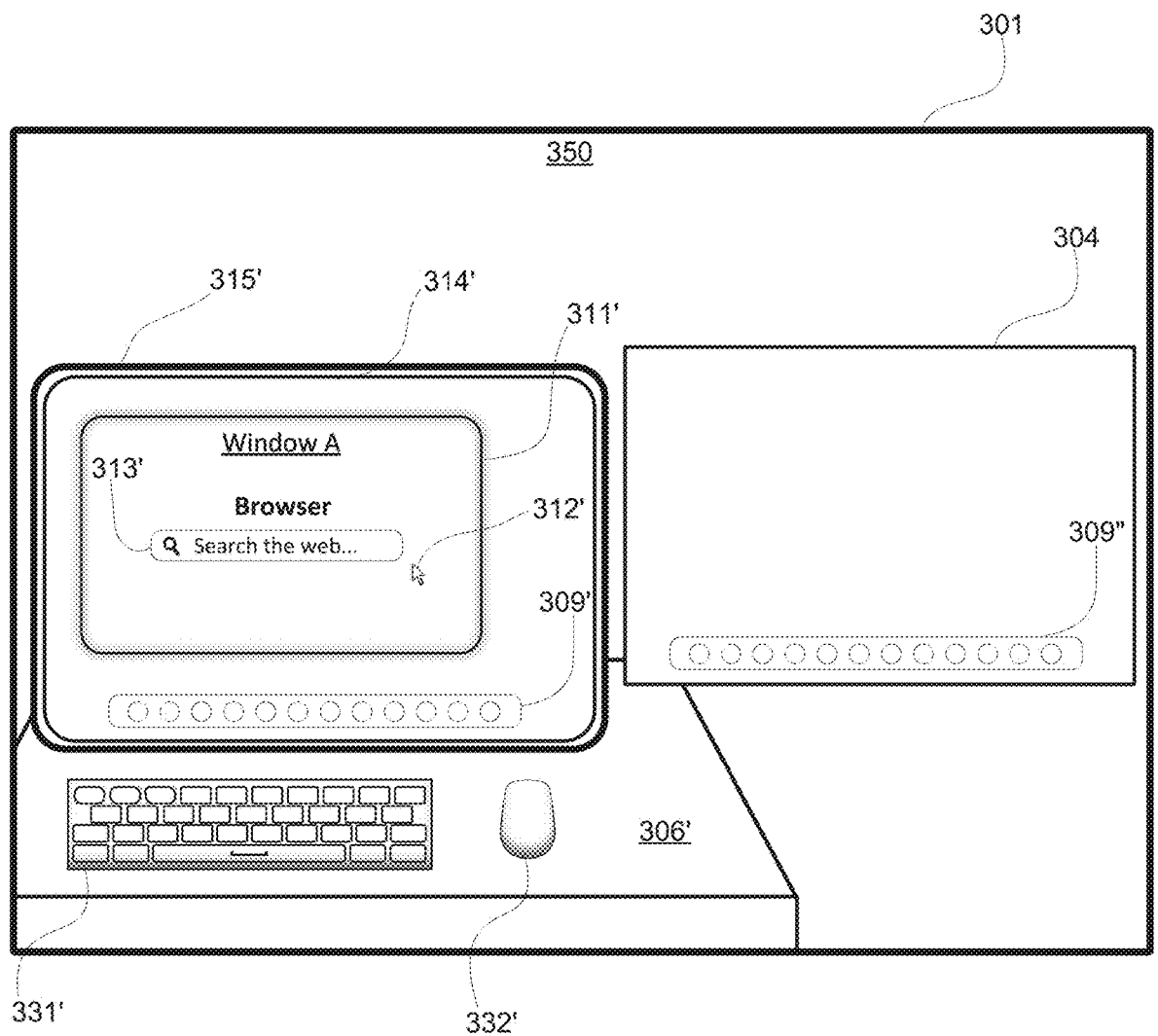

In some examples, as shown in FIG. 3I, the virtual extended display 304 functions as a second (e.g., virtual) display for the second electronic device 315'. For example, as shown in FIG. 3I, the virtual extended display includes a representation of the dock 309" that is displayed on the display 314' of the second electronic device 315'. In some examples, as discussed herein, the virtual extended display 304 is configured to display one or more user interfaces (e.g., application windows), content, and/or other user interface elements of the second electronic device 315' that may or may not also be displayed on the display 314'. Additionally, in some examples, the cursor 312' is controllable via the mouse 332' to be movable between the display 314' of the second electronic device 315' and the virtual extended display 304. In some examples, as discussed herein below, user input detected via the keyboard 331' and/or the mouse 332' may be directed to a user interface of the display 314' or a user interface of the virtual extended display 304 depending on a location of the gaze of the user of the first electronic device 301. Attention is now directed to exemplary interactions with a virtual extended display for an electronic device in a three-dimensional environment.

In some examples, when the first electronic device 301 presents the virtual extended display 304 in the three-dimensional environment 350, the display 314' of the second electronic device 315' may be turned off (e.g., the second electronic device 315' enters a low power mode or sleep state or powers off, such that the second electronic device 315' is no longer displaying a user interface via the display 314'). For example, the second electronic device 315' (e.g., automatically) powers down the display 314' after the first electronic device 301 is paired with the second electronic device 315' and after the first electronic device 301 generates and displays the virtual extended display 304 in the three-dimensional environment 350. In some examples, the display 314' of the second electronic device 315' may be turned off when the first electronic device 301 initiates the processes discussed above for pairing the first electronic device 301 and the second electronic device 315'. In such a scenario, the display 314' of the second electronic device 315' may be powered on for the pairing process (e.g., to display the unique identifier 321' and/or the confirmation message 323').

Figure 4A:
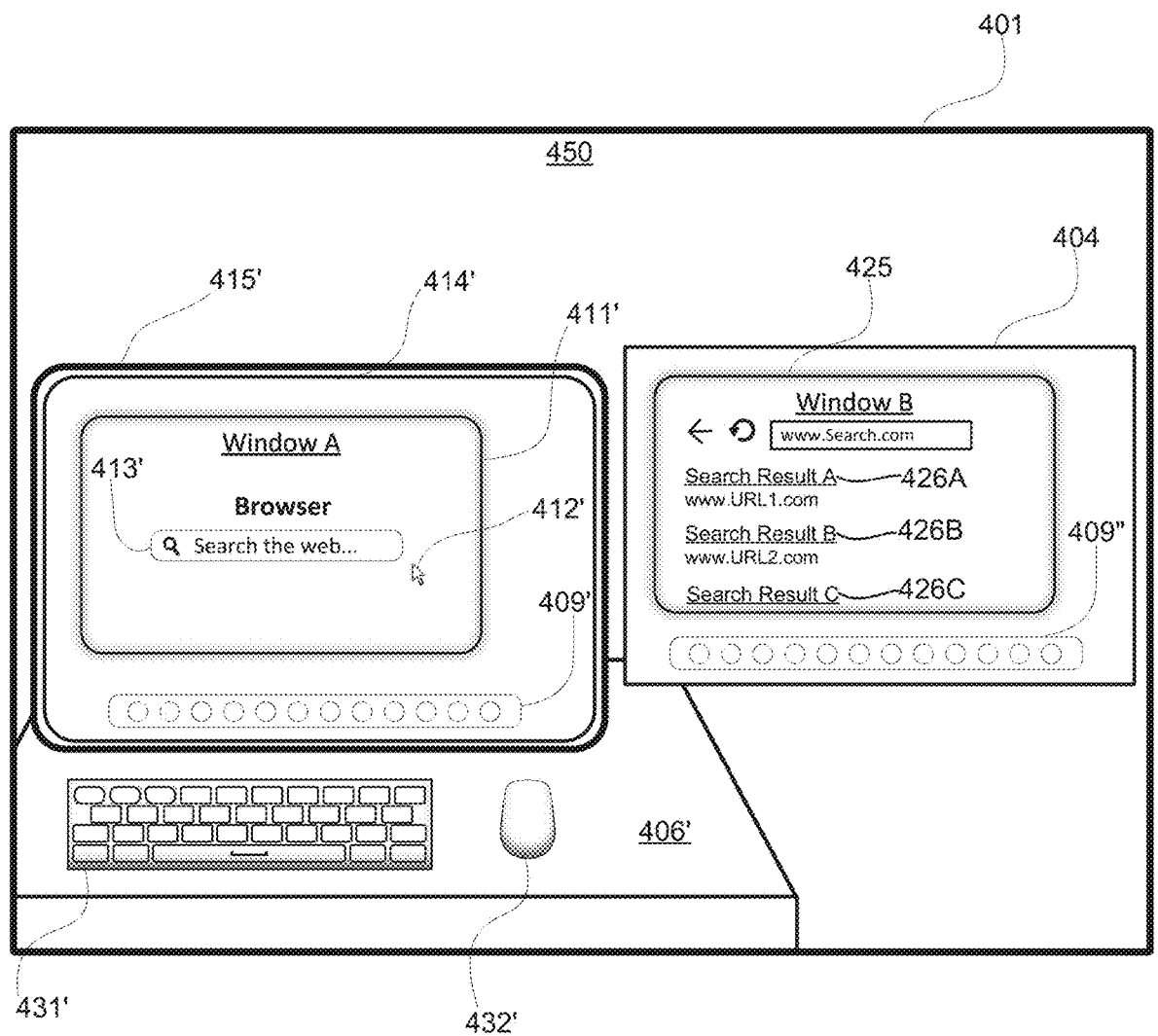
FIGS. 4A-4O illustrate examples of a first electronic device facilitating interactions with a representation of a user interface of a second electronic device in a three-dimensional environment according to some examples of the disclosure.
Figure 4B:
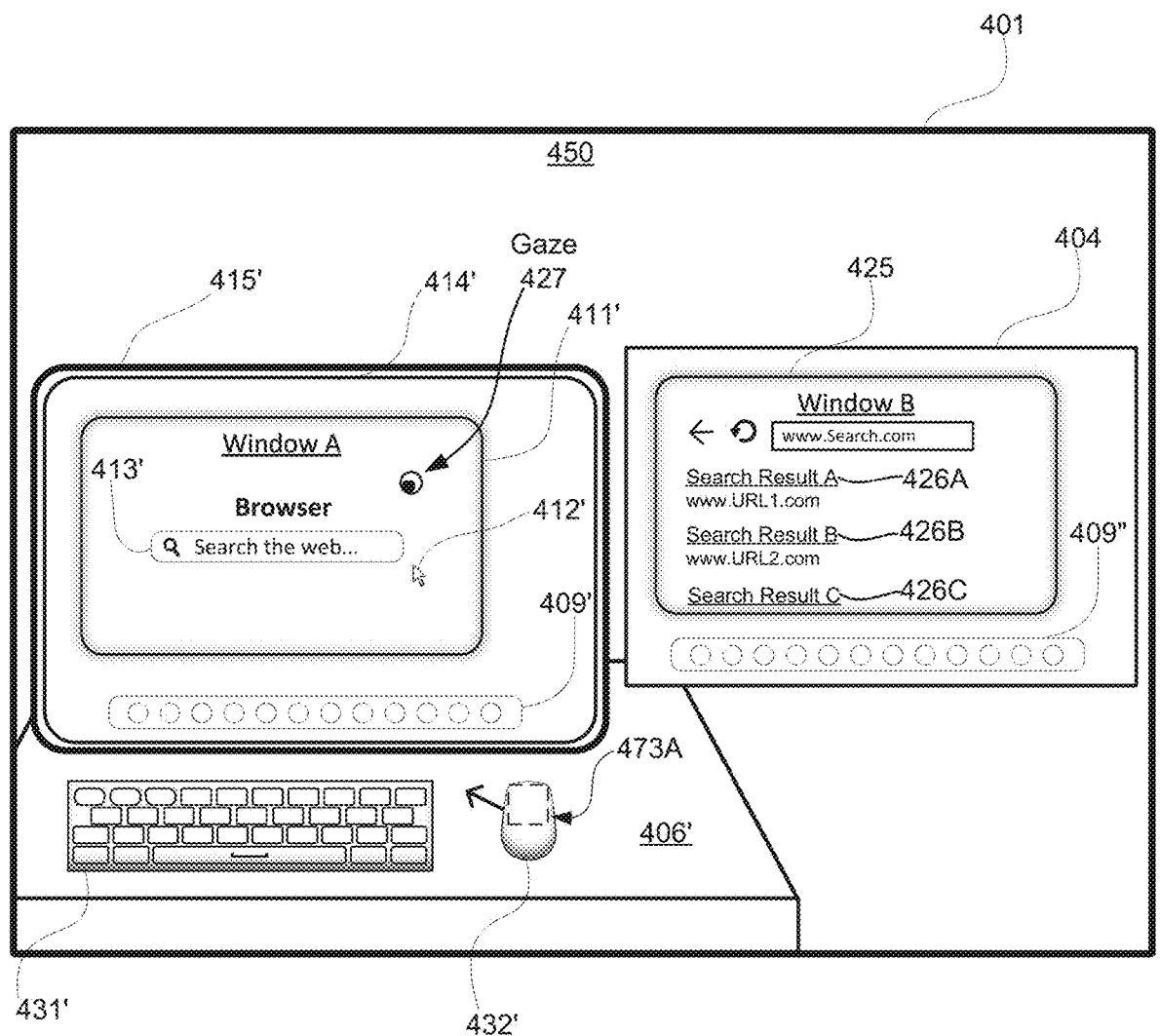
Figure 4C:
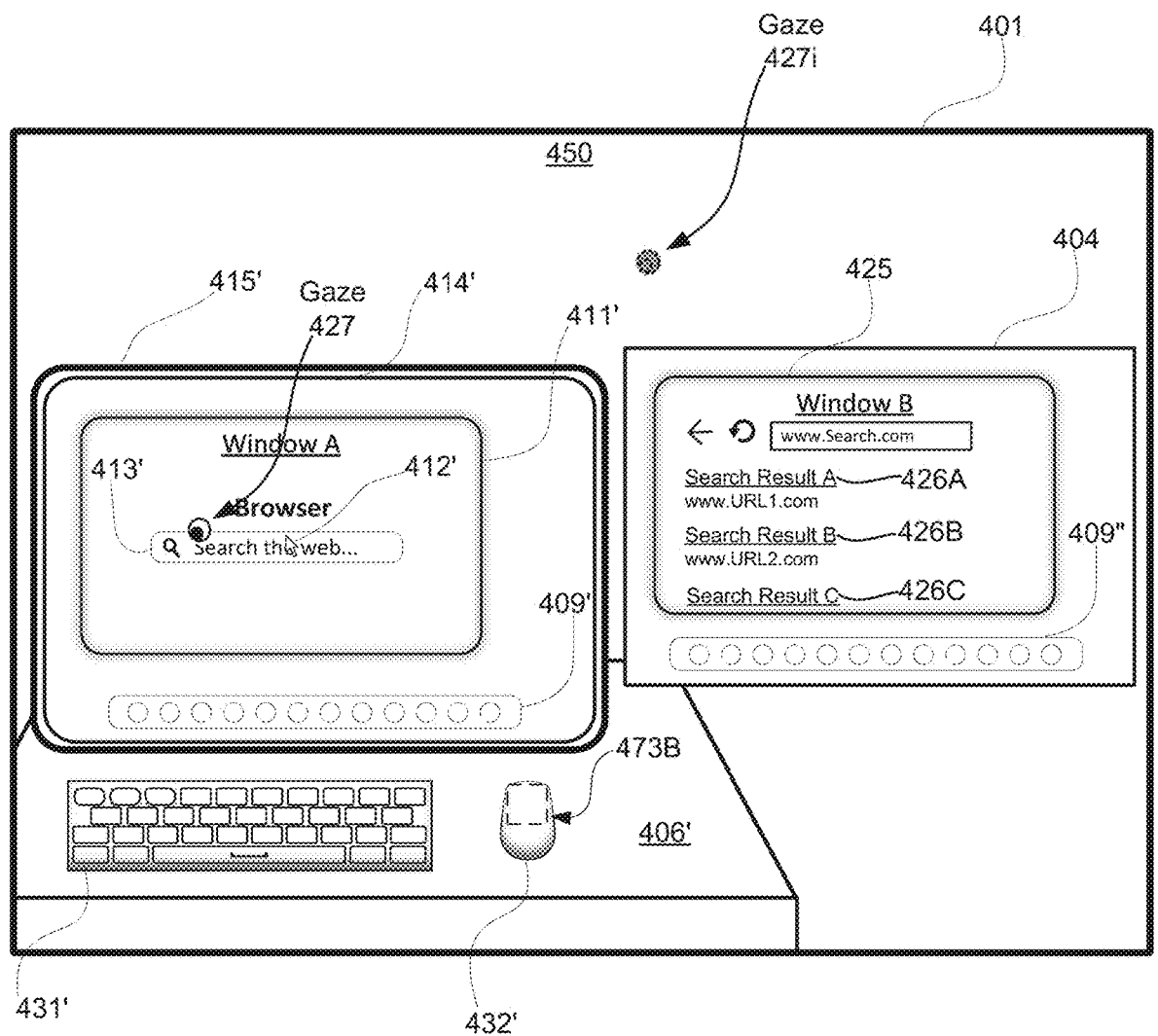
Figure 4D:
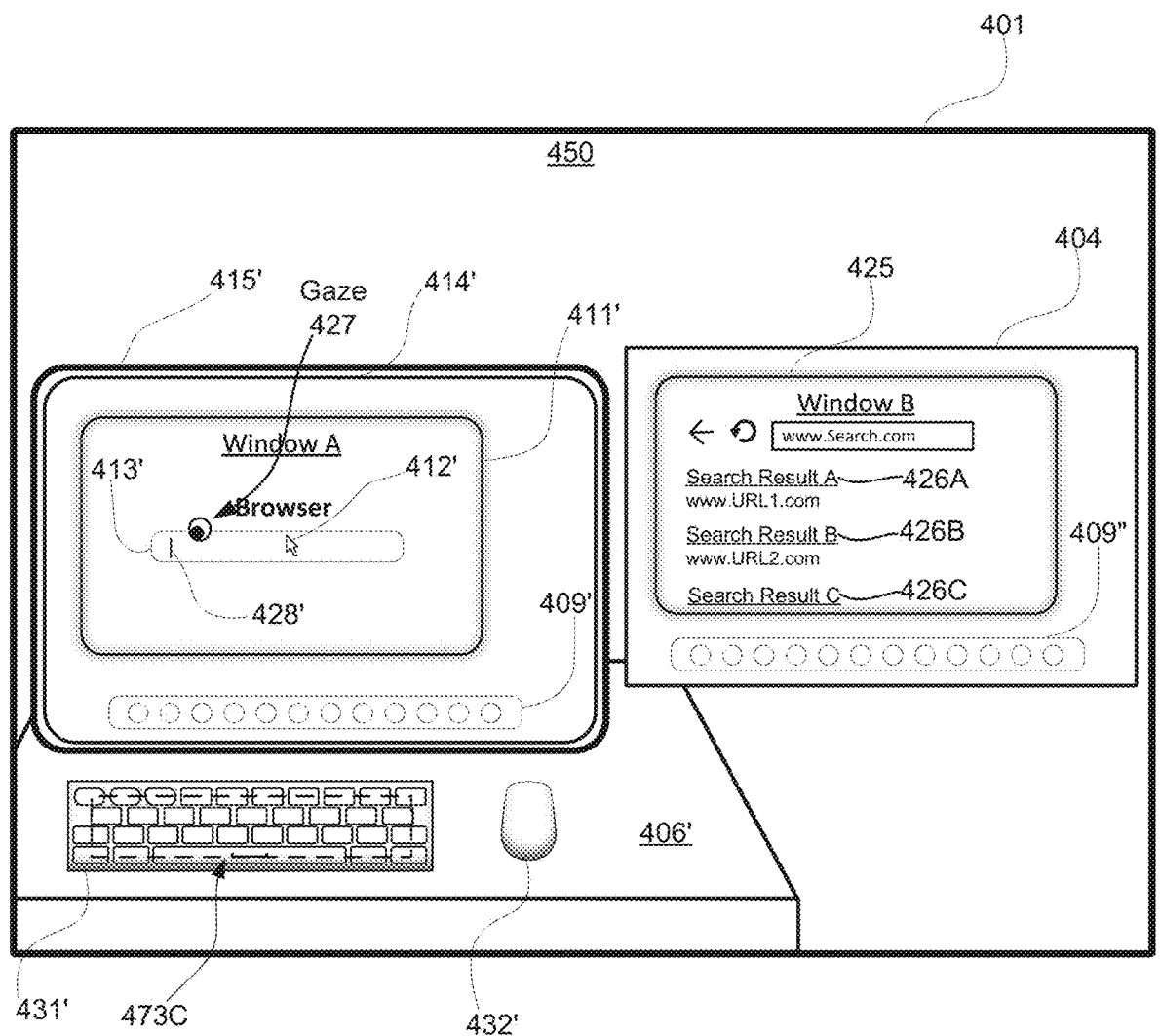
Figure 4E:
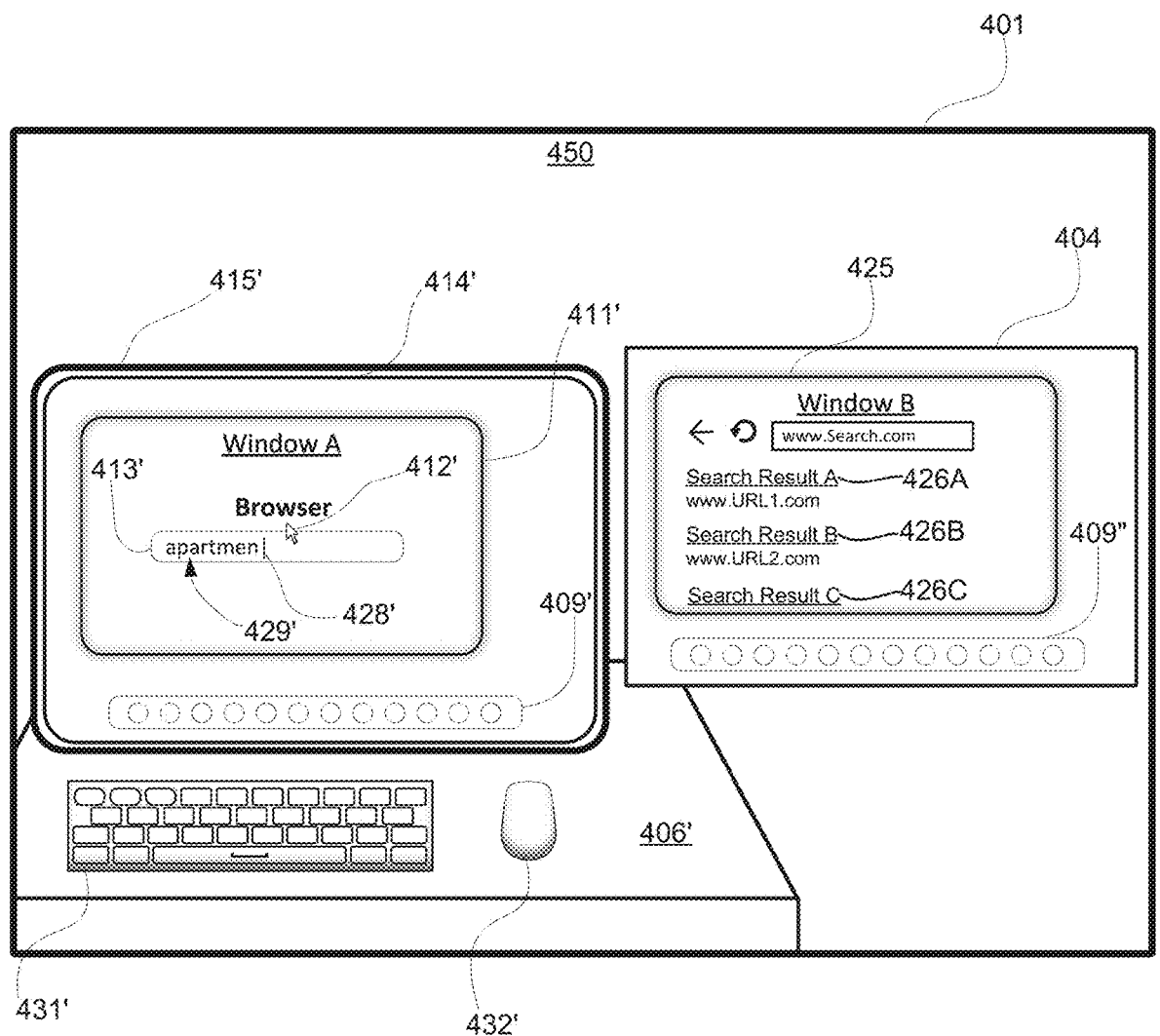
Figure 4F:
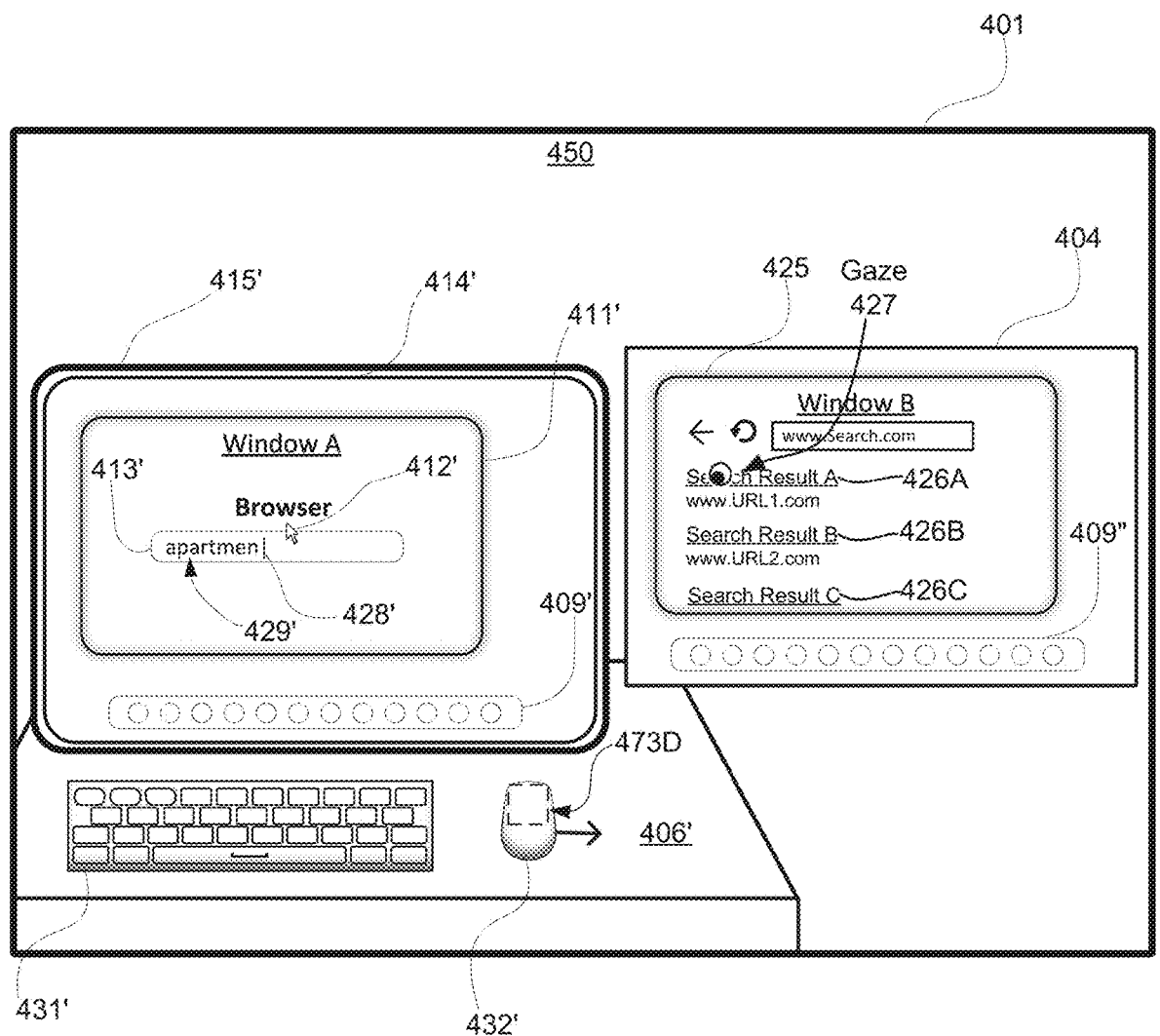
Figure 4G:
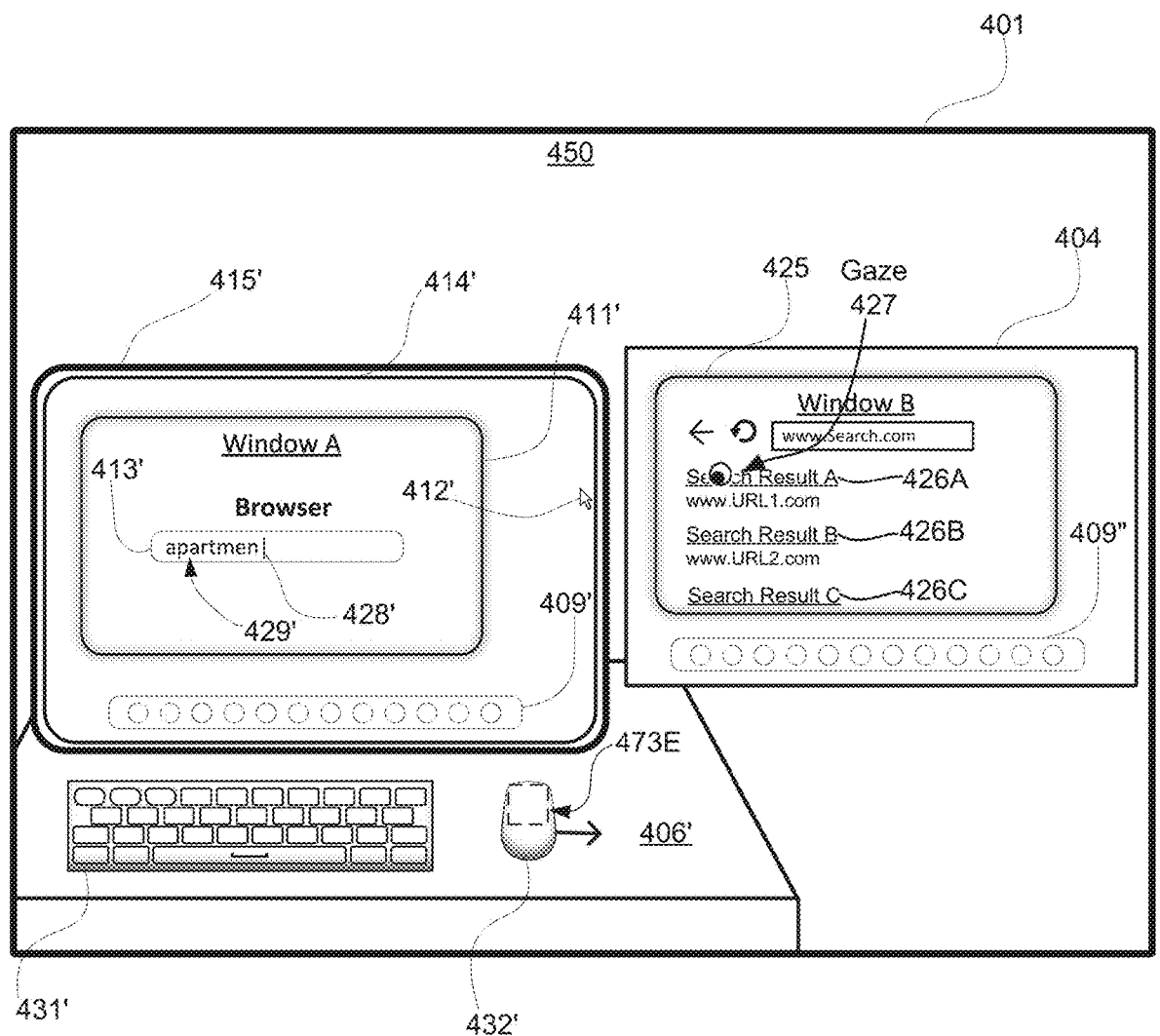
Figure 4H:
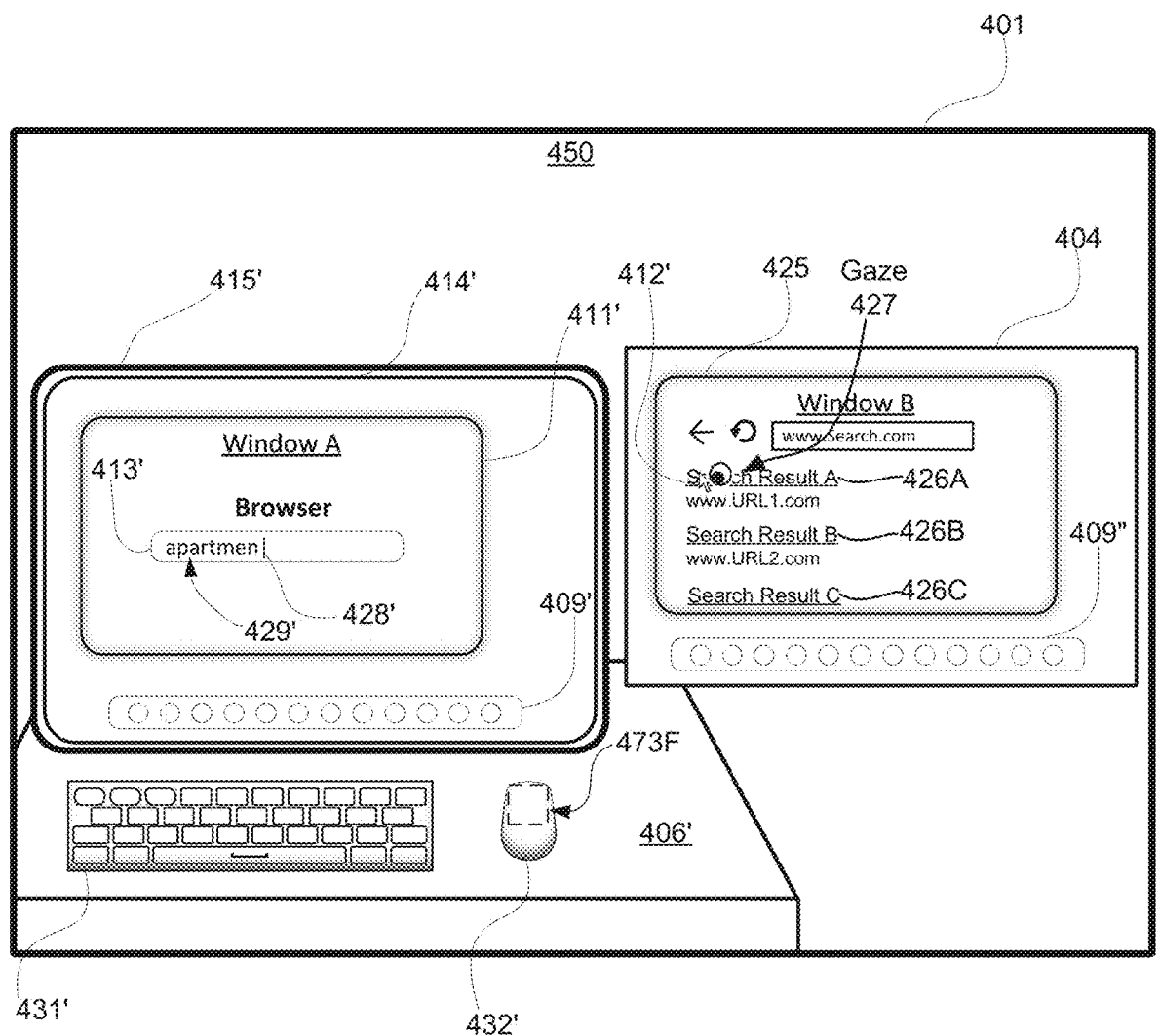
Figure 4I:
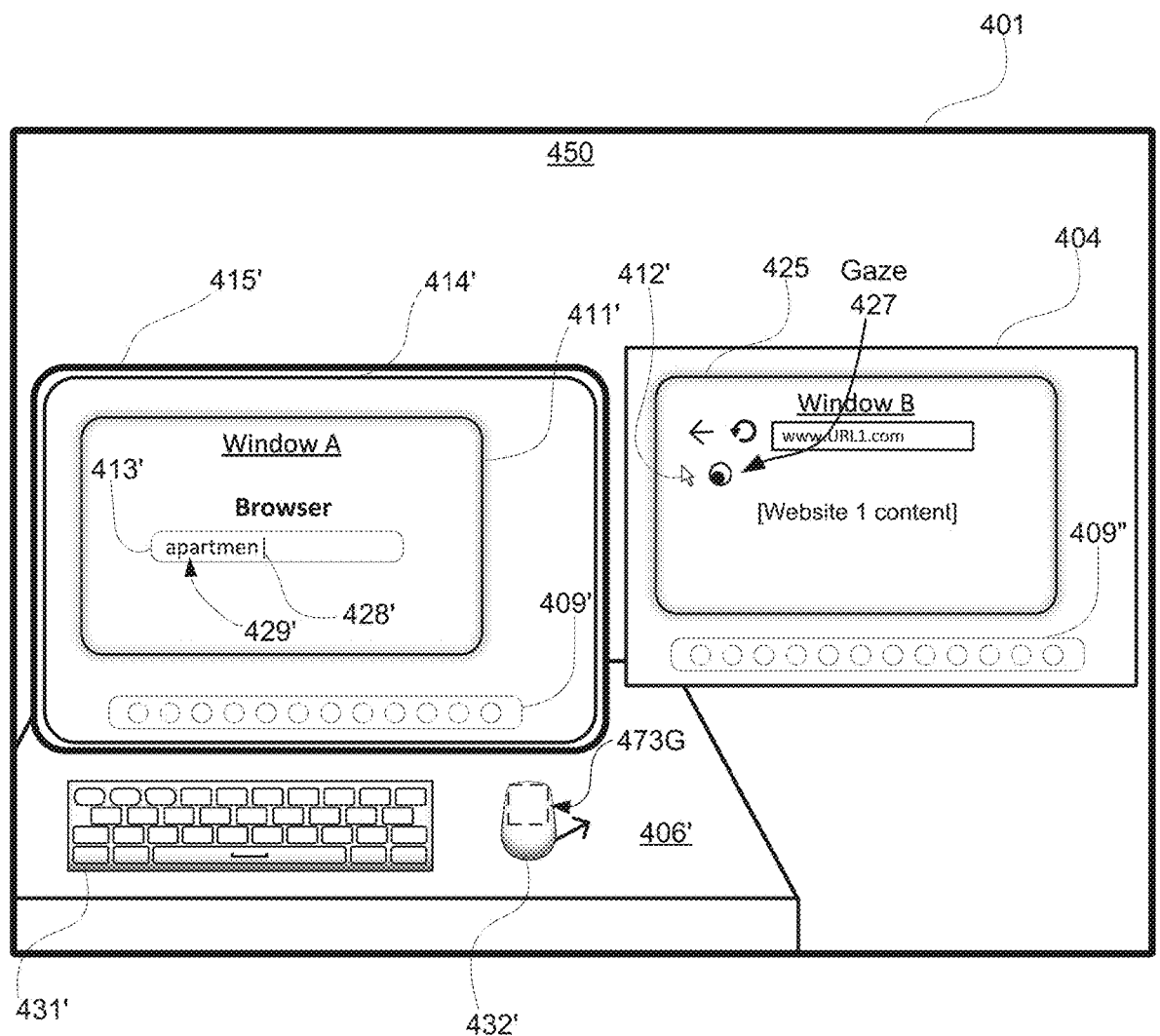
Figure 4J:
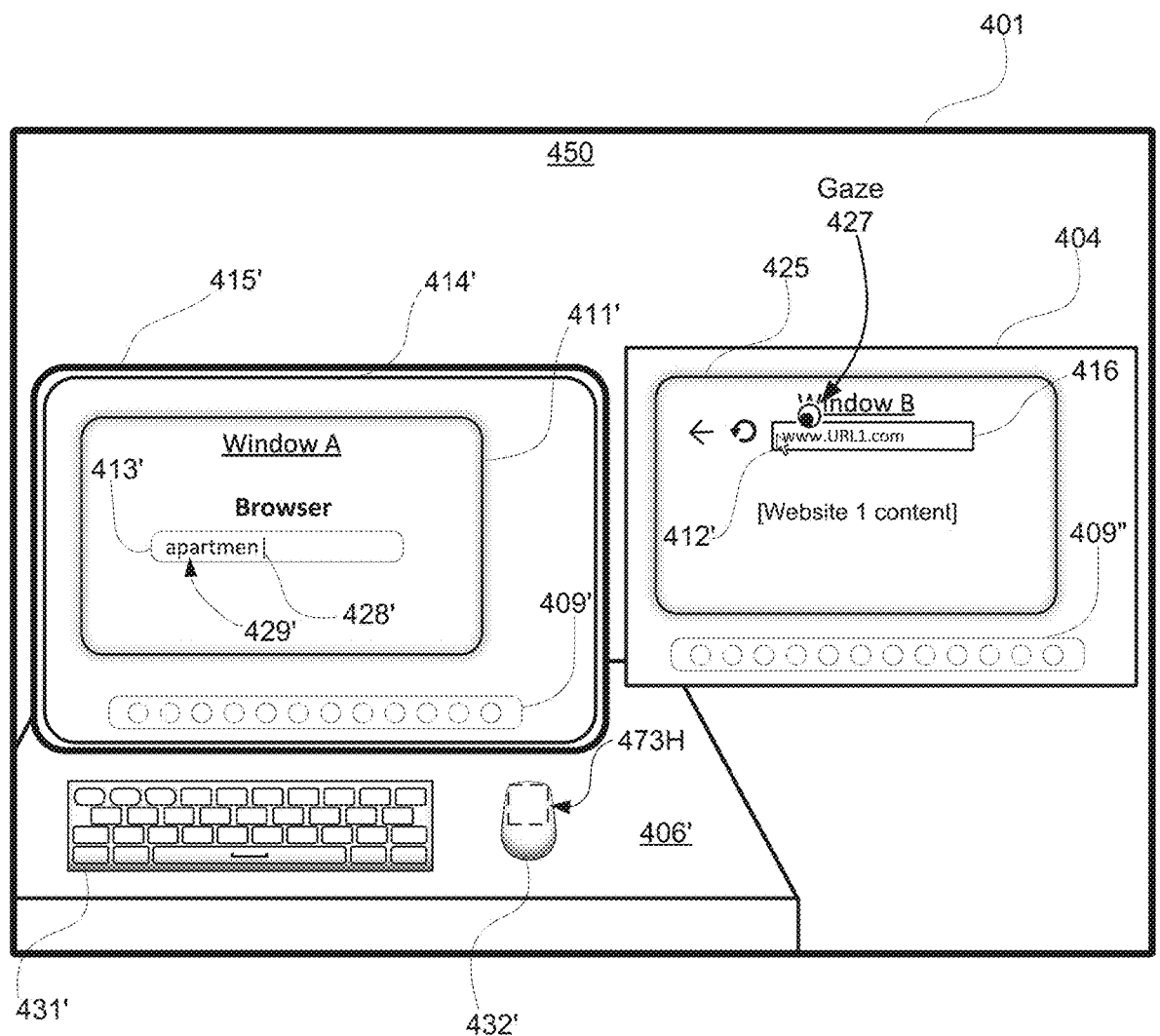
Figure 4K:
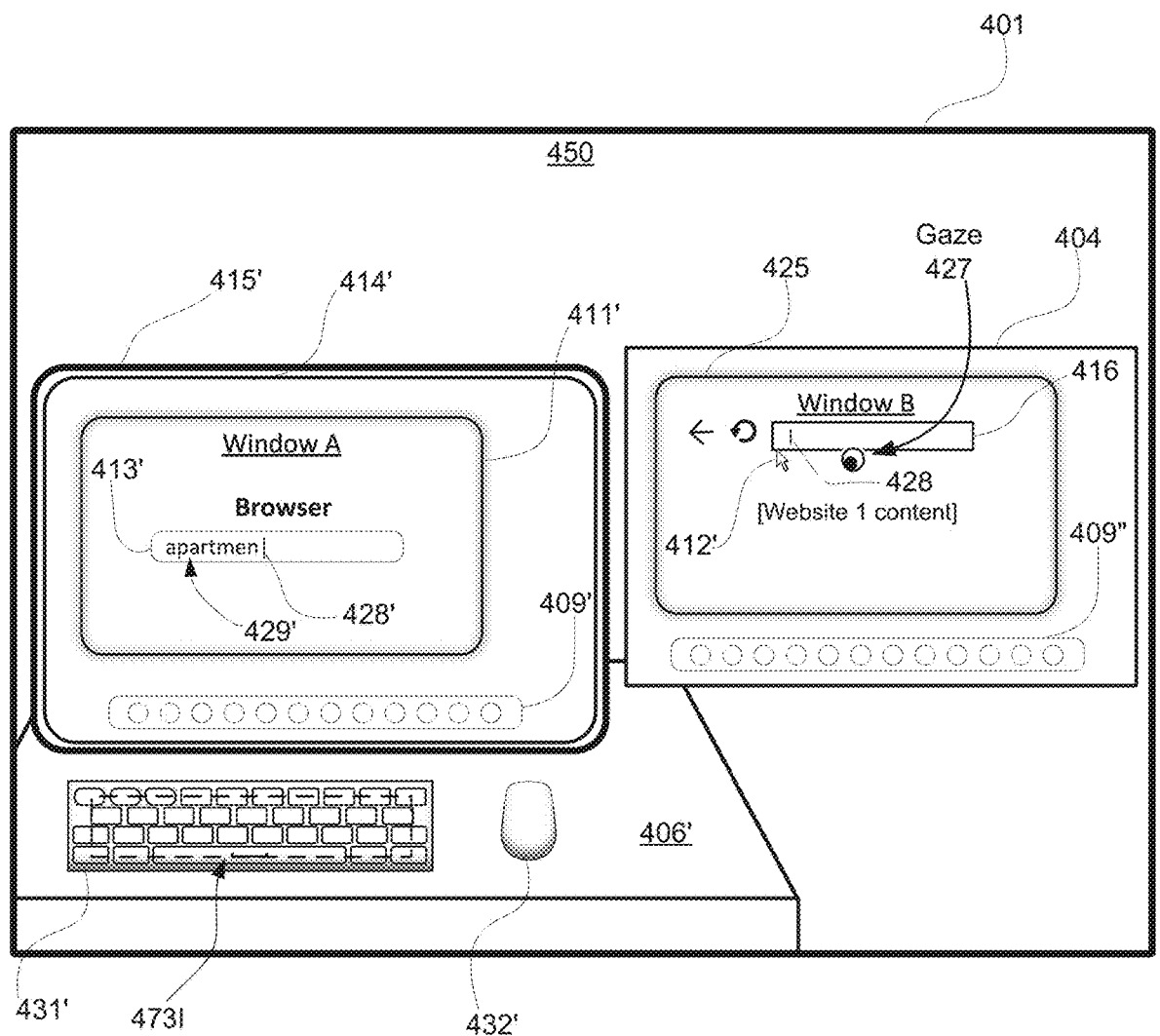
Figure 4L:
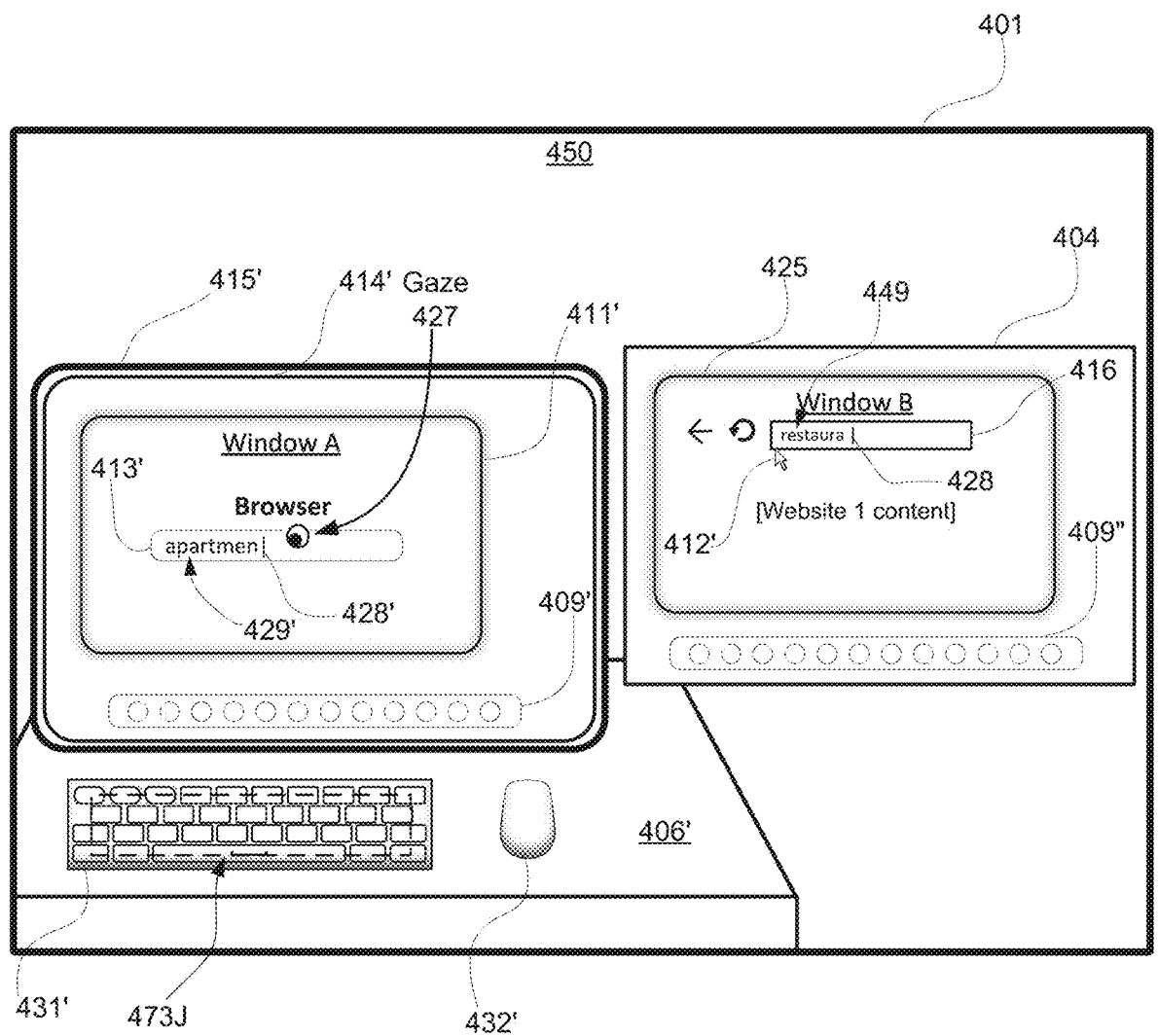
Figure 4M:
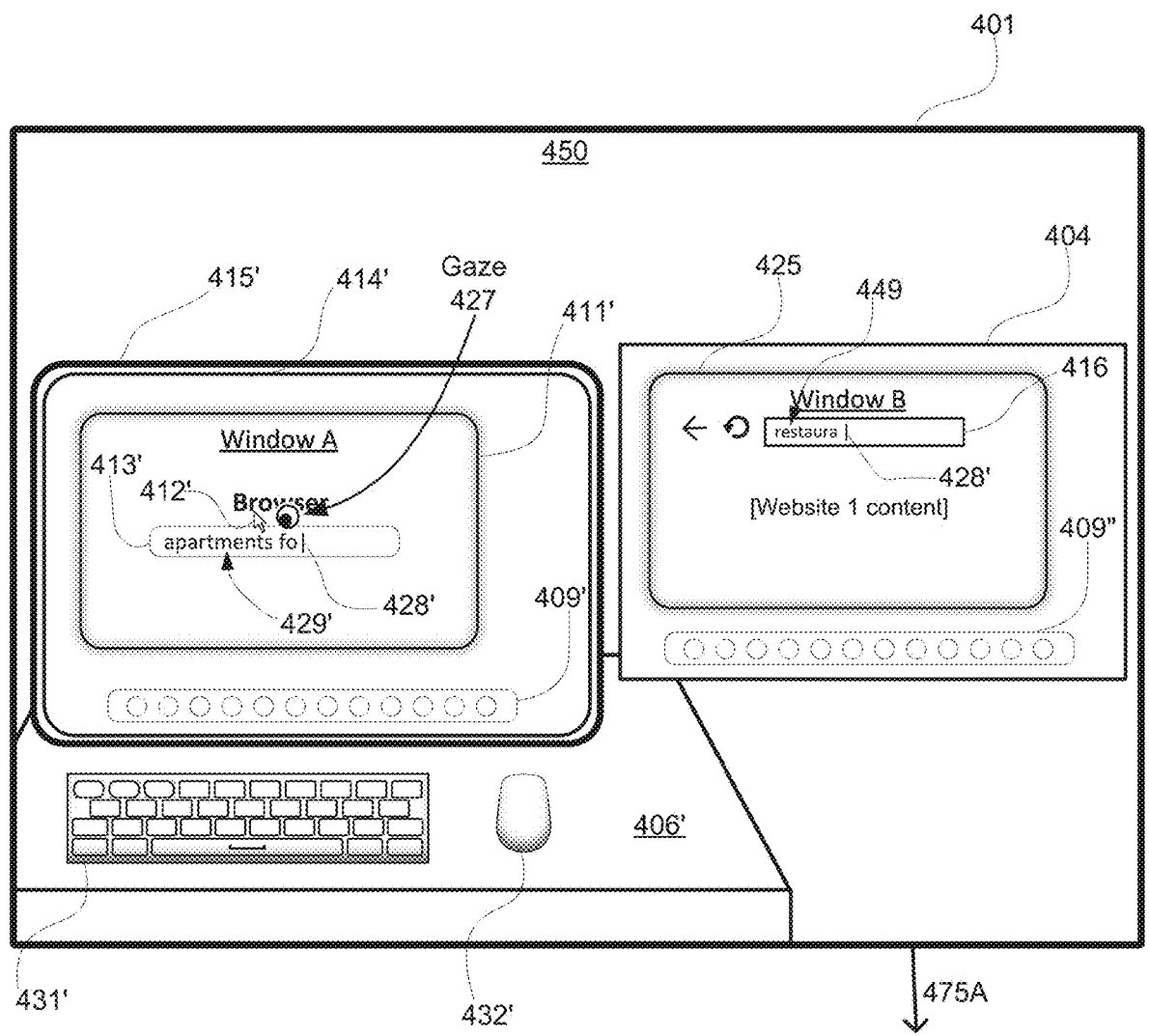
Figure 4N:
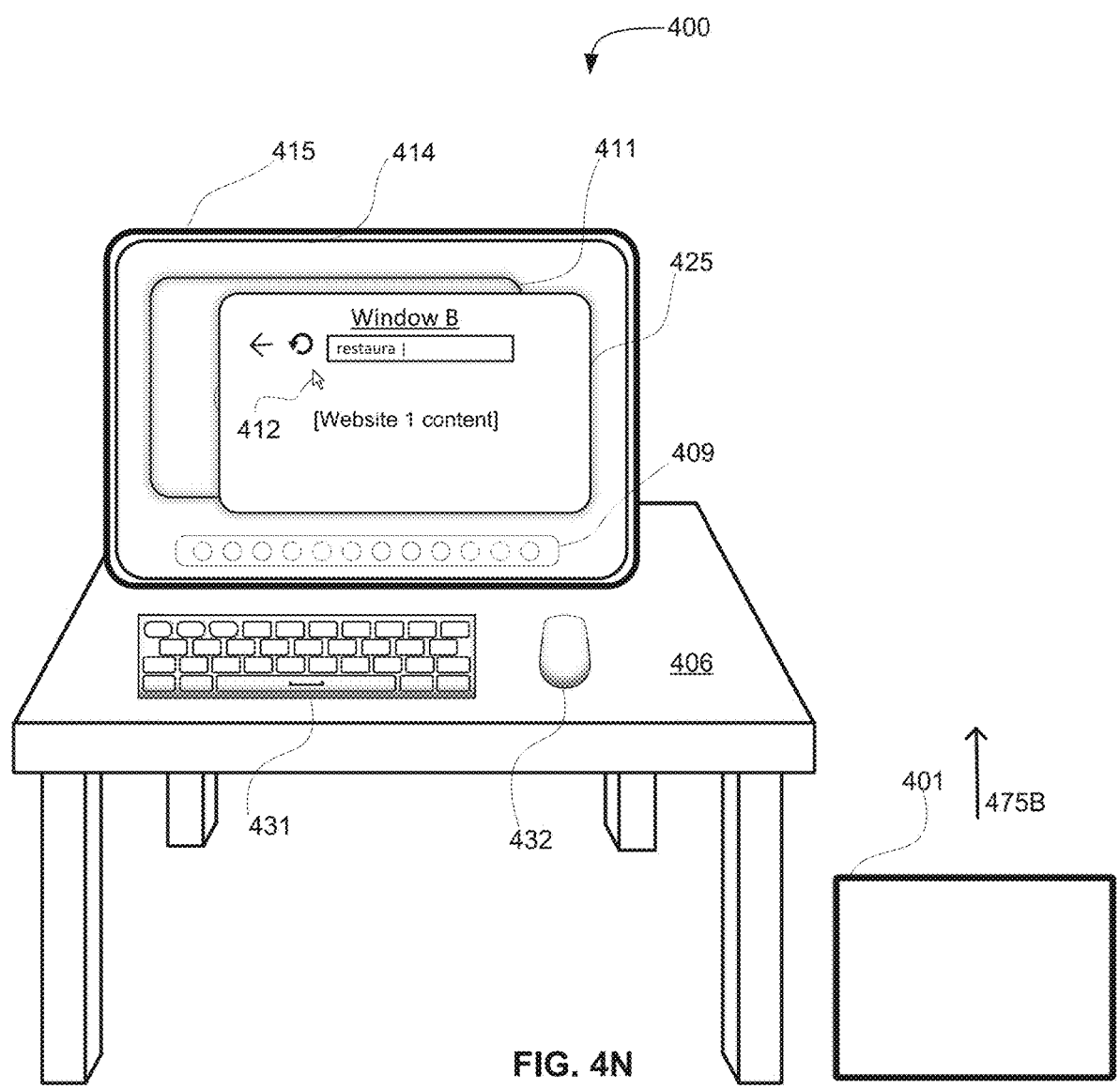
Figure 4O:
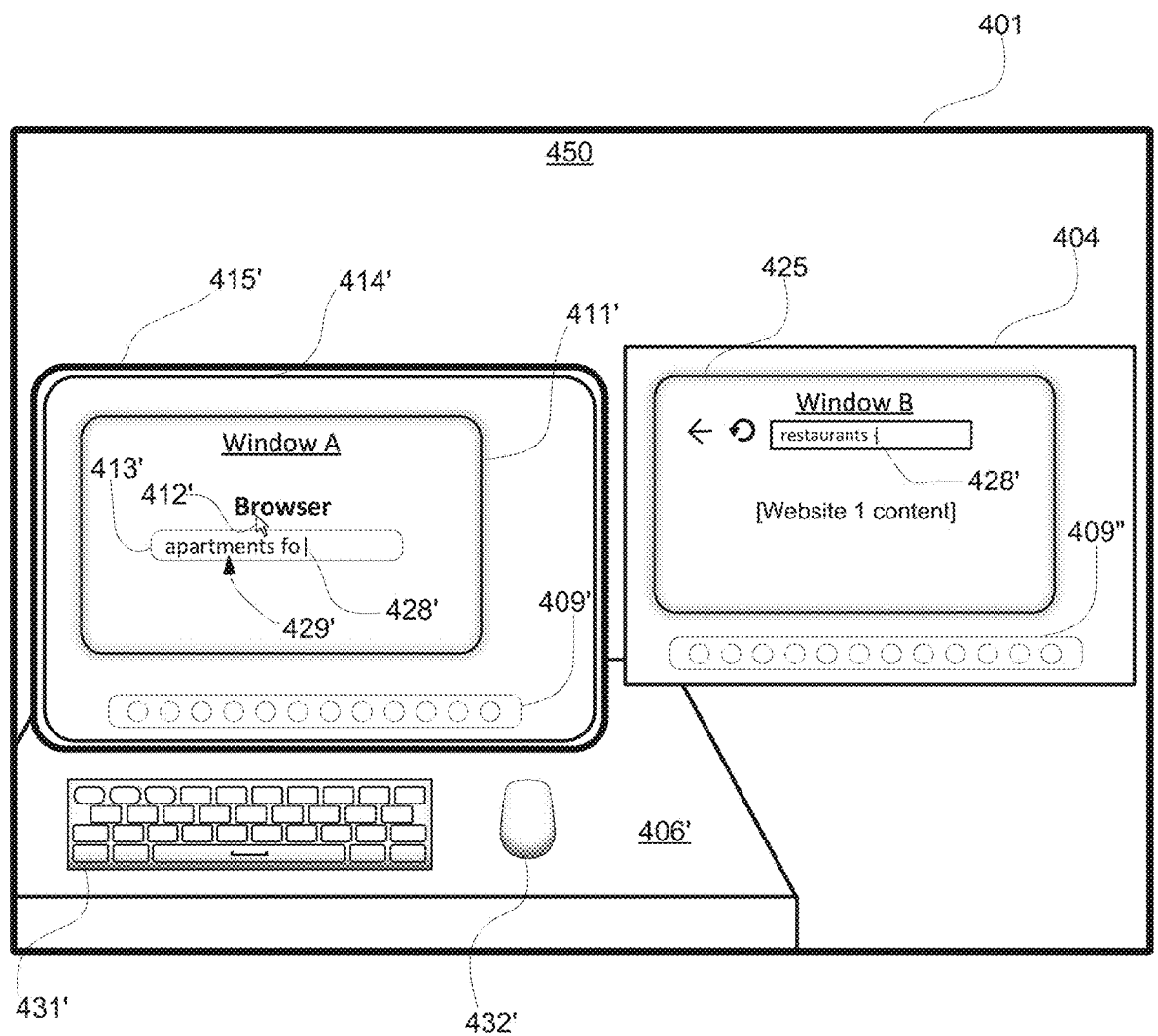

FIGS. 4A-4O illustrate examples of a first electronic device facilitating interactions with a representation of a user interface of a second electronic device in a three-dimensional environment according to some examples of the disclosure. In some examples, as shown in FIG. 4A, a three-dimensional environment 450 may be presented using a first electronic device 401. In some examples, the first electronic device 401 optionally corresponds to first electronic device 301 discussed above. In some examples, the three-dimensional environment 450 includes captured portions of the physical environment in which the first electronic device 401 is located. For example, the three-dimensional environment 450 optionally includes a table (e.g., a representation of table 406'), as shown in FIG. 4A. Additionally, the three-dimensional environment 450 includes a second electronic device (e.g., a representation of the second electronic device 415') and one or more physical input devices (e.g., one or more representations of the one or more input devices 431'/432') that are in communication with the second electronic device (e.g., positioned atop the table in the physical environment). In some examples, the three-dimensional environment 450 optionally corresponds to three-dimensional environment 350 described above. In some examples, the second electronic device 415' corresponds to second electronic device 315' described above. In some examples, the one or more input devices 431'/432' correspond to the one or more input devices 331'/332' described above. In some examples, the representations of the physical environment can include portions of the physical environment viewed through a transparent or translucent display of first electronic device 401.

As similarly discussed above, in some examples, the first electronic device 401 is in communication with the second electronic device 415'. Additionally, in some examples, as shown in FIG. 4A, the first electronic device 401 is presenting a virtual extended display 404 that is associated with the second electronic device 415'. For example, in FIG. 4A. the virtual extended display 404 functions as a second (e.g., virtual) display to a physical display (e.g., a representation of display 414') of the second electronic device 415'. In some examples, the virtual extended display 404 corresponds to virtual extended display 304 described above. In some examples, as shown in FIG. 4A, the display 414' of the second electronic device 415' is displaying a first user interface (e.g., a representation of first user interface 411') and the virtual extended display 404 is displaying a second user interface 425 that is configured to be displayed on the display 414' of the second electronic device 415'. In some examples, the first user interface 411' and the second user interface 425 may be associated with a respective application (e.g., a web browsing application ("Browser") that is operating on the second electronic device 514'). For example, the first user interface 411' is a first window (e.g., "Window A") of the respective application and the second user interface 425 is a second window (e.g., "Window B") of the respective application. Additionally, as shown in FIG. 4A, the display 414' of the second electronic device 415' is displaying a dock (e.g., a representation of dock 409') and the virtual extended display 404 is displaying a representation of the dock 409". In some examples, the dock 409' corresponds to dock 309' discussed above. In some examples, as shown in FIG. 4A, the display 414' of the second electronic device 415' includes a cursor (e.g., a representation of the cursor 412') that is controllable using the mouse 432'. In some examples, the cursor 412' corresponds to the cursor 312' described above.

In some examples, as shown in FIG. 4A, the first user interface 411' includes a text-entry field (e.g., a representation of text-entry field 413') that is selectable to enter text for providing a search query into the web browser. Additionally, as shown in FIG. 4A, the second user interface 425 includes a plurality of search results provided by the web browser (e.g., associated with the URL "www.Search.com"). For example, in FIG. 4A, the second user interface 425 includes a first search result 426A (e.g., "Search Result A") that is associated with a first website (e.g., "www.URL1.com"), a second search result 426B (e.g., "Search Result B") that is associated with a second website (e.g., "www.URL2.com"), and a third search result 426C (e.g., "Search Result C") that is associated with a third website. In some examples, the plurality of search results 426 is selectable to access content (e.g., text, image, video, music, etc.) via their respective sources (e.g., websites).

In some examples, the first electronic device 401 displays the second user interface 425 in the virtual extended display 404 based on image data (e.g., pixel or display data) transmitted to the first electronic device 401 by the second electronic device 415' (e.g., directly or indirectly via a server). For example, as discussed above, the second user interface 425 is configured to be displayed on the display 414' of the second electronic device 415' (e.g., the second user interface 425 is a user interface of the second electronic device 415'). Accordingly, in some examples, the first electronic device 401 renders (e.g., generates) the second user interface 425, including the content of the second user interface 425 discussed above, based on the image data provided by the second electronic device 415'. For example, the image data includes information corresponding to an appearance of the second user interface 425, characteristics of the content of the second user interface 425 (e.g., whether the content is interactive, such as selectable, scrollable, etc.), and/or a quality (e.g., image quality, such as definition) of the second user interface 425 and its content. In some examples, the image data transmitted to the first electronic device 401 by the second electronic device 415' includes an image generated by the second electronic device 415' that is to be displayed in virtual extended display 404 by the first electronic device 401.

In some examples, user input detected via the one or more input devices 431'/432' may be selectively routed by the first electronic device 401 based on a location of a gaze of a user of the first electronic device 401 in the three-dimensional environment 450. As used herein, the user of the first electronic device 401 may also be the user of the second electronic device 415'. In FIG. 4B, while a gaze 427 of the user is directed to the first user interface 411' of the display 414', the second electronic device 415' detects an input 473A via the mouse 432' that is in communication with the second electronic device 415'. For example, as shown in FIG. 4B, the second electronic device 415' detects movement of the mouse 432' on a surface of the table 406'.

In some examples, as mentioned above, the first electronic device 401 controls applicability of the user input based on the location of the gaze 427. For example, in response to detecting the input 473A, the second electronic device 415' transmits input data (e.g., directly or indirectly via a server) to the first electronic device 401 that includes information corresponding to the movement of the mouse 432' (e.g., which corresponds to a request to move the cursor 412'). In some examples, when the first electronic device 401 receives the input data provided by the second electronic device 415', the first electronic device 401 determines the location of the Gaze 427 of the user in the three-dimensional environment 450. As discussed above and as shown in FIG. 4B, when the input 473A is provided via the mouse 432', the gaze 427 is directed to the first user interface 411' displayed on the display 414'. Accordingly, the first electronic device 401 routes the input 473A that is detected via the mouse 432' to the second electronic device 415'. For example, in FIG. 4B, the first electronic device 401 transmits output data to the second electronic device 415' that includes one or more commands/instructions for causing the second electronic device 415' to move the cursor 412' within the display 414' of the second electronic device 415' in accordance with the input 473A. Accordingly, in FIG. 4C, the second electronic device 415' moves the cursor 412' within the display 414' to a new location of the first user interface 411' in accordance with the movement of the mouse 432'.

In FIG. 4C, while the gaze 427 of the user is directed to the text-entry field 413' in the first user interface 411', the second electronic device 415' detects a selection input 473B via the mouse 432'. For example, as shown in FIG. 4C, while the cursor 412' is located over the text-entry field 413', the second electronic device 415' detects a click or press on a button of the mouse 432' (or a tap on a touch-sensitive surface of the mouse 432'). In some examples, as similarly described above, in response to detecting the selection input 473B, the second electronic device 415' transmits input data to the first electronic device 401, such that the first electronic device 401 may determine where to route the selection input 473B. As similarly discussed above, the first electronic device 401 determines where to direct the selection input 473B based on the location of the gaze 427 in the three-dimensional environment. In FIG. 4C, because the gaze 427 is directed to the text-entry field 413' in the first user interface 411' (or, in some examples, because the gaze 427 is directed to the first user interface 411', the display 414', or the like), the first electronic device 401, in the manner discussed above, causes the second electronic device 415' to direct the selection input 473B to the first user interface 411', particularly the location of the cursor 412' that is controllable via the mouse 432'. Accordingly, as shown in FIG. 4D, the second electronic device 415' performs a selection at the location of the cursor 412', which includes selecting the text-entry field 413' in the first user interface 411'. As shown in FIG. 4D, in some examples, when the text-entry field 413' is selected, the second electronic device 415' displays a text cursor (e.g., a representation of the text cursor 428') in the text-entry field 413' indicating that text may be entered into the text-entry field 413'.

In some examples, in FIG. 4C, if the gaze, represented alternatively as gaze 427i, of the user had alternatively been directed to neither the first user interface 411' (or, in some examples, display 414') nor the second user interface 425 (or, in some examples, virtual extended display 404), the first electronic device 401 and the second electronic device 415' optionally perform no operation in response to the selection input 473B. For example, when the first electronic device 401 receives the input data provided by the second electronic device 415' corresponding to the selection detected on the mouse 432', the first electronic device 401 determines that the gaze 427i of the user is directed away from the first user interface 411' and the second user interface 425 and transmits instructions to the second electronic device 415' to forgo performing any operation in response to the selection. Alternatively, in some examples, as shown in FIG. 4D, if the gaze 427i of the user is directed to neither the first user interface 411' nor the second user interface 425 when the selection input 473B in FIG. 4C is detected by the second electronic device 415', the first electronic device 401 implements an input latching behavior that causes the input to be routed to the currently active user interface in the three-dimensional environment 450. For example, the input is automatically routed to the last user interface to which the gaze 427 was directed before the selection input 473B was detected while the gaze 427i is directed away from the first user interface 411' and the second user interface 425. Per this example, because the gaze 427 was last directed to the first user interface 411' in FIG. 4B before the selection input 473B was detected in FIG. 4C, the input latches to the first user interface 411', which causes the first electronic device 401 to route the selection input 473B to the first user interface 411' (e.g., select the text-entry field 413') as shown in FIG. 4D and as similarly discussed above.

In FIG. 4D, while the text cursor 428' is displayed in the text-entry field 413' and while the gaze 427 of the user is directed to the first user interface 411', the second electronic device 415' detects a series of one or more inputs 473C via the keyboard 431' that is in communication with the second electronic device 415'. For example, in FIG. 4D, the second electronic device 415' detects a selection of one or more keys of the keyboard 431'. In some examples, as similarly described above, in response to detecting the series of one or more inputs 473C, the second electronic device 415' transmits input data to the first electronic device 401 that includes information corresponding to the selection of the one or more keys of the keyboard 431'. In some examples, as similarly discussed above, when the first electronic device 401 receives the input data provided by the second electronic device 415', the first electronic device 401 determines where to route the keyboard input based on the location of the gaze 427 in the three-dimensional environment 450. In FIG. 4D, because the gaze 427 is directed to the first user interface 411' when the series of one or more inputs 473C is detected by the second electronic device 415', the first electronic device 401 causes (e.g., via output data including one or more commands/instructions) the second electronic device 415' to direct the series of one or more inputs 473C to the first user interface 411', particularly the text-entry field 413'. Accordingly, as shown in FIG. 4E, because the text cursor 428' was active within the text-entry field 413' and the series of one or more inputs 473C is directed to the first user interface 411', the second electronic device 415' displays text (e.g., a representation of text 429', spelling "apartmen") at the location of the text cursor 428' in the text-entry field 413' in accordance with the selection of the one or more keys of the keyboard 431'.

In some examples, the cursor 412' is configurable to be movable between the physical display 414' of the second electronic device 415' and the virtual extended display 404 in the three-dimensional environment 450. In some examples, the cursor 412' may be moved between the physical display 414' of the second electronic device 415' and the virtual extended display 404 based on movement of the mouse 432' that controls the cursor 412'. For example, in FIG. 4F, the second electronic device 415' detects a movement input 473D corresponding to movement of the mouse 432' (e.g., rightward across the top of the table 406'). Additionally, in some examples, the cursor 412' may be moved between the physical display 414' of the second electronic device 415' and the virtual extended display 404 based on a location of the gaze 427 of the user. For example, in FIG. 4F, the gaze 427 is directed to the second user interface 425 while the movement of the mouse 432' is being detected by the second electronic device 415'.

In some examples, the cursor 412' is moved between the display 414' of the second electronic device 415' and the virtual extended display 404 in accordance with a determination that the movement of the mouse 432' exceeds a movement threshold. For example, the movement of the mouse 432' exceeds the movement threshold if a speed or acceleration of the movement of the mouse 432' exceeds a speed or acceleration threshold. In some examples, the movement of the mouse 432' exceeds the movement threshold if the movement of the mouse 432' corresponds to movement of the cursor 412' beyond a threshold distance (e.g., 0.5, 1, 1.5, 2, 3, 5, 10, 15, 25, etc. cm) of a boundary of the display and optionally in the direction of the virtual extended display 404. For example, in FIG. 4F, the movement of the mouse 432' detected by the second electronic device 415' corresponds to movement of the cursor 412' below the threshold distance of the boundary of the display 414' of the second electronic device 415'. Accordingly, as shown in FIG. 4G, display of the cursor 412' is maintained within the display 414' of the second electronic device 415' (e.g., at or near a right boundary of the display 414'). For example, the second electronic device 415' transmits input data to the first electronic device 401 that includes information corresponding to movement of the cursor 412' below the threshold distance of the boundary of the display 414', which causes the first electronic device 401 to transmit output data to the second electronic device 415' that causes the second electronic device 415' to maintain display of the cursor 412' on the display 414' (e.g., despite moving the cursor 412' rightward in accordance with the movement of the mouse 432'). In other examples, the second electronic device 415' may forgo transmitting input data to the first electronic device 401 when it's determined that movement of the cursor 412' fails to exceed the movement threshold and may only transmit the input data when the movement of the cursor 412' exceeds the movement threshold.

In FIG. 4G, while the cursor 412' is displayed on the display 414' of the second electronic device 415', the second electronic device 415' detects further movement of the mouse 432'. For example, as shown in FIG. 4G, the second electronic device 415' detects a movement input 473E that corresponds to movement of the cursor 412' rightward on the display 414' and beyond the threshold distance of the boundary of the display 414' discussed above, optionally while the gaze 427 of the user is still directed to the second user interface 425 of the virtual extended display 404. Alternatively, in FIG. 4G, while the gaze 427 is directed to the second user interface 425, the second electronic device 415' detects a selection input via the mouse 432'. For example, the second electronic device 415' detects a click or press of a button on the mouse 432' (e.g., or a tap on a touch-sensitive surface of the mouse 432').

In some examples, as shown in FIG. 4H, in response to detecting the movement of the mouse 432' that corresponds to movement of the cursor 412' beyond the threshold distance of the boundary of the display 414' and optionally in the direction of the virtual extended display 404, the first electronic device 401 displays the cursor 412' within the virtual extended display 404 in the three-dimensional environment 450. For example, the first electronic device 401 causes the second electronic device 415' to cease display of the cursor 412' on the display 414' and redisplays the cursor 412' in the virtual extended display 404 at a location that is based on the movement of the mouse 432' (e.g., the first electronic device 401 displays the cursor 412' in the second user interface 425 based on the input data that includes information corresponding to the movement of the mouse 432' provided by the second electronic device 415'). In some examples, the first electronic device 301 displays the cursor 412' in the virtual extended display 404 based on image data (e.g., previously discussed above) received from the second electronic device 415' that depicts the cursor 412' at a location within virtual extended display 404 based on the movement of the mouse 432' as determined by the second electronic device 415'.

Alternatively, in FIG. 4H, in response to the second electronic device 415' detecting the selection input via the mouse 432' while the gaze 427 of the user is directed to the second user interface 425, the first electronic device 401 moves the cursor 412' to the second user interface 425. In another example, in response to the second electronic device 415' detecting the movement input 473D in FIG. 4F while gaze 427 is directed to a different interface (e.g., second user interface 425) or display (e.g., virtual extended display 404) than is currently targeted by cursor 412', or while gaze 427 is directed to a location that is a threshold distance from cursor 412' (within the same or different interface, display, etc.), the first electronic device 401 may move the cursor 412' to a location that is based on the gaze 427. For example, as similarly described above, the first electronic device 401 causes the second electronic device 415' to cease display of the cursor 412' on the display 414' and redisplays the cursor 412' in the virtual extended display 404 at a location that is based on the location of the gaze 427. As shown in FIG. 4H, the first electronic device 401 optionally displays the cursor 412' at the location of the gaze 427 in the second user interface 425 (e.g., over the first search result 426A). In some examples, as similarly discussed previously above, the first electronic device 401 renders and displays the cursor 412' in the virtual extended display 404 based on image data corresponding to the cursor 412' that is provided by the second electronic device 415'.

In some examples, input detected via the keyboard 431' and/or the mouse 432' in communication with the second electronic device 415' may be routed by the first electronic device 401 for interacting with the virtual extended display 404 that is displayed in the three-dimensional environment 450 at the first electronic device 401. In some examples, as similarly discussed above, the input is routed based on the location of the gaze 427 of the user in the three-dimensional environment 450. In FIG. 4H, while the cursor 412' is displayed in the second user interface 425 at the first electronic device 401, the second electronic device 415' detects a selection input 473F via the mouse 432'. For example, in FIG. 4H, the second electronic device 415' detects a click or press of a button on the mouse 432' (or a tap of a touch-sensitive surface of the mouse 432').

In some examples, as shown in FIG. 4I, in response to detecting the selection input 473F on the mouse 432', the first electronic device 401 performs a selection operation based on the location of the cursor 412' in the second user interface 425. For example, as shown in FIG. 4I, because the cursor 412' is located over the first search result 426A in the second user interface 425 when the selection input 473F is detected, and the gaze 427 is directed to the second user interface 425, the first electronic device 401 selects the first search result 426A, which includes displaying content associated with the first search result 426A (e.g., "Website 1 content" that is accessible from the website "www.URL1.com"). Particularly, as previously discussed herein, the second electronic device 415' transmits input data to the first electronic device 401 that includes information corresponding to the selection input 473F, and in response to detecting the input data, determines the location of the gaze 427 in the three-dimensional environment 450. In FIG. 4I, because the gaze 427 was directed to the second user interface 425 when the selection input 473F was detected in FIG. 4H, the first electronic device 401 directs the selection input to the virtual extended display 404, namely, performing a selection at the location of the cursor 412' in the second user interface 425. In other examples in which the second electronic device 415 generates the contents of virtual extended display 404, the second electronic device 415 may forgo transmitting input data to the first electronic device and may instead perform the selection at the location of the cursor 412' in the second user interface 425. The first electronic device 401 may display any resulting update to the contents of virtual extended display 404 based on image data (e.g., previously discussed above) received from the second electronic device 415' that depicts changes to the contents of virtual extended display 404 based on as determined by the second electronic device 415' based on selection input 473F.

In FIG. 4I, the second electronic device 415' detects a movement input 473G via the mouse 432'. For example, in FIG. 4I, the second electronic device 415' detects movement of the mouse 432' rightward across the surface of the table 406' while the cursor 412' is displayed in the second user interface 425 at the first electronic device 401. In some examples, as shown in FIG. 4J, in response to detecting the movement of the mouse 432' at the second electronic device 415', the first electronic device 401 moves the cursor 412' in the second user interface 425 in accordance with the movement of the mouse 432' detected at the second electronic device 415'. For example, in response to detecting the movement input 473G, the second electronic device 415' transmits input data to the first electronic device 401 that includes information corresponding to the movement of the mouse 432' (e.g., a direction of the movement and/or a distance or speed of the movement). In some examples, as similarly discussed herein, when the first electronic device 401 receives the input data that is provided by the second electronic device 415', the first electronic device 401 determines the location of the gaze 427 of the user when the movement input 473G is detected at the second electronic device 415'. In FIG. 4J, because the gaze 427 was directed to the second user interface 425 in the virtual extended display 404, the first electronic device 401 moves the cursor 412' within the second user interface 425 in accordance with the input data. In some examples, the first electronic device 301 displays movement of the cursor 412' (e.g., changes a position at which the cursor 412' is displayed) within the second user interface 425 in the virtual extended display 404 based on image data (e.g., previously discussed above) received from the second electronic device 415' that depicts cursor 412' having an updated position within virtual extended display 404 based on the movement of the mouse 432' as determined by the second electronic device 415'.

In FIG. 4J, while the first electronic device 401 is displaying the cursor 412' in the second user interface 425, the second electronic device 415' detects a selection input 473H via the mouse 432'. For example, as similarly discussed above, the second electronic device 415' detects a click or press of a button on the mouse 432' (or a tap of a touch-sensitive surface of the mouse 432'). In some examples, as shown in FIG. 4K, in response to the second electronic device 415' detecting the selection input 473H, the first electronic device 401 performs a selection operation in the second user interface 425 based on the location of the cursor 412'. For example, as similarly discussed above, because the gaze 427 of the user is directed to the second user interface 425 when the second electronic device 415' detects the selection input 473H in FIG. 4J, the first electronic device 401 directs the selection input to the second user interface 425 in accordance with the detected selection input 473H, particularly performing a selection of the text-entry field 416 of the second user interface 425. In some examples, as similarly discussed above, the second electronic device 415' may instead perform the selection of the text-entry field 416 of the second user interface 425 and provide updated image data for virtual extended display 404 to the first electronic device 401. As shown in FIG. 4K, in some examples, selecting the text-entry field 416 includes displaying a text cursor 428 within the text-entry field 416 that indicates that text may be entered into the text-entry field in response to keyboard input.

In FIG. 4K, while the first electronic device 401 is displaying the text cursor 428 in the text-entry field 416, the second electronic device 415' detects a series of one or more selection inputs 473I via the keyboard 431'. For example, in FIG. 4K, the second electronic device 415' detects one or more selections or presses of one or more keys of the keyboard 431'. In some examples, as shown in FIG. 4L, in response to the second electronic device 415' detecting the series of one or more selection inputs 473I, the first electronic device 401 enters text 449 into the text-entry field 416 in accordance with the series of one or more selection inputs 473I detected via the keyboard 431'. For example, in FIG. 4L, the first electronic device 401 displays the text 449 spelling "restaura" in the text-entry field 416 at the location of the text cursor 428 in accordance with the selected keys of the keyboard 431'. Particularly, as similarly discussed herein above, the first electronic device 401 displays the text 449 in accordance with input data including information corresponding to the selected keys of the keyboard 431' provided by the second electronic device 415' because the gaze 427 was directed to the second user interface 425 when the series of one or more selection inputs 473I was detected by the second electronic device 415'. In some examples, as similarly discussed above, the second electronic device 415' may instead enter text 449 into the text-entry field 416 in accordance with the series of one or more selection inputs 473I detected via the keyboard 431'. In these examples, the first electronic device 401 may display the text 449 spelling "restaura" in the text-entry field 416 based on image data depicting the same received from the second electronic device 415'.

In FIG. 4L, while the first electronic device 401 is displaying the text 449 in the text-entry field 416 in the second user interface 425, the second electronic device 415' detects further selection input 473J via the keyboard 431'. For example, in FIG. 4L, the second electronic device 415' detects selection of one or more additional keys on the keyboard 431'. As shown in FIG. 4L, the second electronic device 415' detects the selection input 473J via the keyboard 431' while the gaze 427 of the user is directed to the first user interface 411' on the display 414' of the second electronic device 415'.

In some examples, as shown in FIG. 4M, in response to the second electronic device 415' detecting the selection input 473J via the keyboard 431', the first electronic device 401 routes the selection input 473J to the first user interface 411' of the second electronic device 415' based on the location of the gaze 427. For example, as similarly described herein above, the first electronic device 401 determines that the gaze 427 is directed to the display 414' when the selection input 473J is detected on the keyboard 431' in FIG. 4L and transmits output data to the second electronic device 415' that causes the second electronic device 415' to update the text 429' in the text-entry field 413' in accordance with the selected keys of the keyboard 431'. As shown in FIG. 4M, the text 429' in the first user interface 411' is updated to include the text "apartments fo" at the location of the text cursor 428' in the text-entry field 413'. Further, as shown in FIG. 4M, the first electronic device 401 forgoes updating the text 449 in the text-entry field 416 in the second user interface 425 in accordance with the selected keys of the keyboard 431'.

Additionally, in some examples, as shown in FIG. 4M, when the second electronic device 415' updates the text 429' in the first user interface 411' in accordance with the selection input 473J, the cursor 412' is redisplayed in the first user interface 411', optionally based on the location of the gaze 427 in the three-dimensional environment 450. For example, in FIG. 4M, the first electronic device 401 ceases display of the cursor 412' in the second user interface 425 and transmits data (e.g., output data) to the second electronic device 415' that causes the second electronic device 415' to redisplay the cursor 412' at a location of the first user interface 411' that corresponds to the location of the gaze 427 in the three-dimensional environment 450 (e.g., over the text-entry field 413'). In some examples, as previously discussed herein, with the cursor 412' now located (e.g., displayed) in the first user interface 411' on the display 414' and while the gaze 427 is directed to the display 414' of the second electronic device 415', the cursor 412' is controllable via the mouse 432' to interact with user interface elements of the display 414' (e.g., the first user interface 411' and/or the dock 409') in one or more of the manners discussed above.

In some examples, disassociation of the first electronic device 401 from the user of the first electronic device 401 causes the display 414' of the second electronic device 415' to be reconstituted as the only display for the first user interface 411' and the second user interface 425. For example, in FIG. 4M, the first electronic device 401 detects (e.g., via orientation sensors 210 of FIG. 2) removal of the first electronic device 401 from the head of the user, as represented by arrow 475A. In some examples, the disassociation of the first electronic device 401 from the user causes the physical environment surrounding the user to no longer be visible via the display of the first electronic device 401 (e.g., such that the display of the first electronic device 401 is no longer positioned over or in front of the eyes of the user). In some examples, the disassociation of the first electronic device 401 corresponds to a power down or initiation of a sleep state of the first electronic device 401, which optionally causes the display of the first electronic device 401 to cease or pause operation.

In some examples, as shown in FIG. 4N, in response to detecting the disassociation of the first electronic device 401 from the user of the first electronic device 401, the first electronic device 401 ceases presentation of the three-dimensional environment 450. For example, as shown in FIG. 4N, all virtual objects cease to be displayed by the first electronic device 401, namely the virtual extended display 404. Additionally, as shown in FIG. 4N, in some examples, when the first electronic device 401 is no longer being used by the user, the display 414 of the second electronic device 415 in the real-world environment 400 is reconstituted as the only available display for all windows, applications, files, and other user interface elements that were previously displayed across the display 414 and the virtual extended display 404. For example, as shown in FIG. 4N, the first user interface 411 and the second user interface 425 are concurrently displayed on the display 414 of the second electronic device 415 because the virtual extended display 404 is no longer available as a display means for the second user interface 425 as outlined above. In some examples, interfaces associated with applications running on the first electronic device 401 (and not on the second electronic device 415) may not be displayed on display 414 in response to detecting the disassociation of the first electronic device 401 from the user of the first electronic device 401. In other examples, interfaces associated with applications running on the first electronic device 401 (and not on the second electronic device 415) may be displayed on display 414 in response to detecting the disassociation of the first electronic device 401 from the user of the first electronic device 401 (e.g., based on display capabilities of the second electronic device 415').

Particularly, in some examples, when the first electronic device 401 is disassociated from the user, the first electronic device 401 transmits contextual data to the second electronic device 415 that includes information corresponding to a state of display of the second user interface 425. For example, in FIG. 4N, the information corresponding to the state of display of the second user interface 425 includes details regarding an appearance of the second user interface 425, content included in the second user interface 425, such as the text "restaura" as shown, and/or a display mode of the second user interface 425 (e.g., whether the second user interface 425 is displayed in an expanded, full-screen mode on the virtual extended display 404). As shown in FIG. 4N, when the second user interface 425 is displayed on the display 414 of the second electronic device 415 after the first electronic device 401 is no longer in use, the second user interface 425 is displayed according to the contextual data provided by the first electronic device 401 (e.g., such that the text "restaura" is still displayed in the second user interface 425 when the display 414 is reconstituted as the only display). In other examples in which the second electronic device 415 generates the contents of virtual extended display 404 and manages the contextual data including information corresponding to the state of display of the second user interface 425, the first electronic device 401 may forgo transmitting the contextual data to the second electronic device 415 and may instead transmit an indication that the first electronic device 401 has been disassociated from the user.

In some examples, if the first electronic device 401 is reassociated with the user such that the display of the first electronic device 401 is operating (e.g., powered on or awakened from the sleep state), the first electronic device 401 redisplays the virtual extended display 404 based on the previous display of the virtual extended display 404 at the first electronic device 401. In FIG. 4N, as represented by arrow 475B, the user places the first electronic device 401 back onto the head of the user. For example, the user places the display of the first electronic device 401 over and/or in front of the eyes of the user such that the real-world environment 400 is once again visible via the display of the first electronic device 401 in passthrough.

In some examples, as shown in FIG. 4O, when the first electronic device 401 is reassociated with the user, the first electronic device 401 redisplays the three-dimensional environment 450. Additionally, as shown in FIG. 4O, the first electronic device 401 redisplays the virtual extended display 404 that includes the second user interface 425 because the virtual extended display 404 is reinstated as a second (e.g., virtual) display for the second electronic device 415'. For example, as shown in FIG. 4O, the second electronic device 415' ceases display of the second user interface 425 and the first electronic device displays the second user interface 425 in the virtual extended display 404 according to the display state of the second user interface 425 before the first electronic device 401 was disassociated from the user in FIG. 4M.

Additionally, in some examples, as shown in FIG. 4O, when the second user interface 425 is redisplayed in the virtual extended display 404 at the first electronic device 401, the second user interface 425 includes any updates to the presentation of the second user interface 425, including updates to the content of the second user interface 425, since the second user interface 425 was last displayed at the first electronic device 401. For example, in FIG. 4O, the text "restaurants" has been updated in the second user interface 425 since the second user interface 425 was last displayed at the first electronic device 401 in FIG. 4M (e.g., in response to detecting selection input via the keyboard 431'). Accordingly, as shown in FIG. 4O, when the second user interface 425 is redisplayed in the virtual extended display 404 at the first electronic device 401, the second user interface 425 includes the updated text discussed above.

In some examples, the virtual extended display 404 is reconstituted as a second display for the second electronic device 415' when the first electronic device 401 is reassociated with the user if the reassociation occurs within a threshold amount of time of the disassociation. For example, the virtual extended display 404 remains configured to display content (e.g., user interfaces) of the second electronic device 415' if, after the user first removes the first electronic device 401 from their head (e.g., and/or away from their eyes), the user places the first electronic device 401 on their head (e.g., and over or in front of their eyes) within 1, 2, 5, 10, 15, 20, 30, 60, 80, 100, 120, etc. minutes from the removal of the first electronic device 401. In some examples, if the reassociation does not occur within the threshold amount of time of the disassociation of the first electronic device 401 from the user, the first electronic device 401 forgoes redisplaying the second user interface 425 in the virtual extended display 404. In some examples, the first electronic device 401 also forgoes redisplaying the virtual extended display 404. In some such examples, the virtual extended display 404 may be redisplayed by relaunching the virtual extended display 404, such as using an affordance similar to first affordance 319 in FIG. 3G.

It should be noted that, in some examples, inputs initially detected by the second electronic device 415 may not be transmitted to the first electronic device 401 in accordance with a determination that the inputs are to be directed to the second electronic device 415 (e.g., based on gaze 427 being directed to the display 414', an interface of display 414', virtual extended display 404, or an interface of virtual extended display 404). In these examples, the first electronic device 401 may intermittently, periodically, or at any other desired interval transmit information to the second electronic device 415' that indicates the current destination of a user input. If the current destination is the second electronic device 415', the second electronic device 415' may forgo transmitting a detected input to the first electronic device 401 and may instead process the input locally. If the current destination is the first electronic device 401 (or any device other than the second electronic device 415'), the second electronic device 415' may transmit input data (e.g., directly or indirectly via a server) to the first electronic device 401 that includes information corresponding to detected input.

It should be noted that, in some examples, the first user interface 411' and/or the second user interface 425 may additionally or alternatively be interacted with via input detected by the first electronic device 401. For example, individual elements of the first user interface 411' and/or the second user interface 425 (e.g., such as the text-entry field 413'/416) may be selected via voice or hand-based input, such as via an air pinch input (e.g., in which an index finger and thumb of a hand of the user come together and make contact) or an air tap or touch gesture (e.g., provided by an index finger of the hand), following the gaze-based rules discussed above for routing the inputs. Additionally, in some examples, the virtual extended display 404 itself may be interacted with via hand-based input detected by the first electronic device 401. For example, the first electronic device 401 may reposition the virtual extended display 404 within the three-dimensional environment 450 in response to detecting selection of the virtual extended display 404 (e.g., such as via an air pinch input), followed by movement of the hand of the user. As another example, the first electronic device 401 may scale the virtual extended display 404 within the three-dimensional environment 450, such that the size of the second user interface 425 may be increased or decreased in the three-dimensional environment 450 and/or additional user interfaces may be displayed in the virtual extended display 404. In such examples in which the inputs are directed to the virtual extended display 404 itself, rather than to the content (e.g., the second user interface 425) of the virtual extended display 404, the inputs are responded to by the first electronic device 301 rather than by the second electronic device 415' (e.g., because the hand-based input discussed above is detected by the first electronic device 301 independent of the second electronic device 415').

It should also be noted that, in some examples, the one or more physical input devices (e.g., physical input devices, such as mouse 332', 432' and keyboard 331', 431') may additionally or alternatively be communicatively coupled (e.g., wired or wirelessly) with the first electronic device (e.g., first electronic device 301 or 401). In these examples, the inputs from the physical input devices may be routed to the appropriate device or interface in the same manner as described above. However, in these examples, the inputs from the physical input devices need not be initially detected by the second electronic device (e.g., second electronic device 315' or 415') and sent to the first electronic device prior to being routed to the appropriate device or interface.

Accordingly, as outlined above, providing an extended virtual display for an electronic device in a three-dimensional environment that may be interacted with via input detected on physical input devices in communication with the electronic device facilitates seamless and efficient interaction with a display of the electronic device and the extended virtual display without requiring the user to utilize separate input means, as an advantage. Another advantage of the above systems and methods is the seamless integration of a set of input devices (e.g., keyboard, mouse, trackpad, etc.) of a first physical electronic device with a set of input devices (e.g., eye tracking sensors, hand tracking sensors, orientation sensors, etc.) of a second physical electronic device, which allows for input received at both sets of input devices to be directed to the same one or more user interfaces within a three-dimensional environment. Attention is now directed toward exemplary interactions with an image of a virtual extended display within a real-time multi-user communication session.

Figure 5A:
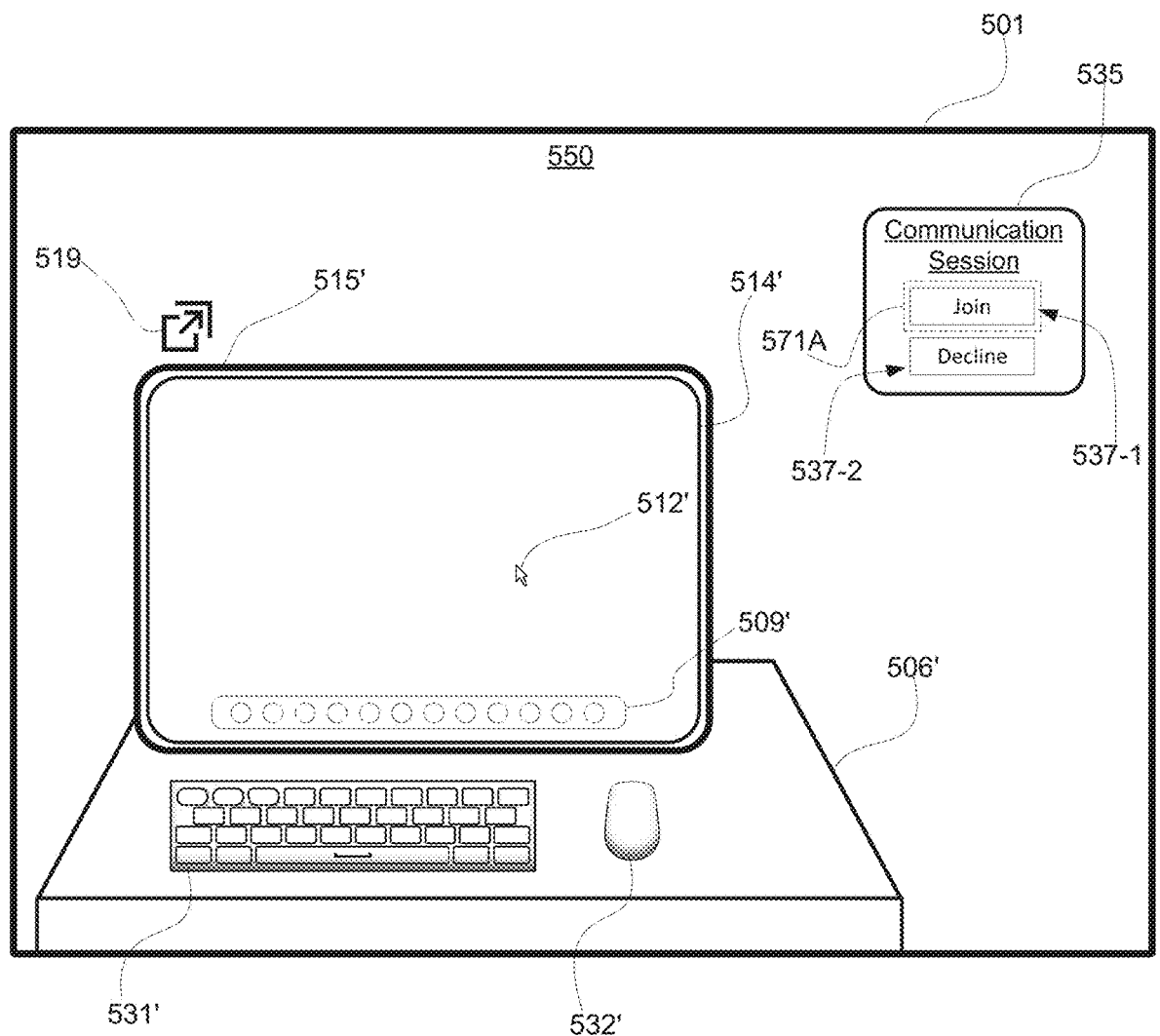
FIGS. 5A-5G illustrate example interactions with a representation of a user interface of an electronic device within a multi-user communication session according to some examples of the disclosure.

FIGS. 5A-5G illustrate example interactions with a representation of a user interface of an electronic device within a multi-user communication session according to some examples of the disclosure. In some examples, as shown in FIG. 5A, a three-dimensional environment 550 may be presented using a first electronic device 501. In some examples, the first electronic device 501 optionally corresponds to first electronic device 401/301 discussed above. In some examples, the three-dimensional environment 550 includes captured portions of the physical environment in which the first electronic device 501 is located. For example, the three-dimensional environment 550 optionally includes a table (e.g., a representation of table 506'), as shown in FIG. 5A. Additionally, the three-dimensional environment 550 includes a second electronic device (e.g., a representation of the second electronic device 515') and one or more physical input devices (e.g., one or more representations of the one or more input devices 531'/532') that are in communication with the second electronic device (e.g., positioned atop the table in the physical environment). In some examples, the three-dimensional environment 550 optionally corresponds to three-dimensional environment 450/350 described above. In some examples, the second electronic device 515' corresponds to second electronic device 415'/315' described above. In some examples, the one or more input devices 531'/532' correspond to the one or more input devices 431'/432' and/or 331'/332' described above. In some examples, the representations of the physical environment can include portions of the physical environment viewed through a transparent or translucent display of first electronic device 501.

In some examples, as similarly discussed herein above, the first electronic device 501 may be in communication with the second electronic device 515', such that the first electronic device 501 may be configurable to display a virtual extended display for the second electronic device 515'. For example, as shown in FIG. 5A, the three-dimensional environment 550 includes first affordance 519 that is displayed with the second electronic device 515'. In some examples, the first affordance 519 corresponds to first affordance 319 described previously above. In FIG. 5A, because the first affordance 519 has not been selected by the user of the first electronic device 501, the first electronic device 501 is not displaying a virtual extended display for the second electronic device 515'.

Additionally, in some examples, as shown in FIG. 5A, the three-dimensional environment 550 includes invitation element 535 corresponding to an invitation to join a third electronic device, different from the first electronic device 501 and the second electronic device 515', in a multi-user communication session. For example, the first electronic device 501 displays the invitation element 535 in response to detecting an indication from the third electronic device (not shown) inviting the user of the first electronic device 501 to join a user of the third electronic device in the multi-user communication session. In some examples, as shown in FIG. 5A, the invitation element 535 includes a first option 537-1 that is selectable to accept the invitation to join the multi-user communication session and a second option 537-2 that is selectable to decline the invitation to join the multi-user communication session (e.g., including ceasing display of the invitation element 535 in the three-dimensional environment 550).

Figure 5B:
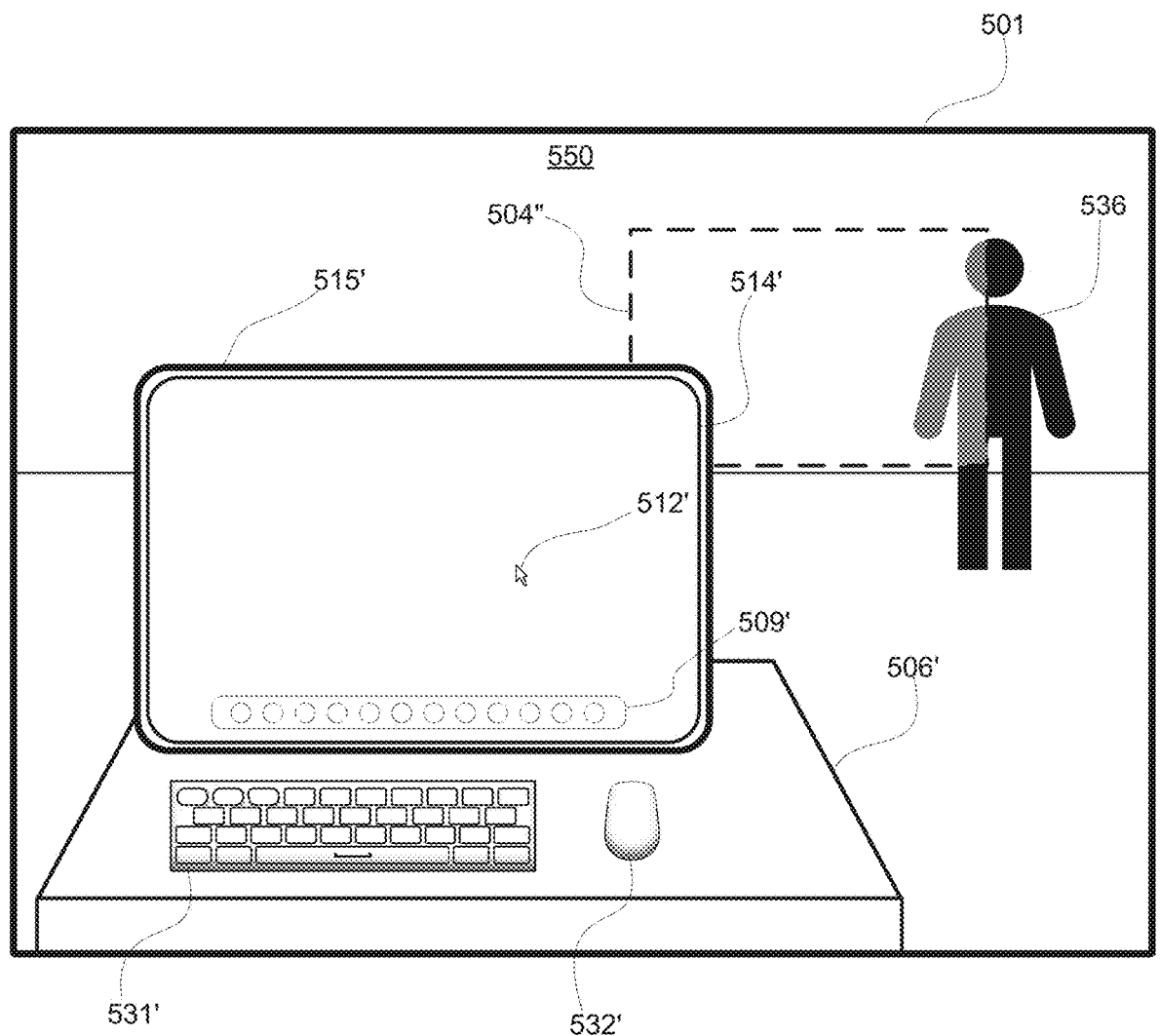

In FIG. 5A, while displaying the invitation element 535 in the three-dimensional environment 550, the first electronic device 501 detects a selection input 571A directed to the first option 537-1 of the invitation element 535. For example, the first electronic device 501 detects, via one or more sensors of the first electronic device 501, an air pinch gesture performed by a hand of the user, a tap or touch gesture performed by the hand, a verbal command, a gaze dwell directed to the first option 537-1, etc. In some examples, as shown in FIG. 5B, in response to detecting the selection of the first option 537-1, the first electronic device 501 joins the third electronic device in the multi-user communication session, as discussed below.

In some examples, when the first electronic device 501 joins the multi-user communication session with the third electronic device (not shown), the first electronic device 501 and the third electronic device are configured to present a shared three-dimensional environment that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 501 is in the multi-user communication session with the second electronic device, an avatar corresponding to the user of one electronic device is optionally displayed in the three-dimensional environment that is displayed via the other electronic device. For example, as shown in FIG. 5B, at the first electronic device 501, an avatar 536 corresponding to the user of the third electronic device is displayed in the three-dimensional environment 550.

In some examples, the presentation of avatar 536 as part of a shared three-dimensional environment is optionally accompanied by an audio effect corresponding to a voice of the user of the third electronic device. For example, the avatar 536 displayed in the three-dimensional environment 550 using the first electronic device 501 is optionally accompanied by an audio effect corresponding to the voice of the user of the third electronic device. In some such examples, when the user of the third electronic device speaks, the voice of the user may be detected by the third electronic device (e.g., via a microphone) and transmitted to the first electronic device 501 (e.g., directly or via a server (e.g., a wireless communications terminal)), such that the detected voice of the user of the third electronic device may be presented as audio (e.g., using speaker(s) 216) to the user of the first electronic device 501 in three-dimensional environment 550. In some examples, the audio effect corresponding to the voice of the user of the third electronic device may be spatialized such that it appears to the user of the first electronic device 501 to emanate from the location of avatar 536 in the three-dimensional environment 550 (e.g., despite being outputted from the speakers of the first electronic device 501. In some examples, the audio effect corresponding to the voice of the user of the third electronic device may alternatively be presented in mono or stereo at the first electronic device 501.

In some examples, while the first electronic device 501 and the third electronic device are in the multi-user communication session, the avatar 536 is displayed in the three-dimensional environment 550 with a respective orientation that corresponds to and/or is based on an orientation of the third electronic device (and/or the user of the third electronic device) in the physical environment surrounding the third electronic device. For example, in FIG. 5B, in the three-dimensional environment 550, the avatar 536 is optionally facing toward the viewpoint of the user of the first electronic device 501. Within a multi-user communication session, as a particular user moves the electronic device (and/or themself) in the physical environment, the viewpoint of the user changes in accordance with the movement, which may thus also change an orientation of the user's avatar in the three-dimensional environment. For example, with reference to FIG. 5B, if the user of the third electronic device were to look leftward in the three-dimensional environment such that the third electronic device is rotated (e.g., a corresponding amount) to the left (e.g., counterclockwise), the user of the first electronic device 501 would see the avatar 536 corresponding to the user of the third electronic device rotate to the right (e.g., clockwise) relative to the viewpoint of the user of the first electronic device 501 in accordance with the movement of the third electronic device.

Additionally, in some examples, while the first electronic device 501 and the third electronic device are in the multi-user communication session, a field of view of the shared three-dimensional environment and/or a location of a viewpoint of a user in the shared three-dimensional environment optionally change in accordance with movement of the electronic devices (e.g., by the users of the electronic devices). For example, while in the communication session, if the first electronic device 501 is moved closer toward the representation of the table 506' and/or the avatar 536 (e.g., because the user of the first electronic device 501 moved forward in the physical environment surrounding the first electronic device 501), the field of view of the three-dimensional environment 550 would change accordingly, such that the representation of the table 506', the representation of the second electronic device 515' and the avatar 536 appear larger in the field of view. In some examples, each user may independently interact with the shared three-dimensional environment, such that changes in viewpoints in the three-dimensional environment 550 and/or interactions with virtual objects in the three-dimensional environment 550 by the first electronic device 501 optionally do not affect what is shown in the three-dimensional environment at the third electronic device, and vice versa.

In some examples, the avatar 536 is a representation (e.g., a full-body rendering) of the user of the third electronic device. In some examples, the avatar 536 is a representation of a portion (e.g., a rendering of a head, face, head and torso, etc.) of the user of the third electronic device. In some examples, the avatar 536 is a user-personalized, user-selected, and/or user-created representation displayed in the three-dimensional environment 550 that is representative of the user of the third electronic device. It should be understood that, while the avatar 536 illustrated in FIG. 5B corresponds to a full-body representation of the user of the third electronic device, an alternative avatar may be provided, such as one of those described above.

Figure 5C:
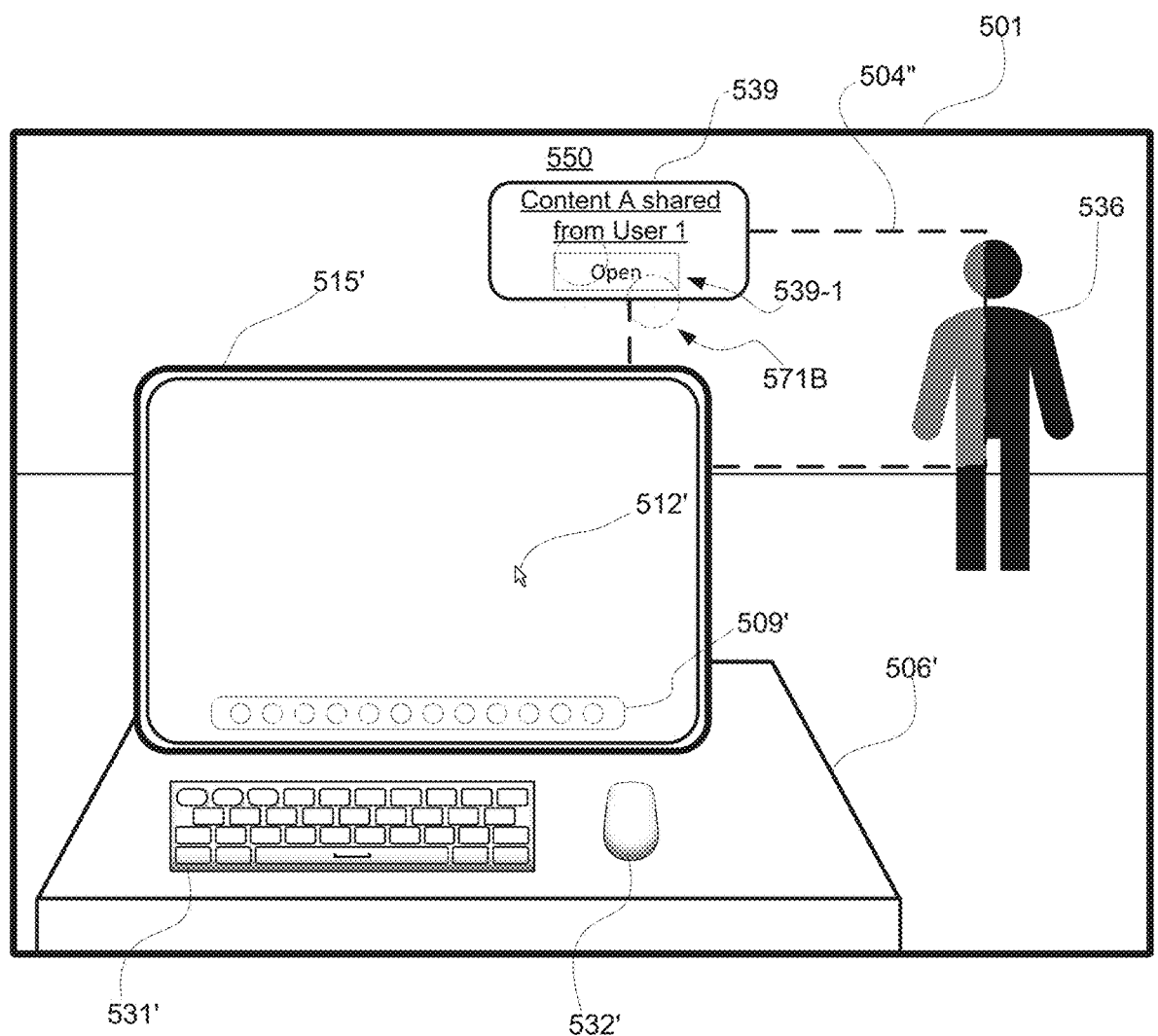

In some examples, while the first electronic device 501 and the third electronic device are in the multi-user communication session, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment (e.g., the content is shared content in the three-dimensional environment). For example, in FIG. 5C, the first electronic device 501 is displaying visual indication 539 that corresponds to a request from the user of the third electronic device (e.g., "User 1") to share content (e.g., "Content A") with the user of the first electronic device 501. As shown in FIG. 5C, the visual indication 539 optionally includes a selectable option 539-1 that is selectable to approve the request from the user of the third electronic device to share content with the user of the first electronic device 501. In some examples, the first electronic device 501 displays the visual indication 539 in the three-dimensional environment 550 in response to detecting data corresponding to the share request discussed above.

Additionally, in some examples, the shared three-dimensional environment includes unshared content that is private to one user in the multi-user communication session. For example, in FIGS. 5B-5C, the third electronic device may be displaying a private application window in the three-dimensional environment at the third electronic device, which is optionally an object that is not shared between the first electronic device 501 and the third electronic device in the multi-user communication session. In some examples, the private application window may be associated with a respective application that is operating on the third electronic device (e.g., such as a virtual extended display application, a media player application, a web browsing application, a messaging application, etc.). Because the private application window is not shared with the first electronic device 501, the first electronic device 501 optionally displays a representation of the private application window 504" in three-dimensional environment 550, as shown in FIGS. 5B-5C. As shown in FIGS. 5B-5C, in some examples, the representation of the private application window 504" may be a faded, occluded, discolored, and/or translucent representation of the private application window that prevents the user of the first electronic device 501 from viewing contents of the private application window.

In FIG. 5C, while displaying the visual indication 539 in the three-dimensional environment 550, the first electronic device 501 detects a selection input 571B directed to the selectable option 539-1 of the visual indication 539. For example, as similarly discussed above, the first electronic device 501 detects an air pinch gesture, a tap or touch gesture, a verbal command, a gaze dwell directed to the selectable option 539-1, etc. In some examples, such as in FIG. 5C, the request to share content with the first electronic device 501 corresponds to a request to share the private application window 504" (visible in the three-dimensional environment 550) with the user of the first electronic device 501.

Figure 5D:
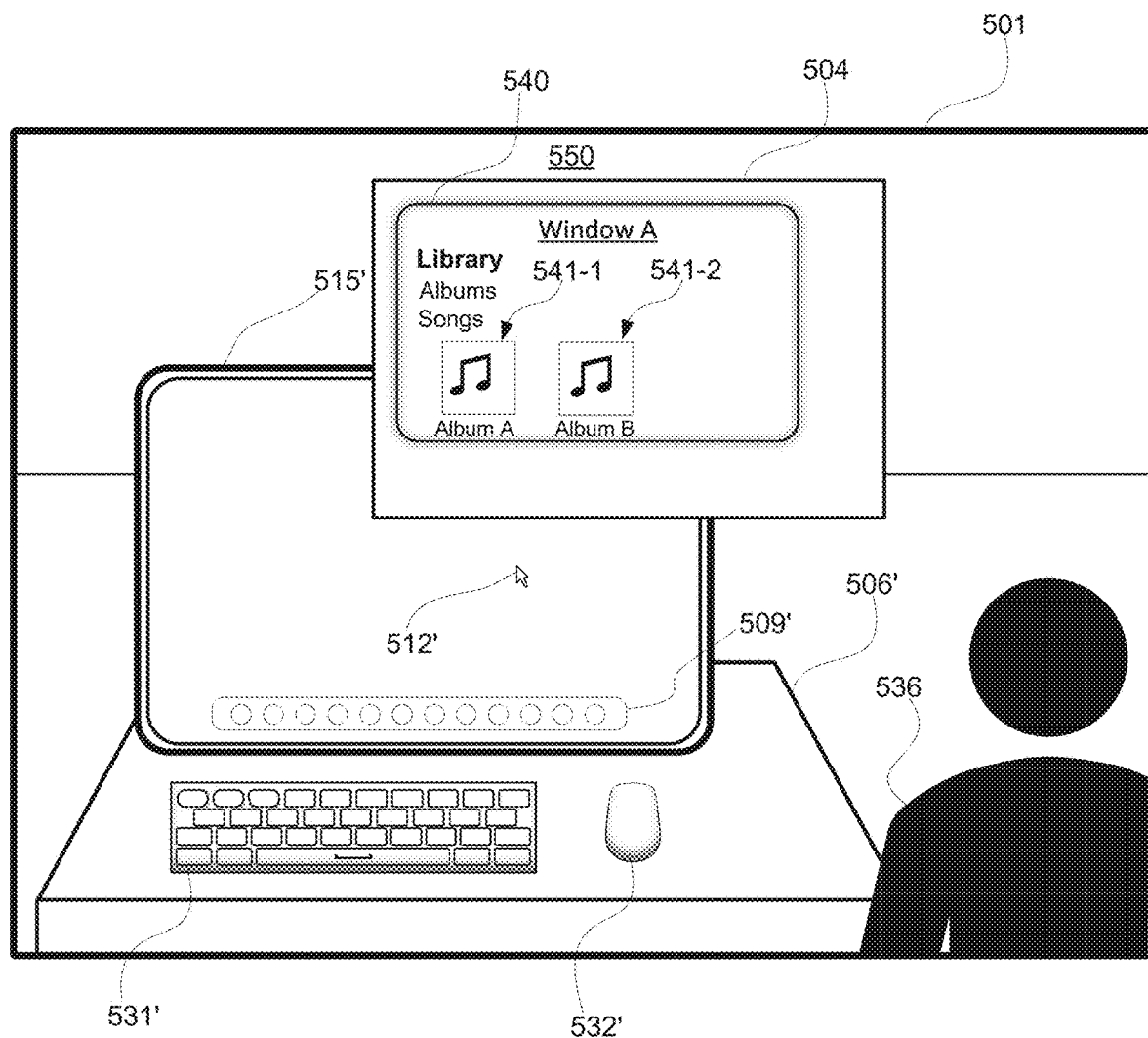

In some examples, as shown in FIG. 5D, in response to detecting the selection of the selectable option 539-1, the first electronic device 501 approves the request from the third electronic device to share the content with the first electronic device 501. In some examples, because the content that is shared with the first electronic device 501 corresponds to the content of the private application window discussed above, the first electronic device 501 ceases display of the representation of the private application window 504" in the three-dimensional environment 550. Additionally, as shown in FIG. 5D, when the content is shared with the first electronic device 501, the first electronic device 501 displays an image 504 corresponding to the shared content in the three-dimensional environment 550. In some examples, when the first electronic device 501 displays the image 504 in the three-dimensional environment 550, as shown in FIG. 5D, a position of the avatar 536 corresponding to the user of the third electronic device optionally changes in the three-dimensional environment 550. For example, the avatar 536 is moved to a location that is adjacent to (e.g., to the right of) the viewpoint of the user of the first electronic device 501, such that the avatar 536 is also facing toward the content of the image 504 in the three-dimensional environment 550, as shown in FIG. 5D.

In some examples, the image 504 corresponds to an image of a virtual extended display of a fourth electronic device, different from the first electronic device 501 and the second electronic device 515'. For example, the virtual extended display is a second display for the fourth electronic device that is in communication with the third electronic device, similar to the communication between the electronic devices 401 and 415 described previously above. In some examples, the third electronic device was displaying the virtual extended display in the three-dimensional environment at the third electronic device and, in response to detecting user input from the user of the third electronic device, transmitted a request (e.g., via an application sharing application) to share an image of the virtual extended display with the user of the first electronic device 501 as discussed above. As shown in FIG. 5D, the image 504 of the virtual extended display includes user interface 540. For example, before the image of the virtual extended display was shared with the first electronic device 501, the user interface 540 was displayed in the virtual extended display at the third electronic device. In some examples, in FIG. 5D, the user interface 540 is a user interface of a music player application. For example, as shown in FIG. 5D, the user interface 540 includes a first representation 541-1 of a first music album and a second representation 541-2 of a second music album, each containing selectable indications of music tracks that are available for consumption on the fourth electronic device and/or the third electronic device.

In some examples, though the user of the first electronic device 501 may view the content of the image 504 that is shared between the first electronic device 501 and the third electronic device, the first electronic device 501 optionally restricts and/or prevents direct user interaction with the content of the image 504, such as interaction with the user interface 540. Particularly, in some examples, the user of the first electronic device 501 is unable to provide input for interacting with the content of the image 504 because only an image of the virtual extended display is shared with the first electronic device 501, rather than the virtual extended display being a true shared experience itself. Accordingly, because the virtual extended display is optionally being shared by the third electronic device, as discussed above, the user of the third electronic device may interact with the user interface 540 at the third electronic device, which would cause the image 504 to be updated in the three-dimensional environment 550, but the user of the first electronic device 501 may be unable to do so, as discussed below.

Figure 5E:
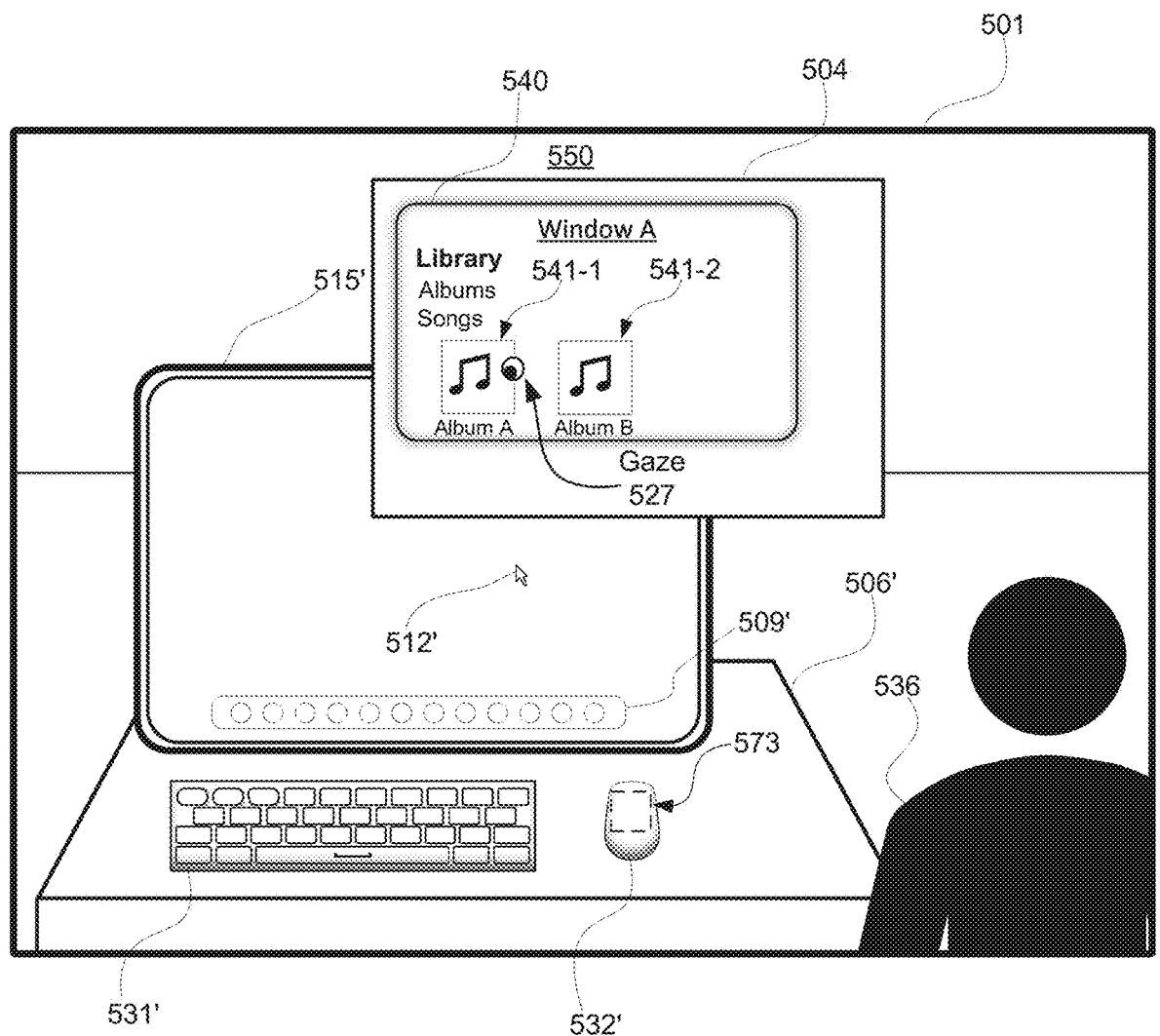

In FIG. 5E, while the image 504 of the virtual extended display is displayed in the three-dimensional environment 550 at the first electronic device 501, the second electronic device 515' detects a selection input 573 via the mouse 532' that is in communication with the second electronic device 515'. For example, the second electronic device 514' detects a press or click of a button on the mouse 532' (or a tap on a touch-sensitive surface of the mouse 532'). Additionally, as shown in FIG. 5E, the second electronic device 514' detects the selection input 573 while the gaze 527 of the user of the first electronic device 501 is directed toward the user interface 540 of the image 504 in the three-dimensional environment 550.

Figure 5F:
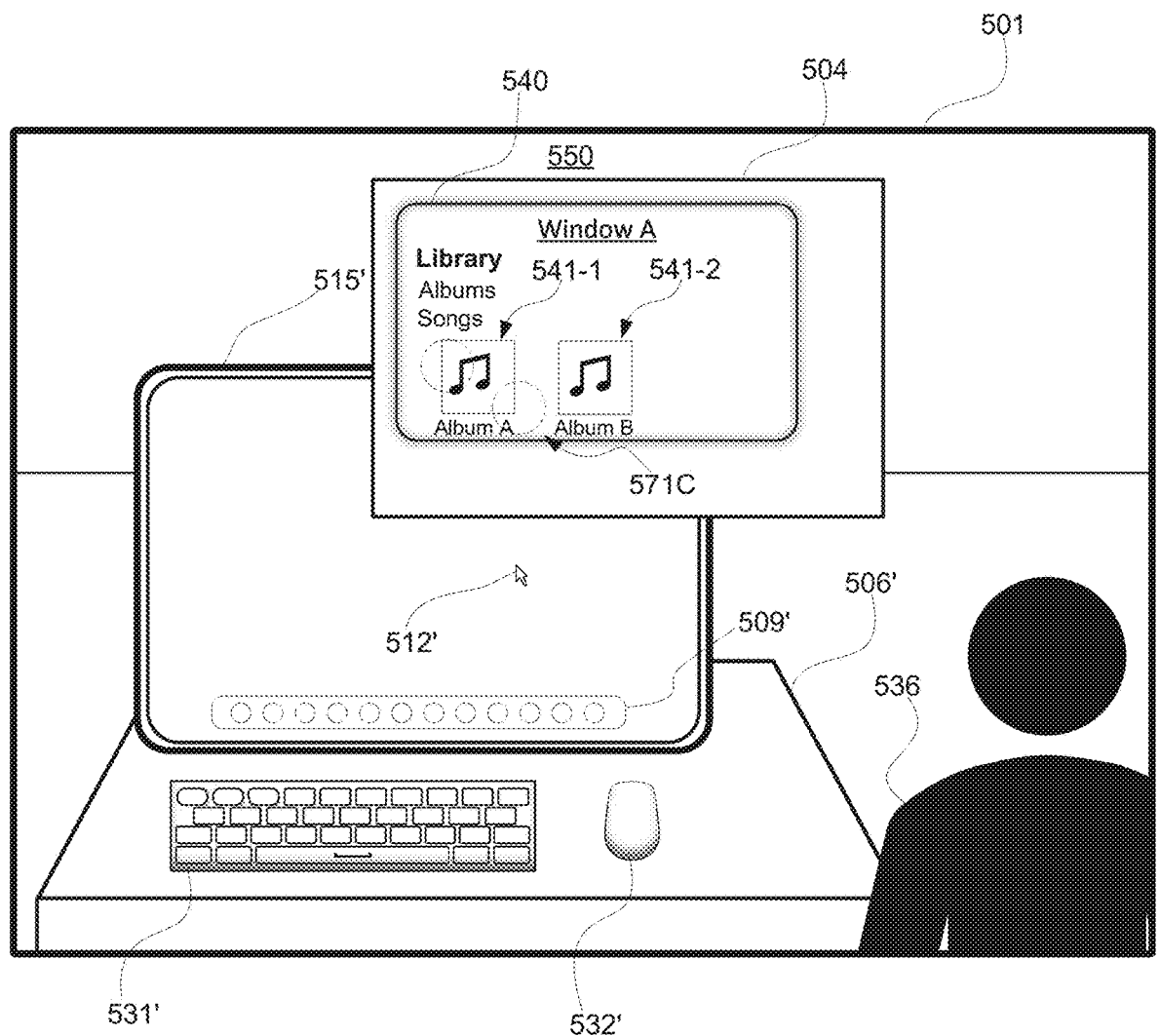

In some examples, as shown in FIG. 5F, in response to the second electronic device 514' detecting the selection input 573 via the mouse 532' while the first electronic device 501 detects the gaze 427 directed toward the user interface 540 of the image 504, the first electronic device 501 forgoes performing an operation directed to the image 504. For example, because the virtual extended display of the image 504 is not an extended display for the second electronic device 514' as discussed above, the input detected via the mouse 532' is not interpreted by the first electronic device 501 as being directed to the image 504. Rather, in some examples, the selection input 573 that is detected by the second electronic device 514' remains local to the second electronic device 514' (e.g., the second electronic device 514' performs a selection operation in accordance with the selection input 573 without transmitting input data to the first electronic device 501 in the manner discussed previously).

Figure 5G:
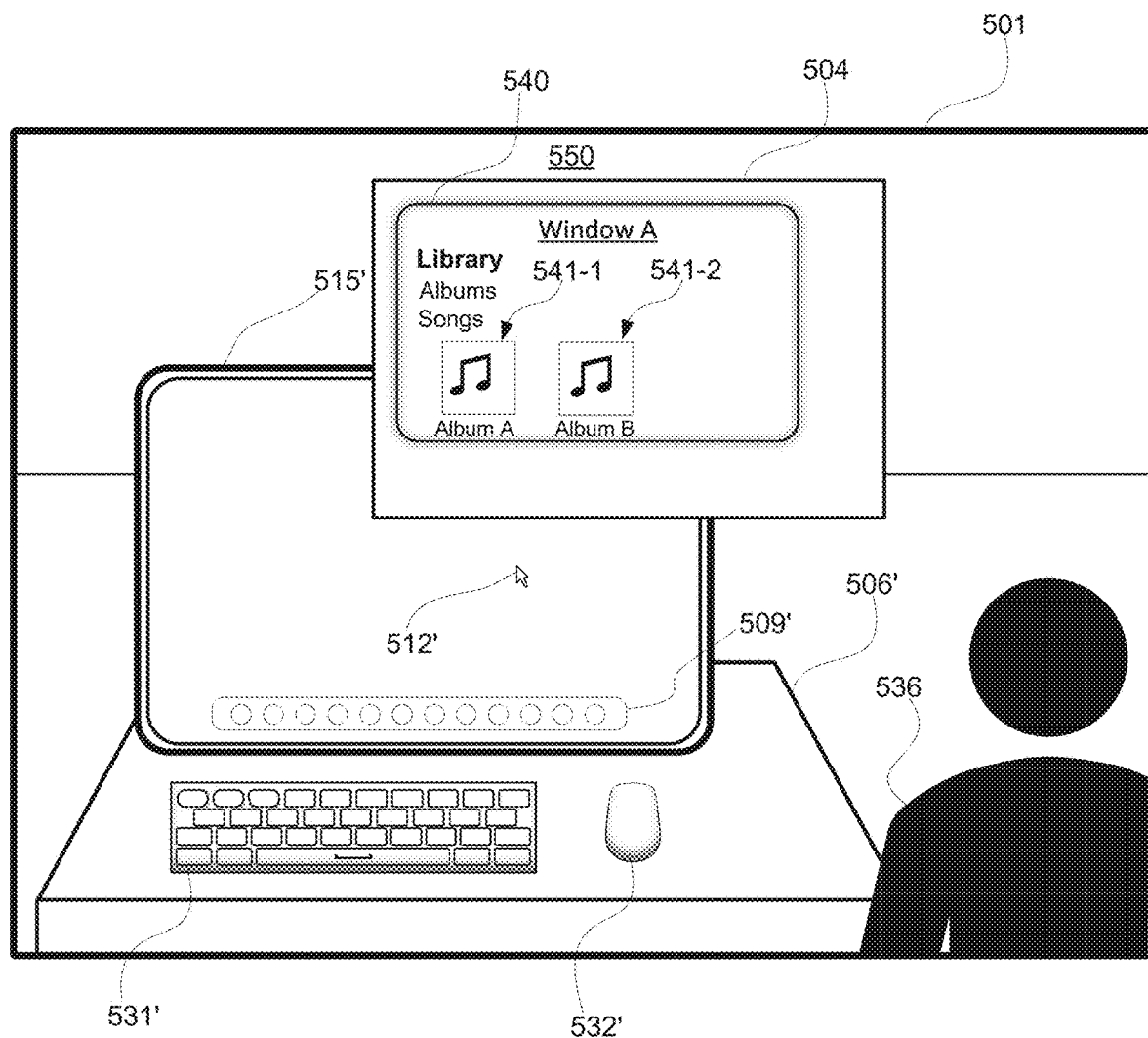

In FIG. 5F, while displaying the image 504 of the virtual extended display in the three-dimensional environment 550, the first electronic device 501 detects a selection input 571C directed to the first representation 541-1 of the user interface 540 in the image 504. For example, as similarly discussed herein above, the first electronic device 501 detects an air pinch gesture, an air tap or touch gesture, a verbal command, a gaze dwell directed to the first representation 541-1, etc. In some examples, in response to detecting the selection of the first representation 541-1 in the image 504, the first electronic device 501 forgoes performing a selection operation directed to the first representation 541-1, as shown in FIG. 5G. For example, as shown in FIG. 5G, the image 504 is not updated such that music tracks associated with the first album (e.g., "Album A") are displayed in the user interface 540 in response to the selection input 571C.

In some examples, as similarly described above, because the virtual extended display of the image 504 is not a true shared experience between the first electronic device 501 and the third electronic device (e.g., because the virtual extended display is not shared with the user of the first electronic device 501, but rather an image of the virtual extended display), user input detected by the first electronic device 501 that is directed to the image 504, including the user interface 540, does not cause the image 504 to be updated based on the user input. Therefore, as shown in FIG. 5G, the image 504 remains unchanged in the three-dimensional environment 550. Accordingly, as outlined above, while the first electronic device 501 and the third electronic device are communicatively linked in the multi-user communication session, if an image of a virtual extended display that is displayed at the third electronic device is shared with the first electronic device 501, input provided by the user of the first electronic device 501 may not cause the content of the image (e.g., image 504) to be updated in accordance with the input.

In some examples, interactions directed to the image 504 itself may be provided for, rather than the content of the image 504. For example, if the user of the first electronic device 501 provides input for moving the image 504 within the three-dimensional environment 550 (e.g., as opposed to input for moving the user interface 540 within the image 504), the first electronic device 501 may move the image 504 in accordance with the input. Similarly, if the user of the first electronic device 501 provides input for scaling the image 504 within the three-dimensional environment 550 (e.g., as opposed to changing a size of the user interface 540 within the image 504), the first electronic device 501 may scale the image 504 in accordance with the input. In some examples, if the user of the third electronic device shares the content of the image 504 itself, such shared content may be configured to be interacted with by the user of the first electronic device 501. For example, in FIG. 5C, if the content being shared with the user of the first electronic device 501 were the user interface 540 itself, the first electronic device 501 would display a shared application window corresponding to the user interface 540 in FIG. 5D, and inputs directed to the content of the shared application window (e.g., such as the first representation 541-1 and/or the second representation 541-2) would be acted upon by the first electronic device 501.

It is understood that the examples shown and described herein are merely exemplary and that additional and/or alternative elements may be provided within the three-dimensional environment for interacting with the virtual objects and elements. It should be understood that the appearance, shape, form, and size of each of the various user interface elements and objects shown and described herein are exemplary and that alternative appearances, shapes, forms and/or sizes may be provided. For example, the virtual objects representative of virtual extended displays (e.g., virtual extended display 304/404) and/or user interfaces (e.g., user interfaces 411, 425, and/or 540) may be provided in an alternative shape than a rectangular shape, such as a circular shape, triangular shape, etc. In some examples, the various selectable affordances (e.g., first affordance 319/519, and/or options 537-1/537-2 or 539-1) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Additionally, while only a single interface is shown within the physical and virtual extended displays, it should be appreciated that any number of interfaces may be included within each display. Moreover, while only a single virtual extended display (e.g., virtual extended display 304/404) is shown for a single electronic device (e.g., second electronic device 315/415), it should be appreciated that any number of virtual extended displays may be presented for each of any number of other electronic devices. In these examples, inputs detected by any of the electronic devices may be routed to the appropriate electronic device or interface in the same way as described above.

In some examples, in addition to displaying a virtual extended display, the first electronic device may display one or more additional virtual objects or windows corresponding to an application running on the first electronic device, as described in more detail with reference to FIGS. 6A-6K. For example, in addition to displaying a virtual extended display 404 containing a second user interface 425 for a web-browsing application of the second electronic device 415' in FIG. 4A, the first electronic device 401 may additional display a virtual window corresponding to a text document editing application run on the first electronic device 401 (and not the second electronic device 415'). In these examples, inputs detected by the first electronic device 401, second electronic device 415', or other coupled electronic device may be routed to the appropriate device, application, and/or interface in the same manner as described above.

Figure 6A:
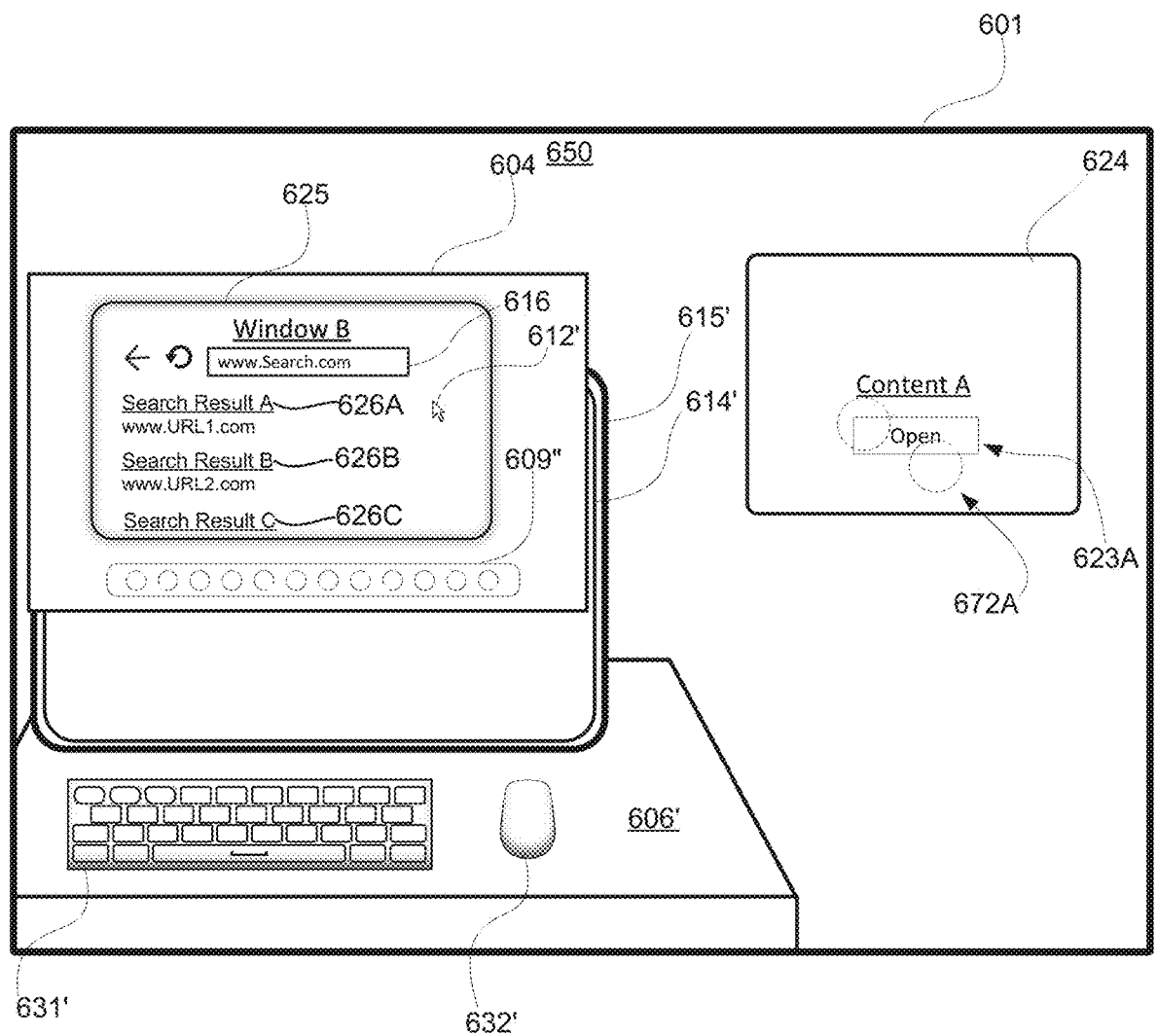
FIGS. 6A-6K illustrate examples of a first electronic device facilitating interactions with a representation of a user interface of a second electronic device and a user interface of the first electronic device according to some examples of the disclosure.

FIGS. 6A-6K illustrate examples of a first electronic device facilitating interactions with a representation of a user interface of a second electronic device and a user interface of the first electronic device according to some examples of the disclosure. In some examples, as shown in FIG. 6A, a three-dimensional environment 650 may be presented using a first electronic device 601. In some examples, the first electronic device 601 optionally corresponds to first electronic device 301/401/501 discussed above. In some examples, the three-dimensional environment 650 includes captured portions of the physical environment in which the first electronic device 401 is located. For example, the three-dimensional environment 650 optionally includes a table (e.g., a representation of table 606'), as shown in FIG. 6A. Additionally, the three-dimensional environment 650 includes a second electronic device (e.g., a representation of the second electronic device 615') and one or more physical input devices (e.g., one or more representations of the one or more input devices 631'/632') that are in communication with the second electronic device (e.g., positioned atop the table in the physical environment). In some examples, the three-dimensional environment 650 optionally corresponds to three-dimensional environment 350/450/550 described above. In some examples, the second electronic device 615' corresponds to second electronic device 315'/415'/515' described above. In some examples, the one or more input devices 631'/632' correspond to the one or more input devices 331'/332', 431'/432', 531'/532' described above. In some examples, the representations of the physical environment can include portions of the physical environment viewed through a transparent or translucent display of first electronic device 601.

As similarly discussed above, in some examples, the first electronic device 601 is in communication with the second electronic device 615'. Additionally, in some examples, as shown in FIG. 6A, the first electronic device 601 is presenting a virtual display 604 that is associated with the second electronic device 615'. For example, in FIG. 6A. the virtual display 604 functions as a (e.g., virtual) display to a physical display (e.g., a representation of display 614') of the second electronic device 615'. In some examples, the virtual display 604 has one or more characteristics of the virtual extended display 304/404/504 described above. In some examples, as shown in FIG. 6A, while the virtual display 604 is displayed in the three-dimensional environment 650, the display 614' of the second electronic device 615' is optionally powered off (e.g., the second electronic device 615' is in a lower power mode or sleep state or is powered down).

In some examples, as shown in FIG. 6A, the virtual display 604 includes user interface 625, which is optionally a representation of a user interface that is configured to be (e.g., or that is currently) displayed on the (e.g., physical) display 614' of the second electronic device 615'. In some examples, as shown in FIG. 6A, user interface 625 includes a plurality of search results provided by the web browser (e.g., associated with the URL "www.Search.com"). For example, in FIG. 6A, the user interface 625 includes a first search result 626A (e.g., "Search Result A") that is associated with a first website (e.g., "www.URL1.com"), a second search result 626B (e.g., "Search Result B") that is associated with a second website (e.g., "www.URL2.com"), and a third search result 626C (e.g., "Search Result C") that is associated with a third website. In some examples, the plurality of search results 626 is selectable to access content (e.g., text, image, video, music, etc.) via their respective sources (e.g., websites). In some examples, the user interface 625 corresponds to second user interface 425 discussed above. Additionally, as shown in FIG. 6A, the virtual display 604 includes a representation of a dock 609" corresponding to a dock (not shown) that is configured to be displayed on the (e.g., physical) display 614' of the second electronic device 615' (e.g., such as the dock 309/409'/509'/discussed above). In some examples, as shown in FIG. 6A, the virtual display 604 also includes a cursor (e.g., a representation of the cursor 612') that is configured to be displayed on the display 614' of the second electronic device 615' and that is controllable using the mouse 632'. In some examples, the cursor 612' corresponds to the cursor 312'/412'/512' described above.

In some examples, as similarly discussed previously, the first electronic device 601 displays the user interface 625 in the virtual display 604 based on image data transmitted to the first electronic device 601 by the second electronic device 615' (e.g., directly or indirectly via a server). For example, as previously discussed above, the user interface 625 is configured to be displayed on the display 614' of the second electronic device 615' (e.g., the user interface 625 is a user interface of the second electronic device 615'). Accordingly, in some examples, the first electronic device 601 renders (e.g., generates) the user interface 625, including the content of the user interface 625 discussed above, based on the image data provided by the second electronic device 615'. For example, the image data includes information corresponding to an appearance of the user interface 625, characteristics of the content of the user interface 625 (e.g., whether the content is interactive, such as selectable, scrollable, etc.), and/or a quality (e.g., image quality, such as definition) of the user interface 625 and its content. In some examples, the image data transmitted to the first electronic device 601 by the second electronic device 615' includes an image generated by the second electronic device 615' that is to be displayed in the virtual display 604 by the first electronic device 601.

In some examples, the first electronic device 601 is configured to display content associated with an application running (e.g., locally) on the first electronic device 601 concurrently with the virtual display 604. In some examples, as discussed below, the first electronic device 601 is configured facilitate interaction with the content of the virtual display 604 and the content of the application running locally on the first electronic device 601. In FIG. 6A, the first electronic device 601 is displaying user interface object 624 that is associated with a respective application in the three-dimensional environment 650. In some examples, as shown in FIG. 6A, the user interface object 624 includes selectable option 623A that is selectable to display content (e.g., "Content A") corresponding to the respective application in the three-dimensional environment 650. In some examples, the content includes user interfaces, video, images, three-dimensional objects (e.g., models), etc.

In some examples, as shown in FIG. 6A, the first electronic device 601 detects a selection input 672A directed to the selectable option 623A. For example, in FIG. 6A, the first electronic device 601 detects (e.g., via one or more sensors, such as cameras or other hand-tracking sensors) an air pinch gesture, an air tap or touch gesture, optionally while the gaze of the user is directed to the selectable option 623A, a verbal command, a gaze dwell, etc.

Figure 6B:
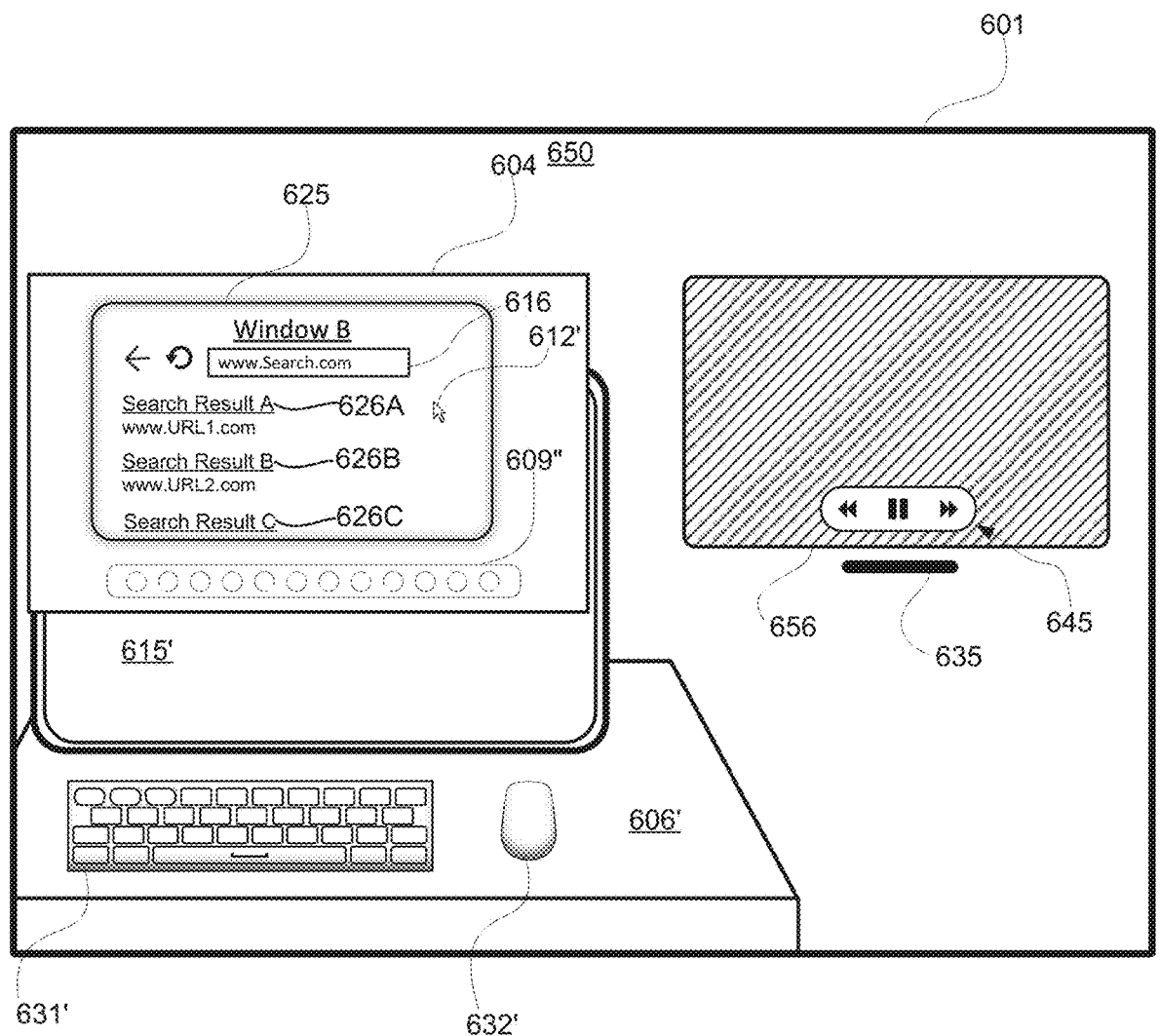

In some examples, as shown in FIG. 6B, in response to detecting the selection input 672A, the first electronic device 601 displays video content (Content A indicated in FIG. 6A) associated with the respective application discussed above (e.g., a video playback application running on the first electronic device 601). For example, as shown in FIG. 6B, the first electronic device 601 displays a virtual application window 656 (e.g., a video playback user interface) that is displaying video content (e.g., a movie, television show, video clip, music video, etc.) in the three-dimensional environment 650. As shown in FIG. 6B, the virtual application window 656 includes playback controls 645 (e.g., including a play/pause button, a rewind button, and a fast forward button, among other possibilities) for controlling playback of the video content being displayed in the virtual application window 656. In some examples, as shown in FIG. 6B, the virtual application window 656 is displayed with a grabber affordance 635 (e.g., a handlebar affordance) that is selectable via user input to initiate movement of the virtual application window 656 within the three-dimensional environment 650.

Figure 6C:
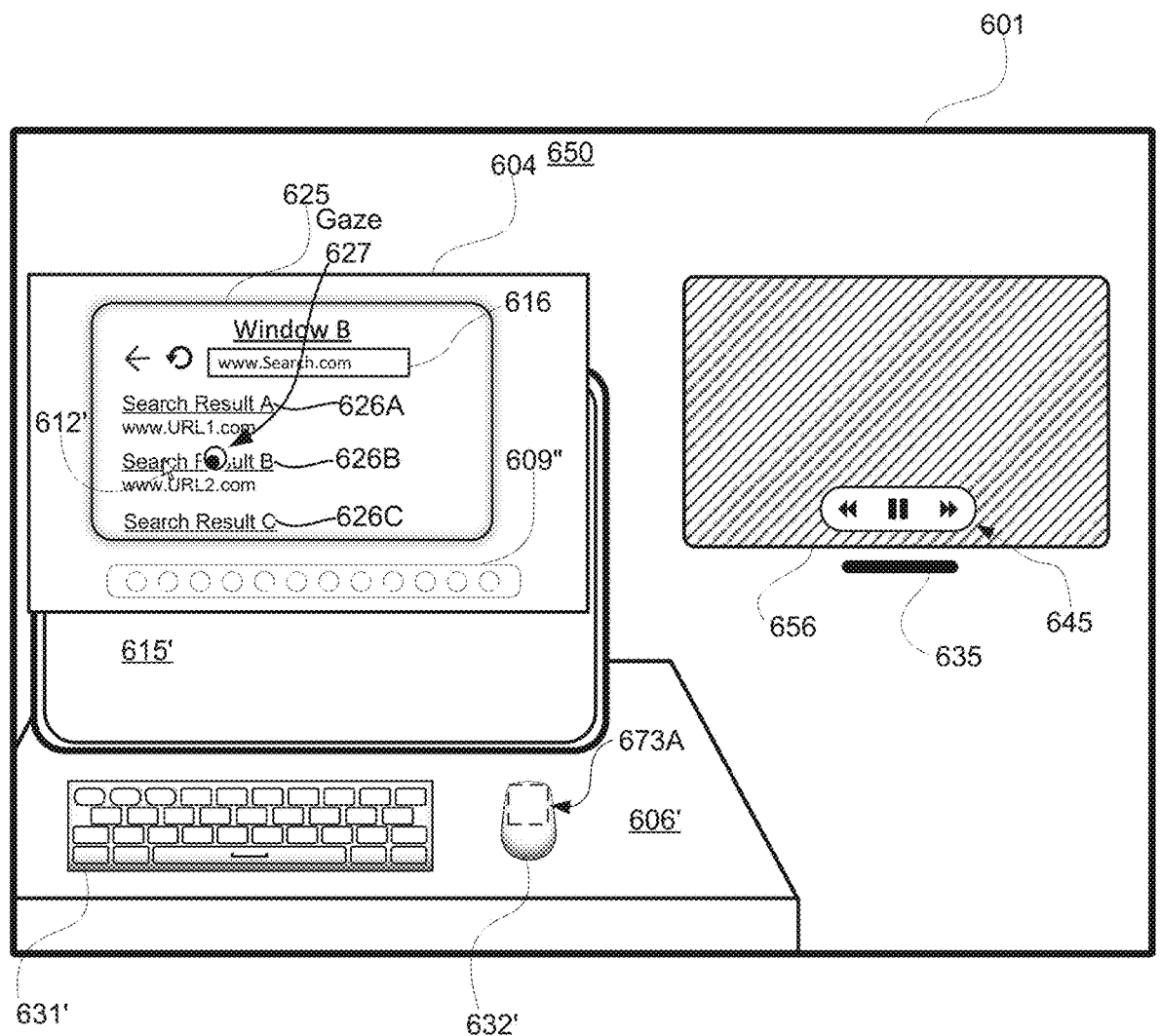

In some examples, as similarly discussed herein above, the first electronic device 601 communicates with the second electronic device 615' to facilitate and coordinate interaction with the content of the virtual display 604 and/or the content of the virtual application window 656 in response to user input based on a location of a gaze of the user of the first electronic device 601. For example, as shown in FIG. 6C, the first electronic device 601 detects (e.g., via eye-tracking sensors and/or image sensors) gaze 627 of the user is directed to the virtual display 604. Particularly, in FIG. 6C, the first electronic device 601 detects the gaze 627 is directed to a particular location corresponding to the content of the virtual display 604.

In FIG. 6C, while the first electronic device 601 is detecting the gaze 627 of the user is directed to the virtual display 604 in the three-dimensional environment 650, the second electronic device 615' detects a selection input 673A on mouse 632' that is in communication with the second electronic device 615'. For example, in FIG. 6C, the second electronic device 615' detects a click, tap, or touch of a button or touch-sensitive surface of the mouse 632'. As similarly described above, because the gaze 627 is directed to the virtual display 604 in the three-dimensional environment 650, in response to detecting the selection input 673A, the second electronic device 615' maintains the selection input 673A local to the second electronic device 615'. For example, the first electronic device 601 communicates (e.g., transmits) gaze data to the second electronic device 615' (e.g., continuously, periodically, and/or in response to a request from the second electronic device 615') that includes information corresponding to a location of the gaze 627 in the three-dimensional environment 602.

Figure 6D:
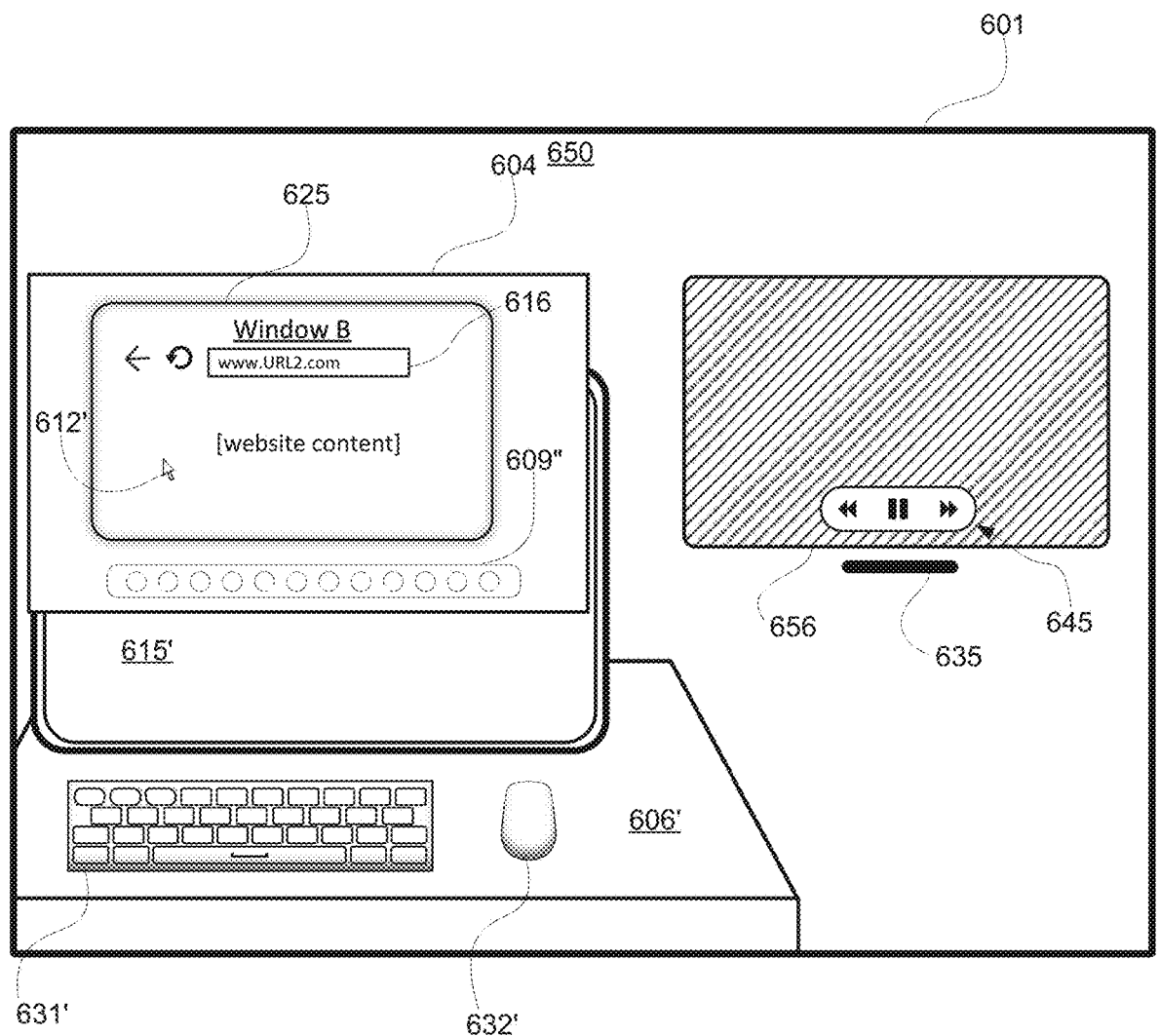

In some examples, in accordance with the determination that the gaze 627 is directed to the virtual display 604 (e.g., and the user interface 625 particularly), the first electronic device 601 causes the second electronic device 615' to perform an operation in accordance with the selection input 673A. For example, in FIG. 6C, the second electronic device 615' performs a selection at a location of the cursor 612' in the user interface 625. Particularly, as shown in FIG. 6C, the second electronic device 615' selects (e.g., activates) the second search result 626B based on the location of the cursor 612' in the user interface 625. It should be understood that, though the user interface 625 is not displayed on the (e.g., physical) display of the second electronic device 615' in the example of FIG. 6C, performing the selection operation includes updating the image data representing the user interface 625 (e.g., as if the user interface 625 were displayed on the display of the second electronic device 615'). In some examples, when the second electronic device 615' performs the selection operation, the second electronic device 615' transmits updated image data to the first electronic device 601 that causes the first electronic device 601 to update the representation of the virtual display 604 in the three-dimensional environment 650 based on the performance of the selection operation. For example, as shown in FIG. 6D, the first electronic device 601 updates display of the virtual display 604 to include an updated representation of the user interface 625. Particularly, as shown in FIG. 6D, the user interface 625 is updated to include the result of the selection of the second search result 626B in FIG. 6C, namely displaying website content (e.g., "website content" in text-entry field 616) from the website (e.g., "www.URL2.com") associated with the second search result 626B.

Figure 6E:
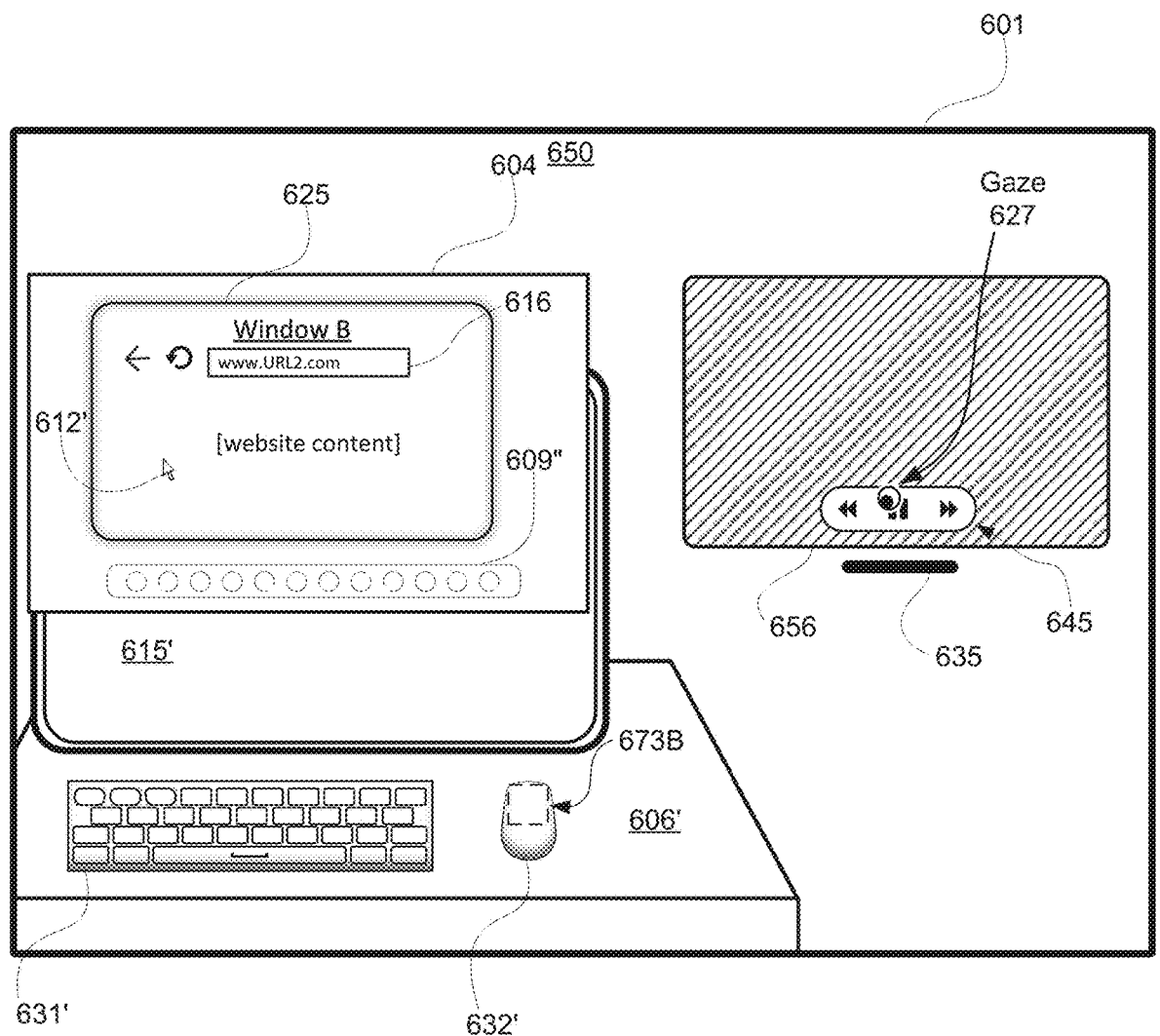

In FIG. 6E, the first electronic device 601 detects the gaze 627 of the user is directed to the virtual application window 656 in the three-dimensional environment 650. Particularly, as shown in FIG. 6E, the first electronic device 601 detects the gaze 627 is directed to the playback controls 645 (e.g., the pause button of the playback controls 645). In FIG. 6E, while the first electronic device 601 is detecting the gaze 627 directed to the virtual application window 656, the second electronic device 615' detects a selection input 673B via the mouse 632' that is in communication with the second electronic device 615', as similarly described above.

In some examples, as similarly described above, because the gaze 627 is directed to the virtual application window 656 in the three-dimensional environment 650, in response to detecting the selection input 673B, the second electronic device 615' transmits input data corresponding to the selection input 673B to the first electronic device 601. For example, the second electronic device 615' transmits the input data to the first electronic device 601 based on the gaze data communicated (e.g., transmitted) by the first electronic device 601 to the second electronic device 615', as similarly discussed above.

Figure 6F:
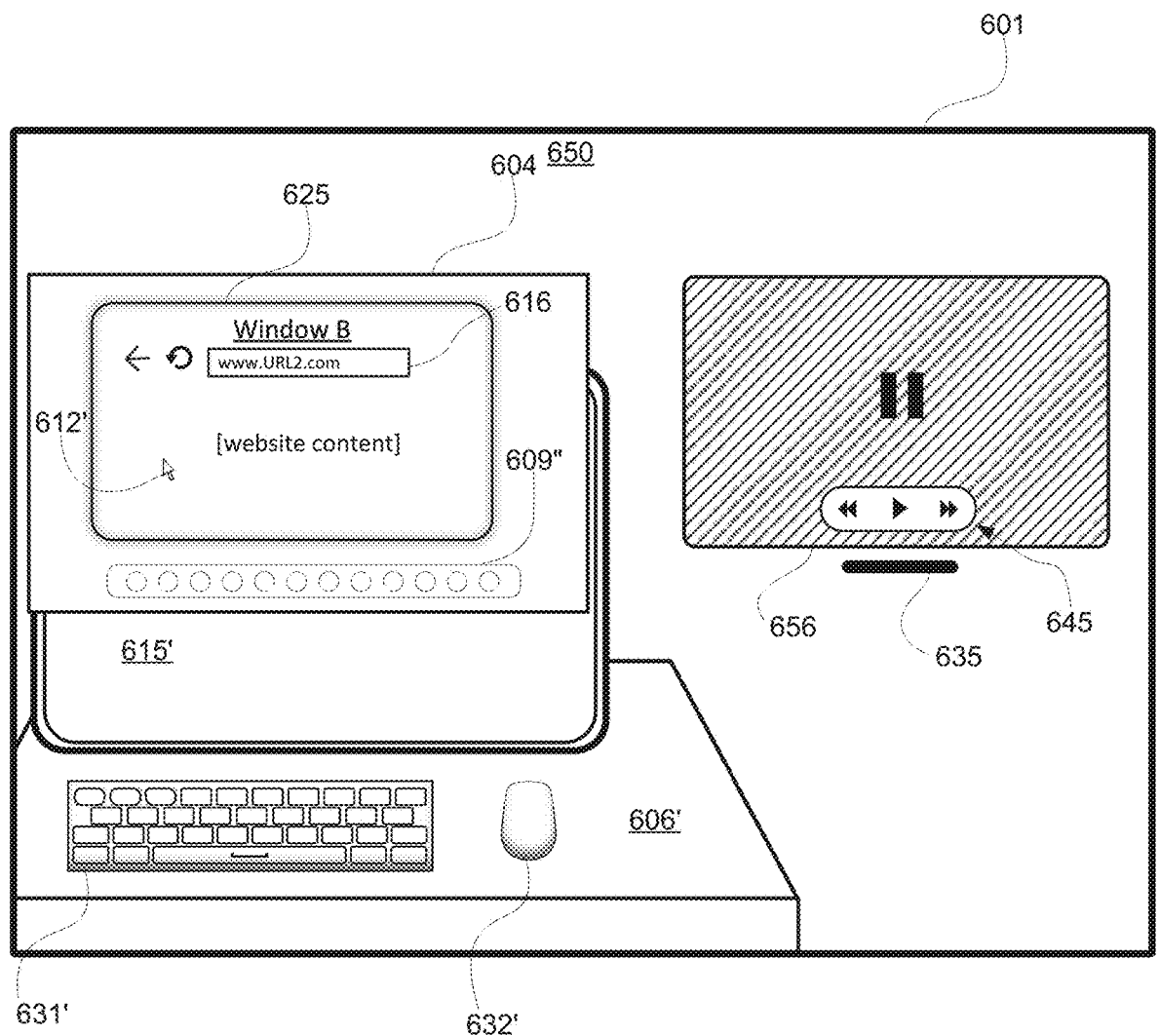

In some examples, in accordance with the determination that the gaze 627 is directed to the virtual application window 656 (e.g., and the playback controls 645 particularly), the first electronic device 601 performs an operation in accordance with the selection input 673B. For example, in FIG. 6E, the first electronic device 601 performs a selection at a location of the gaze 627 in the virtual application window 656. Particularly, as shown in FIG. 6E, the first electronic device 601 selects (e.g., activates) the pause button of the playback controls 645 based on the location of the gaze 627 in the virtual application window 656 (e.g., rather than based on the location of the cursor 612' in the user interface 625, as previously discussed herein). In other examples, selection input 673B may be performed in accordance with the location of cursor 612'. In some examples, as shown in FIG. 6F, when the first electronic device 601 selects the pause button of the playback controls 645, the first electronic device 601 pauses playback of the video content in the virtual application window 656 in the three-dimensional environment 650. Additionally, as shown in FIG. 6F, the first electronic device 601 optionally updates the pause button to be a play button in the playback controls 645 in the virtual application window 656. In some examples, when the first electronic device 601 performs the selection operation directed to the virtual application window 656, the first electronic device 601 forgoes transmitting output data corresponding to the selection of the pause button of the playback controls 645 in the virtual application window 656 to the second electronic device 615'.

Figure 6G:
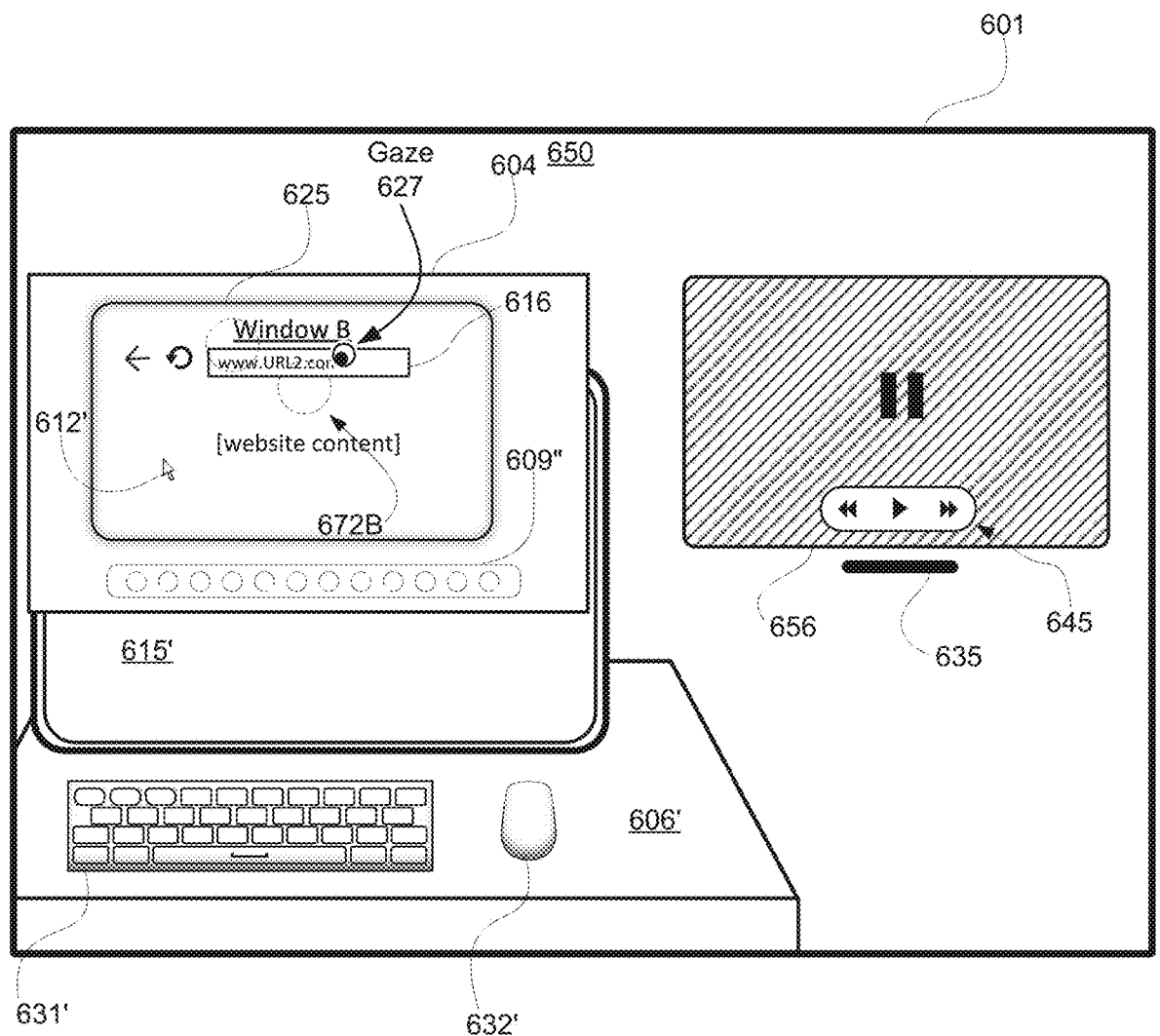

In FIG. 6G, while the gaze 627 is directed to the virtual display 604 in the three-dimensional environment 650, the first electronic device 601 detects, via one or more input devices of the first electronic device 601, a selection input 672B directed to the content of the virtual display 604. For example, as shown in FIG. 6G, the first electronic device 601 detects an air pinch gesture, a tap or touch gesture, a verbal command, etc. while the gaze 627 is directed toward the text-entry field 616 of the user interface 625 in the virtual display 604.

Figure 6H:
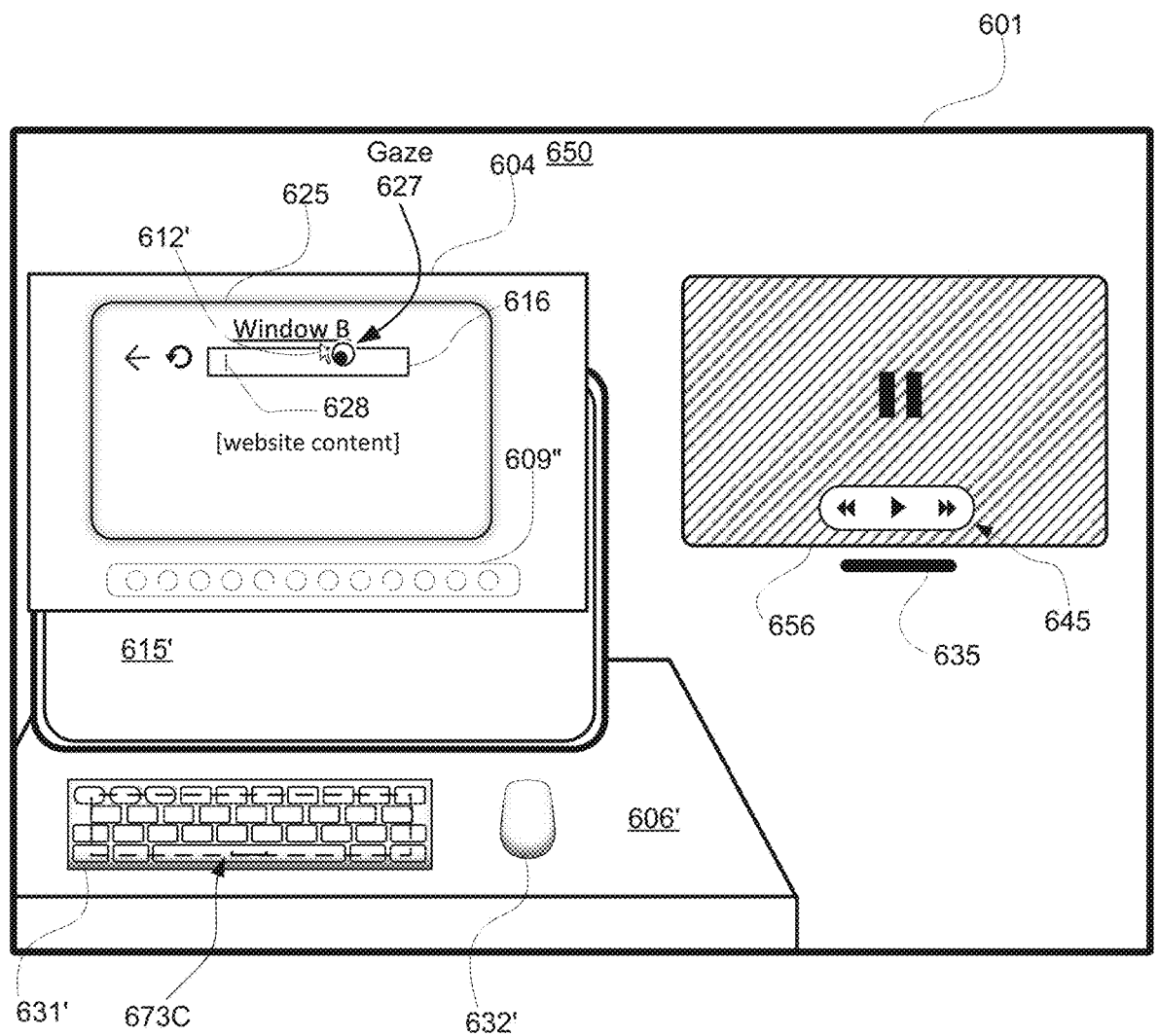

In some examples, in response to detecting the selection input 672B while the gaze 627 is directed to the virtual display 604, the first electronic device 601 transmits input data corresponding to the selection input 672B to the second electronic device 615'. In some examples, the second electronic device 615' performs an operation directed to the user interface 625 based on the input data corresponding to the selection input 672B. For example, the first electronic device 601 causes the second electronic device 615' to perform a selection operation directed to the text-entry field 616 based on the location of the gaze 627 in FIG. 6G. In some examples, as similarly discussed above, when the second electronic device 615' performs the selection operation, the second electronic device 615' transmits updated image data to the first electronic device 601 that causes the first electronic device 601 to update the representation of the virtual display 604 in the three-dimensional environment 650 based on the performance of the selection operation. For example, as shown in FIG. 6H, the first electronic device 601 updates display of the virtual display 604 to include an updated representation of the user interface 625. Particularly, as shown in FIG. 6H, the text-entry field 616 includes text cursor 628 and no longer includes the text "www.URL2.com" from FIG. 6G. Additionally, as shown in FIG. 6H, a location of the cursor 612' is optionally updated to correspond to the location of the gaze 627 in the user interface 625, as similarly discussed herein.

In FIG. 6H, while the gaze 627 remains directed to the virtual display 604, the second electronic device 615' detects a selection input 673C via one or more keys of keyboard 631' that is in communication with the second electronic device 615'. For example, as similarly discussed herein, the second electronic device 615' detects one or more presses or taps on one or more keys of the keyboard 631' while the first electronic device 601 is detecting the gaze 627 directed to the user interface 625 in the virtual display 604.

Figure 6I:
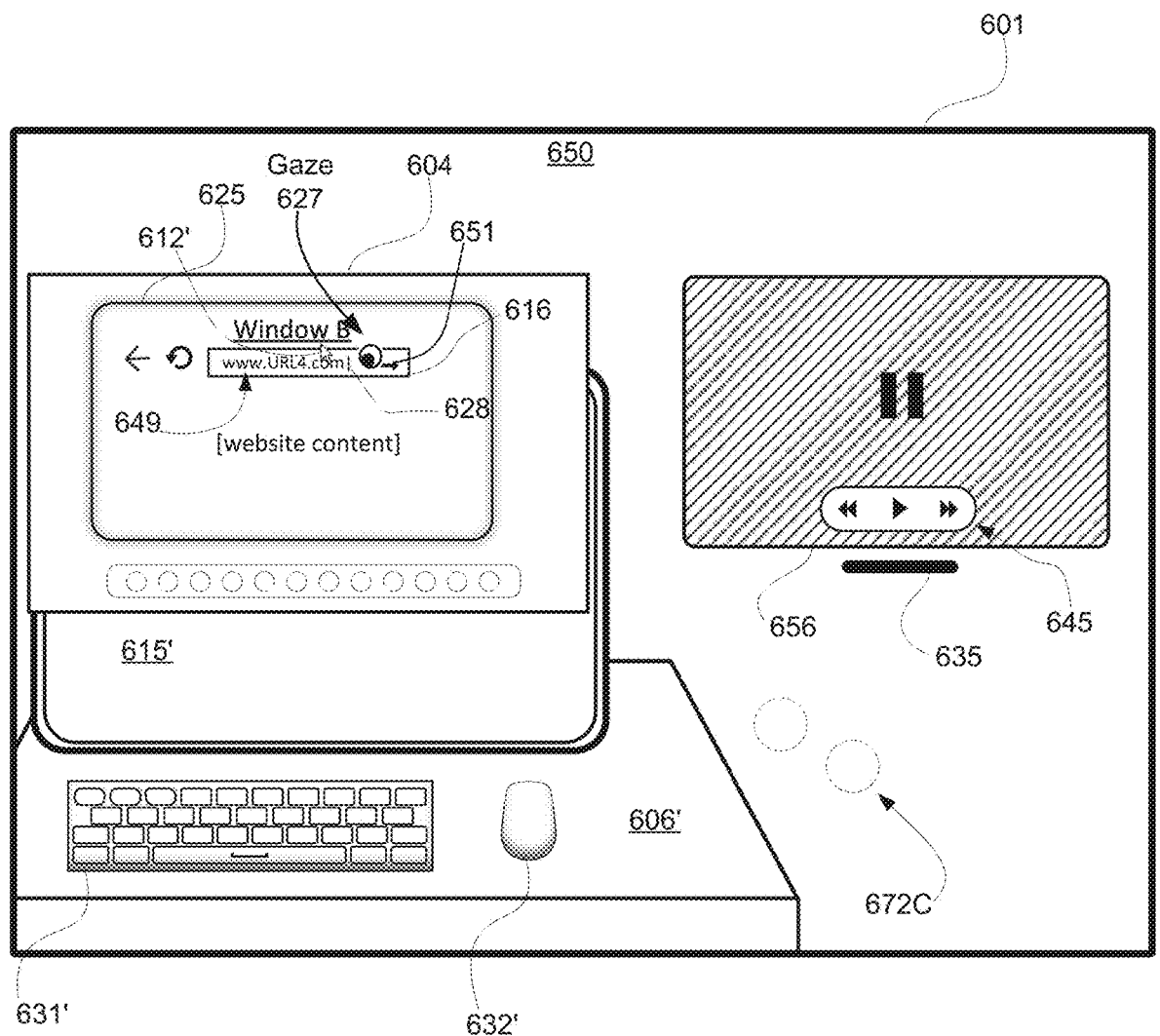

In some examples, as similarly discussed above, because the gaze 627 is directed to the virtual display 604 in the three-dimensional environment 650, in response to detecting the selection input 673C, the second electronic device 615' maintains the selection input 673C local to the second electronic device 615' (e.g., without transmitting input data corresponding to the selection input 673C to the first electronic device 601). For example, in FIG. 6H, the second electronic device 615' performs an operation directed to the user interface 625 in accordance with the selection input 673C, as similarly discussed above. In some examples, when the second electronic device 615' performs the operation in accordance with the selection input 673C, the second electronic device 615' updates the image data (e.g., pixel or display data) representing the user interface 625 based on the operation, and transmits updated image data to the first electronic device 601 that causes the first electronic device 601 to update the representation of the user interface 625 in the virtual display 604. For example, as shown in FIG. 6I, the first electronic device 601 updates the user interface 625 in the virtual display 604 such that the text-entry field 616 is updated to include text 649 (e.g., "www.URL4.com") that is entered at a location of the text cursor 628 based on the selected keys of the keyboard 631'. In FIG. 6I, while the gaze 627 is directed to the virtual display 604 in the three-dimensional environment 650, the first electronic device 601 detects a selection input 672C provided by the user of the first electronic device 601. For example, as shown in FIG. 6I, while the gaze 627 is directed to option 651 (e.g., enter or search option) in the text-entry field 616, the first electronic device 601 detects, via one or more sensors or input devices of the first electronic device 601, an air pinch gesture, a tap or touch gesture, a verbal command, a gaze dwell, etc., as similarly discussed herein. In some examples, as similarly discussed above, because the gaze 627 is directed to the virtual display 604 when the selection input 672C is detected, the first electronic device 601 transmits input data corresponding to the selection input 672C to the second electronic device 615' that causes the second electronic device 615' to perform an operation directed to the user interface 625 based on the location of the gaze 627. Particularly, in FIG. 6I, the second electronic device 615' performs a selection operation directed to the option 651 based on the location of the gaze 627 (e.g., in accordance with the gaze data discussed previously above that includes information corresponding to the location of the gaze 627 in the user interface 625).

Figure 6J:
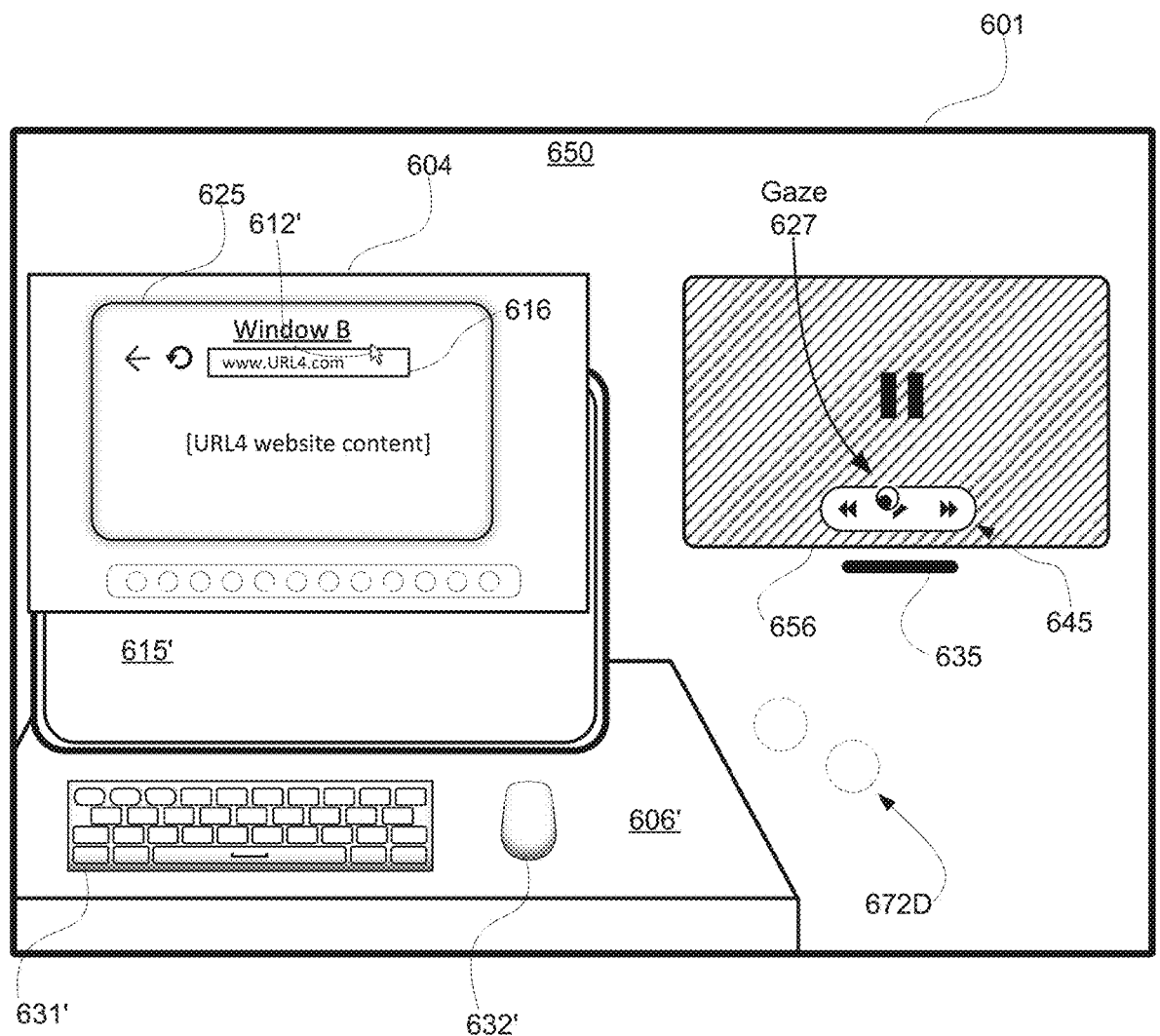

In some examples, as similarly discussed herein, when the second electronic device 615' performs the selection operation directed to the option 651, the second electronic device 615' updates the image data representing the user interface 625 and transmits updated image data to the first electronic device 601. In some examples, as shown in FIG. 6J, in response to receiving the updated image data from the second electronic device 615', the first electronic device 601 updates display of the user interface 625 displayed in the virtual display 604 in the three-dimensional environment 650. Particularly, as shown in FIG. 6J, selecting the option 651 in FIG. 6I causes the second electronic device 615' to navigate to the website "www.URL4.com" and display content (e.g., "URL4 website content") from the website, which is reflected in the updated representation of the user interface 625 in the virtual display 604 in the three-dimensional environment 650. Additionally, in some examples, as previously discussed herein, the first electronic device 601 updates a location of the cursor 612' in the user interface 625 based on the updated image data, such that the location of the cursor 612' is moved to the location of the gaze 627 when the selection input 672C was detected in FIG. 6I.

In FIG. 6J, while the gaze 627 is directed to the virtual application window 656 in the three-dimensional environment 650, the first electronic device 601 detects a selection input 672D as similarly described above. Particularly, as shown in FIG. 6J, the first electronic device 601 detects the selection input 672D (e.g., an air pinch gesture, air tap or touch gesture, verbal command, etc.) while the gaze 627 is directed to the playback controls 645 (e.g., the play button in the playback controls 645) in the virtual application window 656.

Figure 6K:
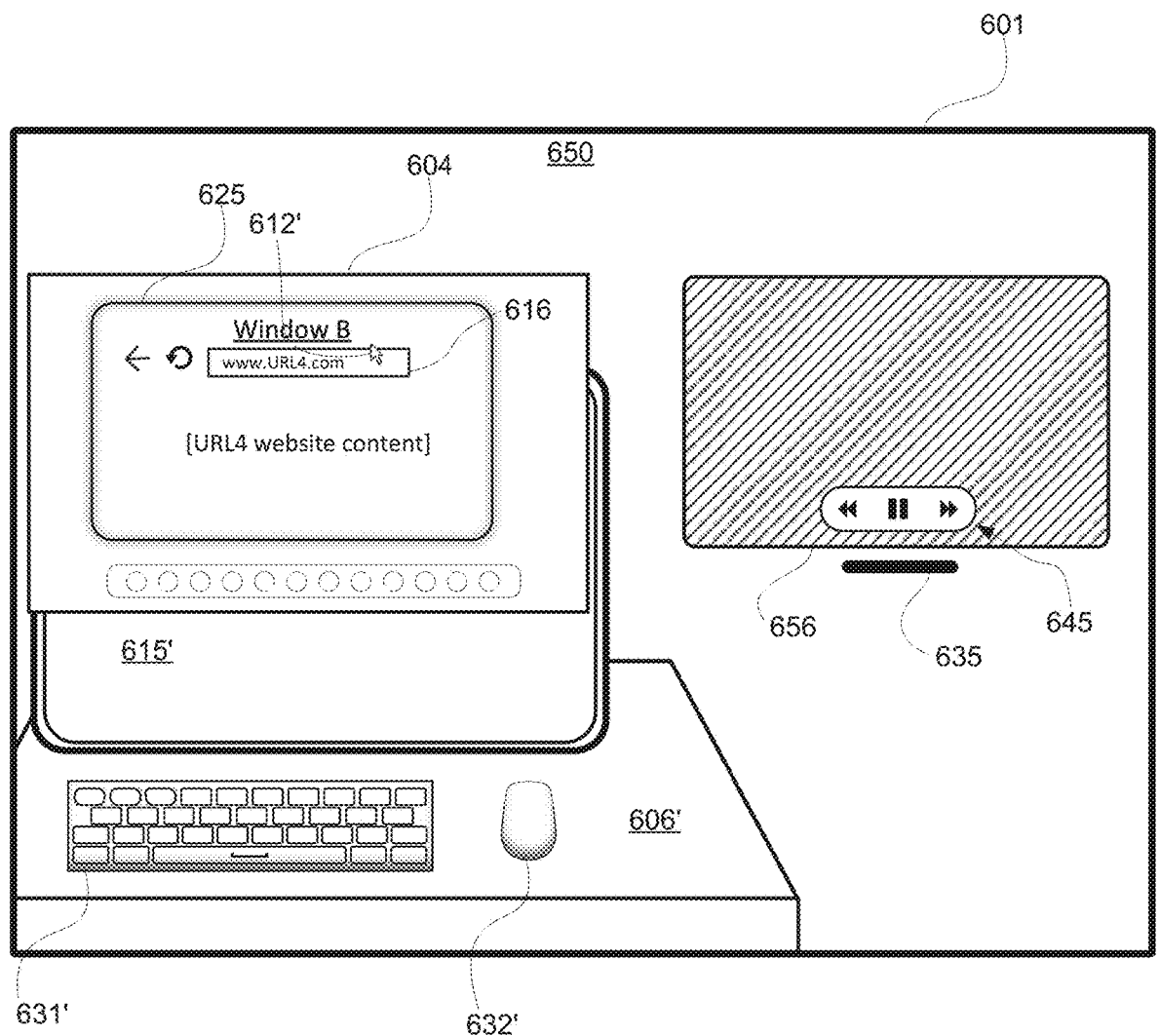

In some examples, as shown in FIG. 6K, because the gaze 627 was directed to the virtual application window 656 when the selection input 672D was detected in FIG. 6J, the first electronic device 601 performs an operation directed to the virtual application window 656 in accordance with the selection input 672D. For example, as shown in FIG. 6K, the first electronic device 601 selects the play button of the playback controls 645, which causes the video content displayed in the virtual application window 656 to resume playback in the three-dimensional environment 650. Additionally, as shown in FIG. 6K, the first electronic device 601 replaces the play button with a pause button in the playback controls 645 as similarly discussed previously.

In some examples, as similarly discussed herein, when the first electronic device 601 performs the selection operation discussed above, the first electronic device 601 forgoes transmitting output data corresponding to the selection operation to the second electronic device 615'. Particularly, the input data corresponding to the selection input 672D in FIG. 6J is maintained local to the first electronic device 601 as discussed above, and the result of the selection operation in response to the selection input 672D is maintained local to the first electronic device 601 as well. Accordingly, as discussed above, providing a virtual display for a second electronic device in a three-dimensional environment that may be interacted with via input detected on physical input devices in communication with the second electronic device or input devices in communication with a first electronic device facilitates seamless and efficient interaction with the virtual display of the second electronic device and an application running on the first electronic device without requiring the user to utilize separate input means, as an advantage. Another advantage of the above systems and methods is the seamless integration of a set of input devices (e.g., keyboard, mouse, trackpad, etc.) of a first physical electronic device with a set of input devices (e.g., eye tracking sensors, hand tracking sensors, orientation sensors, etc.) of a second physical electronic device, which allows for input received at both sets of input devices to be directed to the same one or more user interfaces within a three-dimensional environment, which improves user-device interaction.

Figure 7A:
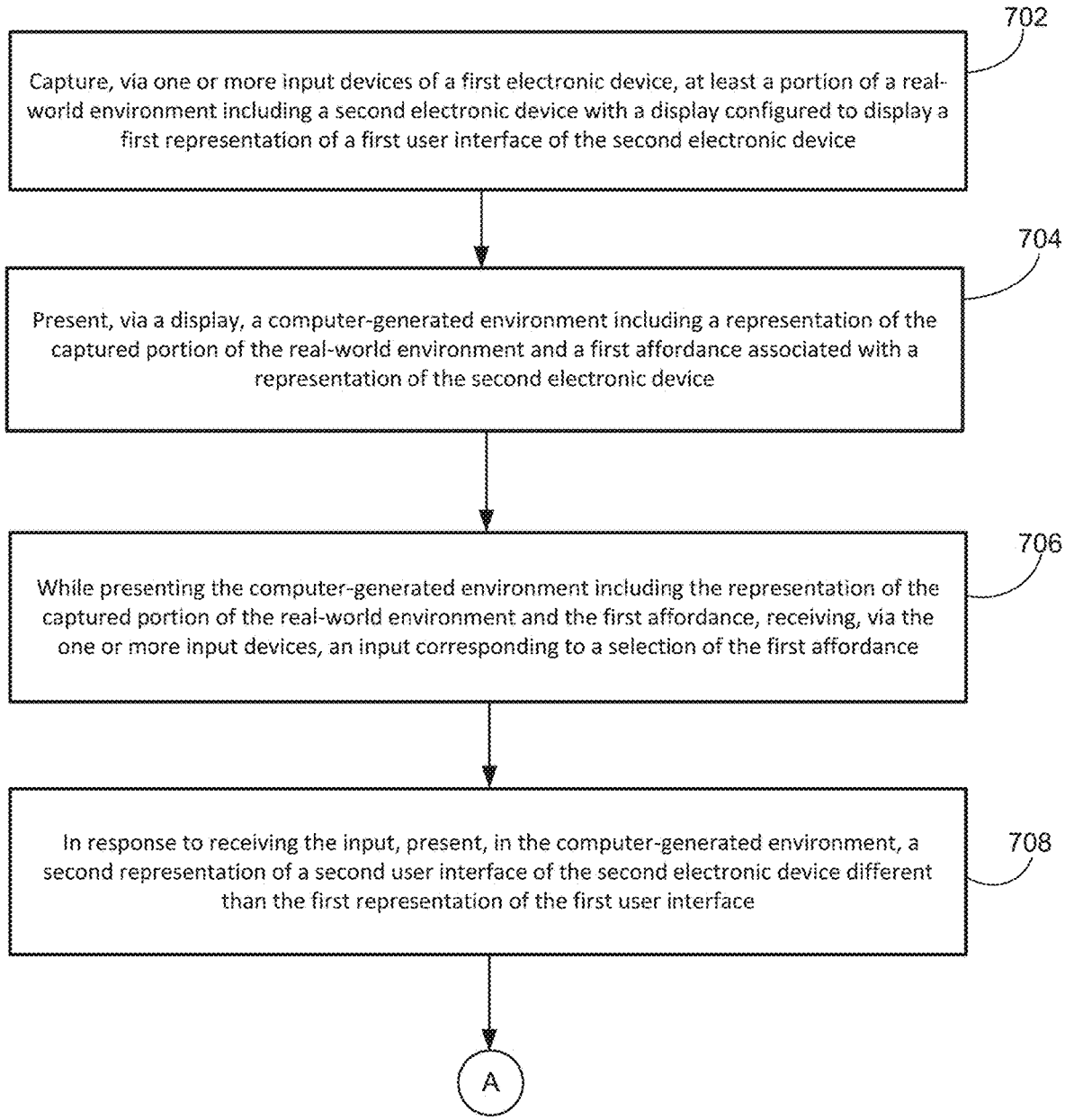
FIGS. 7A-7B are flow diagrams illustrating an example process for facilitating display and interaction with a representation of a user interface of an electronic device in a three-dimensional environment according to some examples of the disclosure.
Figure 7B:
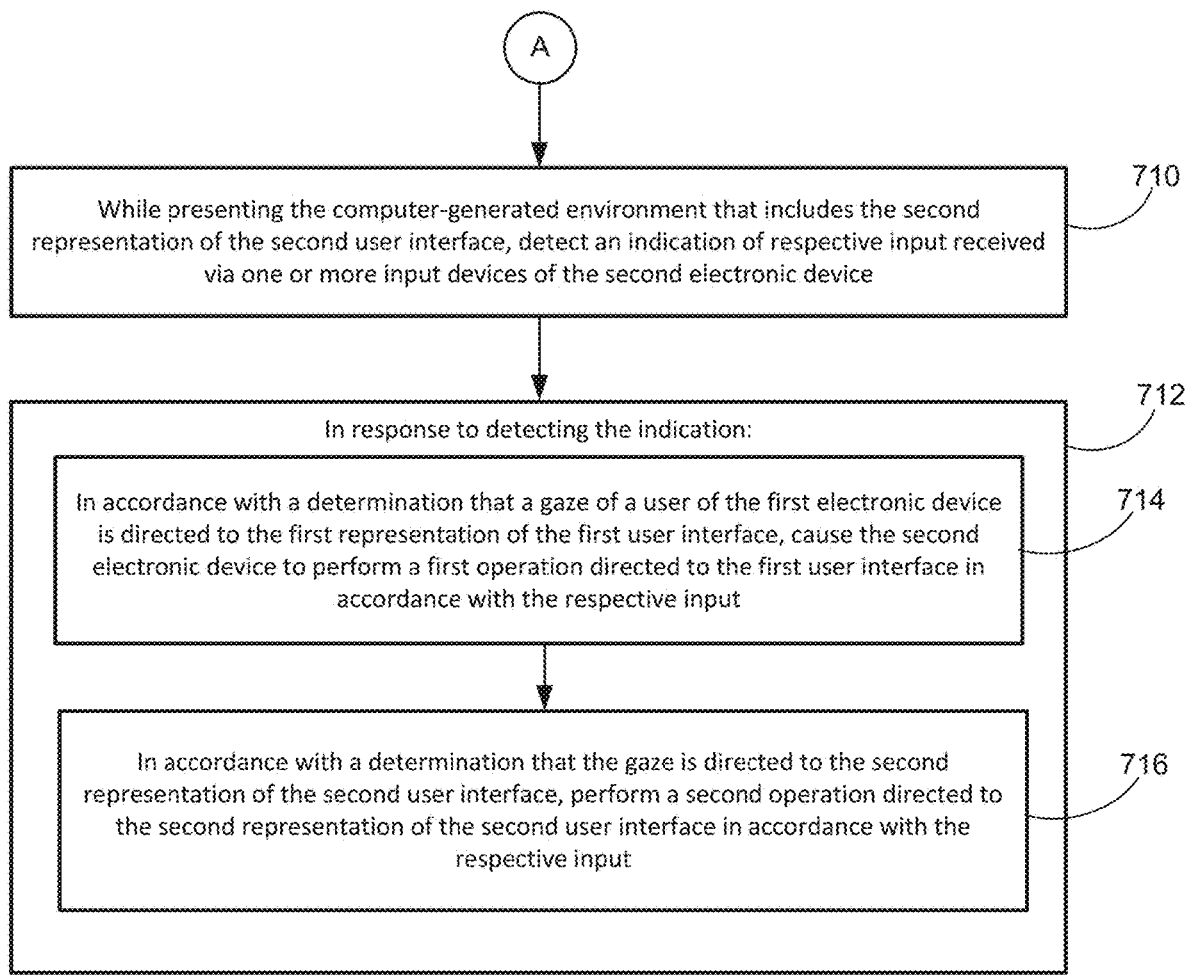

FIGS. 7A-7B are flow diagrams illustrating an example process for facilitating display and interaction with a representation of a user interface of an electronic device in a three-dimensional environment according to some examples of the disclosure. In some examples, process 700 begins at a first electronic device in communication with a display and one or more input devices of the first electronic device. In some examples, the first electronic device is optionally a head-mounted display similar or corresponding to device 240 of FIG. 2. As shown in FIG. 7A, in some examples, at 702, the first electronic device captures, via the one or more input devices, at least a portion of a real-world environment including a second electronic device with a display configured to display a first representation of a first user interface of the second electronic device. For example, as shown in FIG. 4A, first electronic device 401 captures a portion of a physical environment surrounding the first electronic device 401 that includes second electronic device 415 having display 414, wherein the display 414 is displaying first user interface 411. In some examples, the second electronic device is optionally a computer (e.g., a laptop computer, desktop computer, or tablet computer) similar or corresponding to device 230 of FIG. 2.

In some examples, at 704, the first electronic device presents, via the display, a computer-generated environment including a representation of the captured portion of the real-world environment and a first affordance associated with a representation of the second electronic device. For example, as shown in FIG. 3G, first electronic device 301 presents three-dimensional environment 350 that includes a representation of the second electronic device 315', a representation of the table 306' on which the second electronic device 315' is positioned, and first affordance 319 and/or system option 318A that are associated with the second electronic device 315'. In some examples, at 706, while presenting the computer-generated environment including the representation of the captured portion of the real-world environment and the first affordance, the first electronic device receives, via the one or more input devices, an input corresponding to a selection of the first affordance. For example, as shown in FIG. 3H, the first electronic device 301 detects selection input 371B (e.g., an air pinch gesture) directed to the system option 318A that is displayed at a predetermined region of the display of the first electronic device 301.

In some examples, at 708, in response to receiving the input, the first electronic device presents, in the computer-generated environment, a second representation of a second user interface of the second electronic device different than the first representation of the first user interface. For example, as shown in FIG. 4A, the first electronic device 401 displays a virtual extended display 404 optionally including a second user interface 425 that is configured to be displayed on the display 414' of the second electronic device 415' in the three-dimensional environment 450. In some examples, as shown in FIG. 7B, at 710, while presenting the computer-generated environment that includes the second representation of the second user interface, the first electronic device detects a first indication of first respective input received via one or more input devices of the second electronic device. For example, as shown in FIG. 4B, the first electronic device 401 receives input data that includes information corresponding to movement input 473A that is detected via mouse 432' in communication with the second electronic device 415'.

In some examples, at 712, in response to detecting the first indication, at 614, in accordance with a determination that a gaze of a user of the first electronic device is directed to the first representation of the first user interface, the first electronic device causes the second electronic device to perform a first operation directed to the first user interface in accordance with the first respective input. For example, in FIG. 4B, when the movement input 473A is detected by the second electronic device 415' via the mouse 432', gaze 427 of the user of the first electronic device 401 is directed toward the first user interface 411', which causes the first electronic device 401 to route the movement input 473A to the second electronic device 415', which causes the second electronic device 415' to move cursor 412' in the first user interface 411' as shown in FIG. 4C. Alternatively, in some examples, prior to the movement input 473A being detected by the second electronic device 415' via the mouse 432', the first electronic device 401 may transmit an indication to the second electronic device 415' that inputs are to be directed toward the first user interface 411', which causes the second electronic device 415' to process the movement input 473A locally without transmitting information corresponding to the movement input 473A to the first electronic device 401. In some examples, at 716, in accordance with a determination that the gaze is directed to the second representation of the second user interface, the first electronic device performs a second operation directed to the second representation of the second user interface in accordance with the first respective input. For example, in FIG. 4I, when movement input 473G is detected by the second electronic device 415' via the mouse 432', the gaze 427 of the user of the first electronic device 401 is directed toward the second user interface 425 of the virtual extended display 404, which causes the first electronic device 401 to move the cursor 412' within the second user interface 425 in accordance with the movement input 473G, as shown in FIG. 4J.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Figure 8:
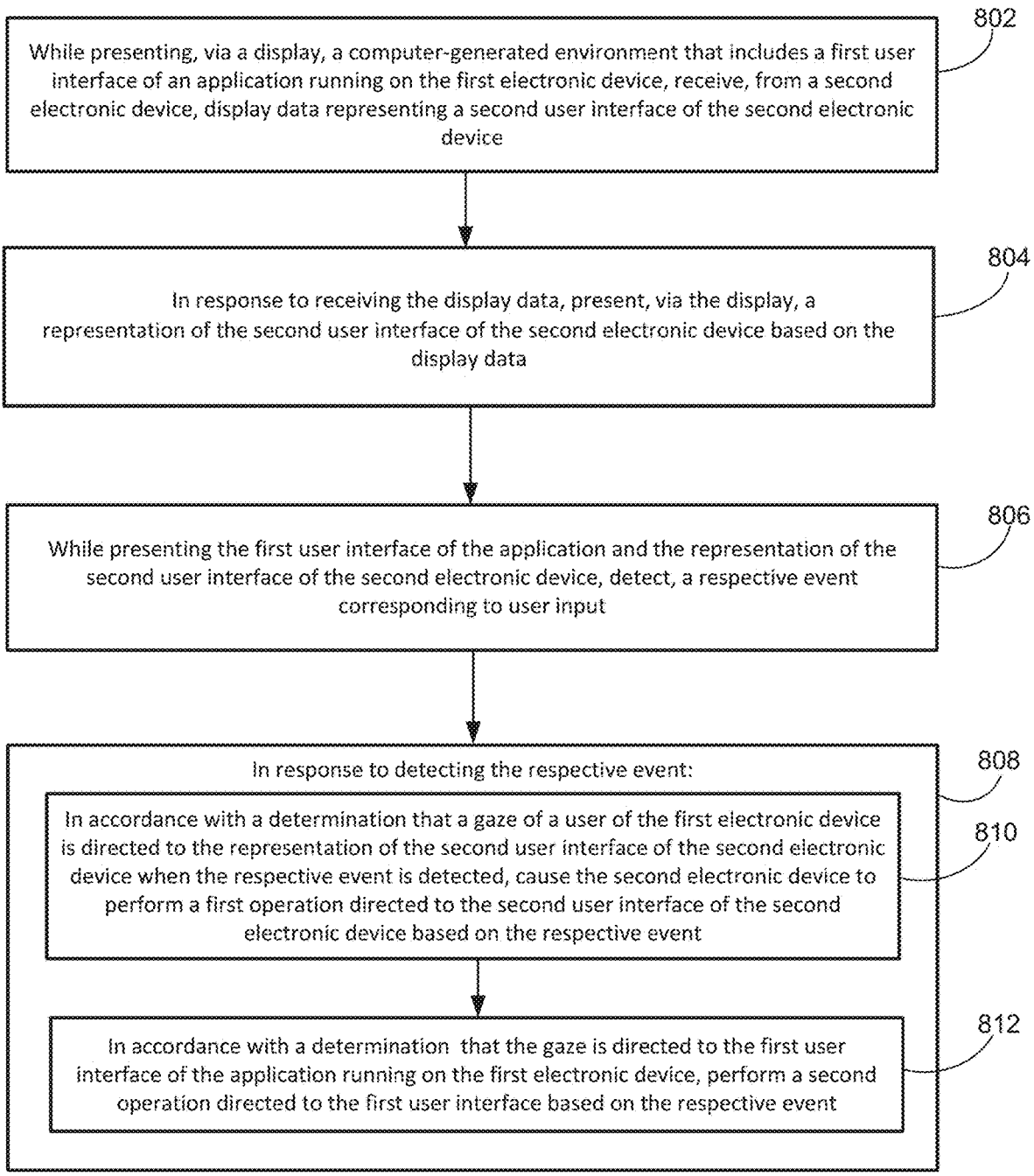
FIG. 8 is a flow diagram illustrating an example process for facilitating display and interaction with a representation of a user interface between two electronic devices in a three-dimensional environment according to some examples of the disclosure.

FIG. 8 is a flow diagram illustrating an example process for facilitating display and interaction with a representation of a user interface between two electronic devices in a three-dimensional environment according to some examples of the disclosure. In some examples, process 800 begins at a first electronic device in communication with a display and one or more input devices of the first electronic device. In some examples, the first electronic device is optionally a head-mounted display similar or corresponding to device 240 of FIG. 2. As shown in FIG. 8, in some examples, at 802, while presenting, via the display, a computer-generated environment that includes a first user interface of an application running on the first electronic device, the first electronic device receives, from a second electronic device, display data representing a second user interface of the second electronic device. For example, as similarly shown in FIG. 6A, the first electronic device 601 receives image data representing user interface 625 from the second electronic device 615' that is located in a field of view of a user of the first electronic device 601. In some examples, the second electronic device is optionally a computer (e.g., a laptop computer, desktop computer, or tablet computer) similar or corresponding to device 230 of FIG. 2.

In some examples, at 804, in response to receiving the display data, the first electronic device presents, via the display, a representation of the second user interface of the second electronic device based on the display data. For example, as shown in FIG. 6C, the first electronic device 601 displays virtual display 604 that includes a representation of the user interface 625 concurrently with virtual application window 656 that is associated with an application running on the first electronic device 601. In some examples, at 806, while presenting the first user interface of the application and the representation of the second user interface of the second electronic device, the first electronic device 601 detects a respective event corresponding to user input. For example, as shown in FIG. 6E, the second electronic device 615' detects a selection input 673B via physical mouse 632' that is in communication with the second electronic device 615', or as shown in FIG. 6G, the first electronic device 601 detects, via one or more sensors of the first electronic device 601, a selection input 672B.

In some examples, at 808, in response to detecting the respective event, at 810, in accordance with a determination that a gaze of a user of the first electronic device is directed to the representation of the second user interface of the second electronic device when the respective event is detected, the first electronic device causes the second electronic device to perform a first operation directed to the second user interface of the second electronic device based on the respective event. For example, in FIG. 6G, when the selection input 672B is detected by the first electronic device 601, the first electronic device 601 detects gaze 627 directed to the user interface 625 in the virtual display 604. Accordingly, as shown in FIG. 6H, the first electronic device 601 causes the second electronic device 615' to select text-entry field 616 of the user interface 625 based on the location of the gaze 627, which is indicated in the representation of the user interface 625 that is displayed in the virtual display 604 in the three-dimensional environment 650.

In some examples, at 812, in accordance with a determination that the gaze is directed to the first user interface of the application running on the first electronic device when the respective event is detected, the first electronic device performs a second operation (e.g., different from the first operation above) directed to the first user interface based on the respective event. For example, in FIG. 6E, when the selection input 673B is detected via the mouse 632' by the second electronic device 615', the first electronic device 601 detects the gaze 627 directed to the virtual application window 656. Accordingly, as shown in FIG. 6F, the first electronic device 601 selects pause option in playback controls 645 of the virtual application window 656 based on the location of the gaze 627 in accordance with input data corresponding to the selection input 673B received from the second electronic device 615' in FIG. 6E.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at a first electronic device in communication with a display and one or more input devices of the first electronic device: capturing, via the one or more input devices, at least a portion of a real-world environment including a second electronic device with a display configured to display a first representation of a first user interface of the second electronic device; presenting, via the display, a computer-generated environment including a representation of the captured portion of the real-world environment and a first affordance associated with a representation of the second electronic device; while presenting the computer-generated environment including the representation of the captured portion of the real-world environment and the first affordance, receiving, via the one or more input devices, an input corresponding to a selection of the first affordance; in response to receiving the input, presenting, in the computer-generated environment, a second representation of a second user interface of the second electronic device different than the first representation of the first user interface; while presenting the computer-generated environment that includes the second representation of the second user interface, detecting a first indication of first respective input received via one or more input devices of the second electronic device; and in response to detecting the first indication, in accordance with a determination that a gaze of a user of the first electronic device is directed to the first representation of the first user interface, causing the second electronic device to perform a first operation directed to the first user interface in accordance with the first respective input, and in accordance with a determination that the gaze is directed to the second representation of the second user interface, performing a second operation directed to the second representation of the second user interface in accordance with the first respective input.

Additionally or alternatively, in some examples, the first affordance is displayed in a predetermined region of the display that is separate from the representation of the second electronic device in the computer-generated environment. Additionally or alternatively, in some examples, the method further comprises, in response to detecting the indication, in accordance with a determination that the gaze of the user is directed to a respective location in the computer-generated environment that does not include the first representation of the first user interface or the second representation of the second user interface, forgoing performing any operation involving the first representation of the first user interface or the second representation of the second user interface. Additionally or alternatively, in some examples, the method further comprises: while presenting the computer-generated environment that includes the second representation of the second user interface, detecting a second indication of second respective input received via the one or more input devices of the second electronic device, wherein, after detecting the first indication, an indication of input was not detected before detecting the second indication; and in response to detecting the second indication and in accordance with a determination that the gaze of the user is directed to a respective location in the computer-generated environment that does not include the first representation of the first user interface or the second representation of the second user interface, in accordance with a determination that the gaze was directed to the first representation of the first user interface when the first indication was detected, causing the second electronic device to perform a third operation directed to the first user interface in accordance with the second respective input, and in accordance with a determination that the gaze was directed to the second representation of the second user interface when the first indication was detected, performing a fourth operation directed to the second representation of the second user interface in accordance with the second respective input.

Additionally or alternatively, in some examples, the method further comprises: while presenting the computer-generated environment that includes the second representation of the second user interface, detecting, via the one or more input devices of the first electronic device, a respective input; and in response to detecting the respective input, in accordance with a determination that the gaze is directed to the first representation of the first user interface, causing the second electronic device to perform a third operation directed to the first user interface in accordance with the respective input, and in accordance with a determination that the gaze is directed to the second representation of the second user interface, performing a fourth operation directed to the second representation of the second user interface in accordance with the respective input. Additionally or alternatively, in some examples, the first representation of the first user interface includes a cursor controllable via one or more of the one or more input devices of the second electronic device. Additionally or alternatively, in some examples, the first respective input corresponds to movement of the cursor, and in response to detecting the first indication, in accordance with the determination that the gaze is directed to the second representation of the second user interface, performing the fourth operation directed to the second representation of the second user interface includes moving the cursor from the first representation of the first user interface to the second representation of the second user interface in accordance with the movement of the cursor. Additionally or alternatively, in some examples, the one or more of the one or more input devices includes a first input device having a touch-sensitive surface, and the first respective input includes movement of a contact on the touch-sensitive surface that satisfies one or more criteria.

Additionally or alternatively, in some examples, the one or more criteria include a criterion that is satisfied when the movement of the contact includes lift-off of the contact from the touch-sensitive surface. Additionally or alternatively, in some examples, the one or more criteria include a criterion that is satisfied when the movement of the contact on the touch-sensitive surface exceeds a threshold movement. Additionally or alternatively, in some examples, the real-world environment further includes a third electronic device. In some examples, the method further comprises, in response to detecting the first indication, forgoing performing any operation involving the third electronic device. Additionally or alternatively, in some examples, the method further comprises, before displaying the first affordance associated with the representation of the second electronic device in the computer-generated environment, pairing the first electronic device and the second electronic device, such that the first electronic device is in communication with the second electronic device. Additionally or alternatively, in some examples, pairing the first electronic device and the second electronic device includes scanning, via the one or more input devices of the first electronic device, an image that is displayed via the display of the second electronic device that causes the first electronic device to be in communication with the second electronic device. Additionally or alternatively, in some examples, pairing the first electronic device and the second electronic device includes detecting, via the one or more input devices of the first electronic device, respective audio that is output from the second electronic device that causes the first electronic device to be in communication with the second electronic device. Additionally or alternatively, in some examples, pairing the first electronic device and the second electronic device includes detecting an indication of input received via the one or more input devices of the second electronic device that causes the first electronic device to be in communication with the second electronic device.

Additionally or alternatively, in some examples, the method further comprises: while presenting the computer-generated environment that includes the second representation of the second user interface, detecting disassociation of the first electronic device from the user of the first electronic device; and in response to detecting the disassociation of the first electronic device from the user, transmitting, to the second electronic device, an indication of the disassociation, including data indicative of a state of the second representation of the second user interface, wherein the indication causes the second electronic device to concurrently display the first user interface and the second user interface. Additionally or alternatively, in some examples, the method further comprises: detecting reassociation of the first electronic device with the user of the first electronic device; in response to detecting the reassociation of the first electronic device with the user, presenting the computer-generated environment, and transmitting, to the second electronic device, an indication of the reassociation; while presenting the computer-generated environment, receiving, from the second electronic device, data indicative of a current state of the second user interface; and in response to receiving the data, redisplaying the second representation of the second user interface in the computer-generated environment based on the current state of the second user interface. Additionally or alternatively, in some examples, the first electronic device includes a head-mounted display, and the second electronic device is a laptop computer, a desktop computer, or a tablet computer. Additionally or alternatively, in some examples, the method further comprises: while presenting the computer-generated environment, receiving an invitation to join a communication session with a user of a third electronic device; and in response to receiving the invitation, in accordance with a determination that the invitation is accepted by the user of the first electronic device, entering the communication session with the user of the third electronic device, including concurrently displaying an avatar corresponding to the user of the third electronic device and the first representation of the first user interface.

Additionally or alternatively, in some examples, the method further comprises: while presenting the computer-generated environment that includes the avatar corresponding to the user of the third electronic device and the first representation of the first user interface, receiving an indication corresponding to a request from the third electronic device to share content with the first electronic device; and in response to receiving the indication, in accordance with a determination that the request is accepted by the user of the first electronic device, displaying a third representation of a third user interface corresponding to the content in the computer-generated environment, wherein the third user interface is configured to be displayed on the third electronic device. Additionally or alternatively, in some examples, the method further comprises: while presenting the computer-generated environment that includes the third representation of the third user interface, detecting, via the one or more input devices of the first electronic device, an input directed to the third representation of the third user interface; and in response to detecting the input, forgoing performing an operation directed to the third representation of the third user interface in accordance with the input.

Some examples of the disclosure are directed to a method, comprising at a first electronic device in communication with a display and one or more input devices of the first electronic device: while presenting, via the display, a computer-generated environment that includes a first user interface of an application running on the first electronic device, receiving, from a second electronic device, display data representing a second user interface of the second electronic device; in response to receiving the display data, presenting, via the display, a representation of the second user interface of the second electronic device based on the display data; while presenting the first user interface of the application and the representation of the second user interface of the second electronic device, detecting a respective event corresponding to user input; and in response to detecting the respective event, in accordance with a determination that a gaze of a user of the first electronic device is directed to the representation of the second user interface of the second electronic device when the respective event is detected, causing the second electronic device to perform a first operation directed to the second user interface of the second electronic device based on the respective event, and in accordance with a determination that the gaze is directed to the first user interface of the application running on the first electronic device, performing a second operation directed to the first user interface based on the respective event.

Additionally or alternatively, in some examples, detecting the respective event includes detecting an indication of respective input received via one or more input devices in communication with the second electronic device. Additionally or alternatively, in some examples, the method further comprises: in response to detecting the indication of respective input, in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze without transmitting input data corresponding to the respective input to the first electronic device. Additionally or alternatively, in some examples, the method further comprises, in response to detecting the indication of respective input: in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze; and receiving input data corresponding to the respective input from the second electronic device according to which the first operation is performed at the second electronic device. Additionally or alternatively, in some examples, the method further comprises, in response to detecting the indication of respective input, in accordance with a determination that the gaze is directed to the first user interface of the application running on the first electronic device when the indication is detected, performing the second operation directed to the first user interface in accordance with the respective input, without transmitting input data corresponding to the respective input to the second electronic device.

Additionally or alternatively, in some examples, detecting the respective event includes detecting, via the one or more input devices of the first electronic device, respective input. Additionally or alternatively, in some examples, the method further comprises: in response to detecting the respective input, in accordance with a determination that the gaze is directed to the representation of the second user interface of the second electronic device when the respective input is detected, transmitting input data corresponding to the respective input to the second electronic device. Additionally or alternatively, in some examples, the method further comprises, in response to detecting the respective input, in accordance with a determination that the gaze is directed to the first user interface of the application running on the first electronic device when the respective input is detected, performing the second operation directed to the first user interface in accordance with the respective input, without transmitting input data corresponding to the respective input to the second electronic device. Additionally or alternatively, in some examples, causing the second electronic device to perform the first operation includes transmitting, to the second electronic device, gaze data that includes information indicating that the gaze was directed to the representation of the second user interface of the second electronic device when the respective event was detected. Additionally or alternatively, in some examples, the information includes positional information corresponding to a location of the gaze within the representation of the second user interface. Additionally or alternatively, in some examples, the second electronic device is not displaying the second user interface.

Additionally or alternatively, in some examples, causing the second electronic device to perform the first operation directed to the second user interface includes updating a visual appearance of the second user interface. Additionally or alternatively, in some examples, the method further comprises: after causing the second electronic device to perform the first operation directed to the second user interface, receiving, from the second electronic device, updated display data representing one or more updates to the visual appearance of the second user interface of the second electronic device; and in response to receiving the updated display data, updating display of the representation of the second user interface based on the updated display data. Additionally or alternatively, in some examples, the second electronic device is displaying the second user interface. Additionally or alternatively, in some examples, the method further comprises: before receiving, from the second electronic device, the display data representing the second user interface of the second electronic device, presenting, via the display, the computer-generated environment a first affordance associated with a representation of the second electronic device; while presenting the computer-generated environment including the first affordance, receiving, via the one or more input devices, an input corresponding to a selection of the first affordance; and in response to receiving the input, presenting, in the computer-generated environment, the representation of the second user interface of the second electronic device based on the display data. Additionally or alternatively, in some examples, the method further comprises in response to receiving the input, causing the second electronic device to cease display of second user interface. Additionally or alternatively, in some examples, the method further comprises, before displaying the first affordance associated with the representation of the second electronic device in the computer-generated environment, pairing the first electronic device and the second electronic device, such that the first electronic device is in communication with the second electronic device.

Additionally or alternatively, in some examples, the method further comprises: while presenting the computer-generated environment, detecting disassociation of the first electronic device from a user of the first electronic device; and in response to detecting the disassociation of the first electronic device from the user, transmitting, to the second electronic device, an indication of the disassociation, wherein the indication causes the second electronic device to display the second user interface. Additionally or alternatively, in some examples, the method further comprises:

detecting reassociation of the first electronic device with the user of the first electronic device; in response to detecting the reassociation of the first electronic device with the user, presenting the computer-generated environment, and transmitting, to the second electronic device, an indication of the reassociation; while presenting the computer-generated environment, receiving, from the second electronic device, updated display data representing a current state of the second user interface; and in response to receiving the updated display data, redisplaying the representation of the second user interface in the computer-generated environment based on the current state of the second user interface. Additionally or alternatively, in some examples, the method further comprises: while presenting the computer-generated environment, receiving an invitation to join a communication session with a user of a third electronic device; and in response to receiving the invitation, in accordance with a determination that the invitation is accepted by the user of the first electronic device, entering the communication session with the user of the third electronic device, including concurrently displaying an avatar corresponding to the user of the third electronic device and the first representation of the first user interface. Additionally or alternatively, in some examples, the method further comprises: while presenting the computer-generated environment that includes the avatar corresponding to the user of the third electronic device and the first user interface of the application running on the first electronic device, receiving an indication corresponding to a request from the third electronic device to share content with the first electronic device; and in response to receiving the indication, in accordance with a determination that the request is accepted by the user of the first electronic device, displaying a representation of a third user interface corresponding to the content in the computer-generated environment, wherein the third user interface is configured to be displayed on the third electronic device.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
  at a first electronic device in communication with a display and one or more input devices of the first electronic device:
    while presenting, via the display, a computer-generated environment that includes a first user interface of an application running on the first electronic device, receiving, from a second electronic device, display data representing a second user interface of the second electronic device;
    in response to receiving the display data, presenting, via the display, a representation of the second user interface of the second electronic device based on the display data;
    while presenting the first user interface of the application and the representation of the second user interface of the second electronic device, detecting a respective event corresponding to user input; and
    in response to detecting the respective event:
      in accordance with a determination that a gaze of a user of the first electronic device is directed to the representation of the second user interface of the second electronic device when the respective event is detected, causing the second electronic device to perform a first operation directed to the second user interface of the second electronic device based on the respective event; and
      in accordance with a determination that the gaze is directed to the first user interface of the application running on the first electronic device, performing a second operation directed to the first user interface based on the respective event.

2. The method of claim 1, wherein detecting the respective event includes detecting an indication of respective input received via one or more input devices in communication with the second electronic device.

3. The method of claim 2, further comprising:
  in response to detecting the indication of respective input:
    in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze without transmitting input data corresponding to the respective input to the first electronic device.

4. The method of claim 2, further comprising:
  in response to detecting the indication of respective input:
    in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze; and
    receiving input data corresponding to the respective input from the second electronic device according to which the first operation is performed at the second electronic device.

5. The method of claim 2, further comprising:
  in response to detecting the indication of respective input:
    in accordance with a determination that the gaze is directed to the first user interface of the application running on the first electronic device when the indication is detected, performing the second operation directed to the first user interface in accordance with the respective input, without transmitting input data corresponding to the respective input to the second electronic device.

6. The method of claim 1, wherein detecting the respective event includes detecting, via the one or more input devices of the first electronic device, respective input.

7. The method of claim 6, further comprising:
in response to detecting the respective input:
in accordance with a determination that the gaze is directed to the representation of the second user interface of the second electronic device when the respective input is detected, transmitting input data corresponding to the respective input to the second electronic device.

8. The method of claim 6, further comprising:
in response to detecting the respective input:
in accordance with a determination that the gaze is directed to the first user interface of the application running on the first electronic device when the respective input is detected, performing the second operation directed to the first user interface in accordance with the respective input, without transmitting input data corresponding to the respective input to the second electronic device.

9. The method of claim 1, wherein causing the second electronic device to perform the first operation includes transmitting, to the second electronic device, gaze data that includes information indicating that the gaze was directed to the representation of the second user interface of the second electronic device when the respective event was detected.

10. The method of claim 9, wherein the information includes positional information corresponding to a location of the gaze within the representation of the second user interface.

11. The method of claim 1, wherein the second electronic device is not displaying the second user interface.

12. The method of claim 1, wherein causing the second electronic device to perform the first operation directed to the second user interface includes updating a visual appearance of the second user interface, the method further comprising:
after causing the second electronic device to perform the first operation directed to the second user interface, receiving, from the second electronic device, updated display data representing one or more updates to the visual appearance of the second user interface of the second electronic device; and
in response to receiving the updated display data, updating display of the representation of the second user interface based on the updated display data.

13. The method of claim 1, wherein the second electronic device is displaying the second user interface, the method further comprising:
before receiving, from the second electronic device, the display data representing the second user interface of the second electronic device, presenting, via the display, the computer-generated environment a first affordance associated with a representation of the second electronic device;
while presenting the computer-generated environment including the first affordance, receiving, via the one or more input devices, an input corresponding to a selection of the first affordance; and in response to receiving the input, presenting, in the computer-generated environment, the representation of the second user interface of the second electronic device based on the display data.

14. The method of claim 13, further comprising:
in response to receiving the input, causing the second electronic device to cease display of second user interface.

15. The method of claim 13, further comprising:
before displaying the first affordance associated with the representation of the second electronic device in the computer-generated environment, pairing the first electronic device and the second electronic device, such that the first electronic device is in communication with the second electronic device.

16. The method of claim 1, further comprising:
while presenting the computer-generated environment, detecting disassociation of the first electronic device from a user of the first electronic device; and
in response to detecting the disassociation of the first electronic device from the user:
transmitting, to the second electronic device, an indication of the disassociation, wherein the indication causes the second electronic device to display the second user interface.

17. The method of claim 16, further comprising:
detecting reassociation of the first electronic device with the user of the first electronic device;
in response to detecting the reassociation of the first electronic device with the user:
presenting the computer-generated environment; and
transmitting, to the second electronic device, an indication of the reassociation;
while presenting the computer-generated environment, receiving, from the second electronic device, updated display data representing a current state of the second user interface; and
in response to receiving the updated display data:
redisplaying the representation of the second user interface in the computer-generated environment based on the current state of the second user interface.

18. The method of claim 1, further comprising:
while presenting the computer-generated environment, receiving an invitation to join a communication session with a user of a third electronic device; and
in response to receiving the invitation:
in accordance with a determination that the invitation is accepted by the user of the first electronic device, entering the communication session with the user of the third electronic device, including concurrently displaying an avatar corresponding to the user of the third electronic device and the first user interface.

19. The method of claim 18, further comprising:
while presenting the computer-generated environment that includes the avatar corresponding to the user of the third electronic device and the first user interface of the application running on the first electronic device, receiving an indication corresponding to a request from the third electronic device to share content with the first electronic device; and
in response to receiving the indication:
in accordance with a determination that the request is accepted by the user of the first electronic device, displaying a representation of a third user interface corresponding to the content in the computer-generated environment, wherein the third user interface is configured to be displayed on the third electronic device.

20. The method of claim 19, further comprising:
while presenting the computer-generated environment that includes the representation of the third user interface, detecting, via the one or more input devices of the first electronic device, an input directed to the representation of the third user interface; and
in response to detecting the input:
forgoing performing an operation directed to the representation of the third user interface in accordance with the input.

21. An electronic device comprising:
one or more processors;
memory; and
one or more programs stored in the memory and configured to be executed by the one or more processors, the one or more programs including instructions for performing a method comprising:
while presenting, via a display, a computer-generated environment that includes a first user interface of an application running on the electronic device, receiving, from a second electronic device, display data representing a second user interface of the second electronic device;
in response to receiving the display data, presenting, via the display, a representation of the second user interface of the second electronic device based on the display data;
while presenting the first user interface of the application and the representation of the second user interface of the second electronic device, detecting a respective event corresponding to user input; and
in response to detecting the respective event:
in accordance with a determination that a gaze of a user of the electronic device is directed to the representation of the second user interface of the second electronic device when the respective event is detected, causing the second electronic device to perform a first operation directed to the second user interface of the second electronic device based on the respective event; and
in accordance with a determination that the gaze is directed to the first user interface of the application running on the electronic device, performing a second operation directed to the first user interface based on the respective event.

22. The electronic device of claim 21, wherein detecting the respective event includes detecting an indication of respective input received via one or more input devices in communication with the second electronic device.

23. The electronic device of claim 22, wherein the method further comprises:
in response to detecting the indication of respective input:
in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze without transmitting input data corresponding to the respective input to the electronic device.

24. The electronic device of claim 22, wherein the method further comprises:
in response to detecting the indication of respective input:
in accordance with a determination that the gaze is directed to the representation of the second user interface of the second electronic device when the indication is detected, transmitting gaze data regarding a location of the gaze to the second electronic device, wherein the second electronic device performs the first operation according to the data regarding the location of the gaze; and
receiving input data corresponding to the respective input from the second electronic device according to which the first operation is performed at the second electronic device.

25. The electronic device of claim 22, wherein the method further comprises:
in response to detecting the indication of respective input:
in accordance with a determination that the gaze is directed to the first user interface of the application running on the electronic device when the indication is detected, performing the second operation directed to the first user interface in accordance with the respective input, without transmitting input data corresponding to the respective input to the second electronic device.

26. A non-transitory computer readable storage medium storing one or more programs, the one or more programs comprising instructions, which when executed by one or more processors of an electronic device, cause the electronic device to perform a method comprising:
while presenting, via a display, a computer-generated environment that includes a first user interface of an application running on the electronic device, receiving, from a second electronic device, display data representing a second user interface of the second electronic device;
in response to receiving the display data, presenting, via the display, a representation of the second user interface of the second electronic device based on the display data;
while presenting the first user interface of the application and the representation of the second user interface of the second electronic device, detecting a respective event corresponding to user input; and
in response to detecting the respective event:
in accordance with a determination that a gaze of a user of the electronic device is directed to the representation of the second user interface of the second electronic device when the respective event is detected, causing the second electronic device to perform a first operation directed to the second user interface of the second electronic device based on the respective event; and
in accordance with a determination that the gaze is directed to the first user interface of the application running on the electronic device, performing a second operation directed to the first user interface based on the respective event.

27. The non-transitory computer readable storage medium of claim 26, wherein detecting the respective event includes detecting, via one or more input devices of the electronic device, respective input.

28. The non-transitory computer readable storage medium of claim 27, wherein the method further comprises:
in response to detecting the respective input:
in accordance with a determination that the gaze is directed to the representation of the second user interface of the second electronic device when the respective input is detected, transmitting input data corresponding to the respective input to the second electronic device.

29. The non-transitory computer readable storage medium of claim 27, wherein the method further comprises:
in response to detecting the respective input:
in accordance with a determination that the gaze is directed to the first user interface of the application running on the electronic device when the respective input is detected, performing the second operation directed to the first user interface in accordance with the respective input, without transmitting input data corresponding to the respective input to the second electronic device.

30. The non-transitory computer readable storage medium of claim 26, wherein causing the second electronic device to perform the first operation includes transmitting, to the second electronic device, gaze data that includes information indicating that the gaze was directed to the representation of the second user interface of the second electronic device when the respective event was detected.

\* \* \* \* \*